(12) United States Patent
Yin et al.

(10) Patent No.: US 9,586,179 B2
(45) Date of Patent: *Mar. 7, 2017

(54) WASHCOATS AND COATED SUBSTRATES FOR CATALYTIC CONVERTERS AND METHODS OF MAKING AND USING SAME

(71) Applicant: SDCmaterials, Inc., Tempe, AZ (US)

(72) Inventors: Qinghua Yin, Tempe, AZ (US); Xiwang Qi, Scottsdale, AZ (US); Maximilian A. Biberger, Scottsdale, AZ (US); David Leamon, Gilbert, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,351

(22) Filed: Jul. 24, 2014

(65) Prior Publication Data

US 2015/0093312 A1    Apr. 2, 2015

Related U.S. Application Data

(60) Provisional application No. 61/858,551, filed on Jul. 25, 2013.

(51) Int. Cl.
| | |
|---|---|
| *B01D 53/94* | (2006.01) |
| *B01J 20/02* | (2006.01) |
| *B01J 20/04* | (2006.01) |
| *B01J 20/06* | (2006.01) |
| *B01J 20/08* | (2006.01) |

(Continued)

(52) U.S. Cl.
CPC ............ *B01D 53/945* (2013.01); *B01J 23/40* (2013.01); *B01J 29/072* (2013.01);
(Continued)

(58) Field of Classification Search
None
See application file for complete search history.

(56) References Cited

U.S. PATENT DOCUMENTS

| | | | |
|---|---|---|---|
| 1,477,664 A | 12/1923 | Rankin | |
| 2,021,936 A | 11/1935 | Johnstone | |

(Continued)

FOREIGN PATENT DOCUMENTS

| | | |
|---|---|---|
| CN | 1647858 A | 8/2005 |
| CN | 101011664 A | 8/2007 |

(Continued)

OTHER PUBLICATIONS

Jensen, J. et al. (2000). "Preparation of ZnO—Al$_2$O$_3$ Particles in a Premixed Flame," *Journal of Nanoparticle Research* 2: 363-373.
(Continued)

*Primary Examiner* — Colin W Slifka
(74) *Attorney, Agent, or Firm* — Morrison & Foerster, LLP

(57) ABSTRACT

Disclosed are, inter alia, methods of forming coated substrates for use in catalytic converters, as well as washcoat compositions and methods suitable for using in preparation of the coated substrates, and the coated substrates formed thereby, which in some cases use iron-exchanged zeolite particles that provide enhanced performance such as lower light-off temperatures and lower pollutant levels in exhaust gases. The catalytic material is prepared by a plasma-based method, yielding catalytic material with a lower tendency to migrate on support at high temperatures, and thus less prone to catalyst aging after prolonged use. Also disclosed are catalytic converters using the coated substrates, which have favorable properties as compared to catalytic converters using catalysts deposited on substrates using solution chemistry. Also disclosed are exhaust treatment systems, and vehicles, such as diesel vehicles, particularly light-duty diesel vehicles, using catalytic converters and exhaust treatment systems using the coated substrates.

34 Claims, 8 Drawing Sheets

(51) Int. Cl.

| | | |
|---|---|---|
| *B01J 20/28* | (2006.01) | |
| *B01J 20/32* | (2006.01) | |
| *B01J 21/04* | (2006.01) | |
| *B01J 23/38* | (2006.01) | |
| *B01J 23/44* | (2006.01) | |
| *B01J 29/06* | (2006.01) | |
| *B01J 29/068* | (2006.01) | |
| *B01J 29/88* | (2006.01) | |
| *B01J 35/00* | (2006.01) | |
| *B01J 35/04* | (2006.01) | |
| *B01J 37/02* | (2006.01) | |
| *F01N 3/08* | (2006.01) | |
| *B01J 23/40* | (2006.01) | |
| *B01J 29/072* | (2006.01) | |
| *B01J 37/34* | (2006.01) | |

(52) U.S. Cl.
CPC ....... *B01J 37/0244* (2013.01); *B01J 37/0246* (2013.01); *B01J 37/0248* (2013.01); *B01D 2255/20738* (2013.01); *B01D 2255/50* (2013.01); *B01D 2255/9025* (2013.01); *B01D 2255/91* (2013.01); *B01D 2255/912* (2013.01); *B01D 2255/9202* (2013.01); *B01J 37/0219* (2013.01); *B01J 37/349* (2013.01); *B01J 2229/186* (2013.01); *Y02T 10/22* (2013.01)

(56) References Cited

U.S. PATENT DOCUMENTS

| | | |
|---|---|---|
| 2,284,554 A | 5/1942 | Beyerstedt |
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,108,006 A | 10/1963 | Kenedi et al. |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,290,723 A | 12/1966 | Jaques et al. |
| 3,309,873 A | 3/1967 | Cann |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Miyajima |
| 3,520,656 A | 7/1970 | Yates et al. |
| 3,537,513 A | 11/1970 | Austin |
| 3,552,653 A | 1/1971 | Inoue |
| 3,589,351 A | 6/1971 | Shoupp et al. |
| 3,617,358 A | 11/1971 | Dittrich |
| 3,667,111 A | 6/1972 | Chartet |
| 3,676,638 A | 7/1972 | Stand |
| 3,730,827 A | 5/1973 | Matchen et al. |
| 3,741,001 A | 6/1973 | Fletcher et al. |
| 3,743,708 A | 7/1973 | Chase et al. |
| 3,752,172 A | 8/1973 | Cohen et al. |
| 3,761,360 A | 9/1973 | Auvil et al. |
| 3,774,442 A | 11/1973 | Gustaysson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,006,340 A | 2/1977 | Gorinas |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,252,843 A | 2/1981 | Dorer et al. |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,335,080 A | 6/1982 | Davis et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,665,296 A | 5/1987 | Iwata et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,869,936 A | 9/1989 | Moskowitz et al. |
| 4,877,937 A | 10/1989 | Müller |
| 4,885,038 A | 12/1989 | Anderson et al. |
| 4,902,870 A | 2/1990 | Frind et al. |
| 4,916,107 A | 4/1990 | Brand et al. |
| 4,921,586 A | 5/1990 | Molter |
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,013,883 A | 5/1991 | Fuimefreddo et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,652 A | 7/1993 | Landes |
| 5,225,656 A | 7/1993 | Frind |
| 5,230,844 A | 7/1993 | Macaire et al. |
| 5,233,153 A | 8/1993 | Coats |
| 5,243,169 A | 9/1993 | Tateno et al. |
| 5,260,241 A | 11/1993 | Addiego et al. |

(56) References Cited

U.S. PATENT DOCUMENTS

| | | |
|---|---|---|
| 5,269,848 A | 12/1993 | Nakagawa |
| 5,276,693 A | 1/1994 | Long et al. |
| 5,280,757 A | 1/1994 | Carter et al. |
| 5,294,242 A | 3/1994 | Zurecki et al. |
| 5,330,945 A | 7/1994 | Beckmeyer et al. |
| 5,338,716 A | 8/1994 | Triplett et al. |
| 5,357,075 A | 10/1994 | Muehlberger |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,408,066 A | 4/1995 | Trapani et al. |
| 5,436,080 A | 7/1995 | Inoue et al. |
| 5,439,865 A | 8/1995 | Abe et al. |
| 5,442,153 A | 8/1995 | Marantz et al. |
| 5,444,209 A | 8/1995 | Crawmer et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,487,916 A | 1/1996 | Christensen |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,676,912 A * | 10/1997 | Sharma ............... B01D 53/945 423/213.2 |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,726,415 A | 3/1998 | Luo et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,984,997 A | 11/1999 | Bickmore et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,001,426 A | 12/1999 | Witherspoon et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,150,288 A | 11/2000 | Suzuki et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,365,016 B1 | 4/2002 | Iacovangelo et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,444,298 B1 | 9/2002 | Tadokoro et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 | 12/2002 | He |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zornes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 | 8/2004 | Kodas et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |

(56) References Cited

U.S. PATENT DOCUMENTS

| | | |
|---|---|---|
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,956,007 B2 | 10/2005 | Cai et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 | 6/2006 | Hampden-Smith et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 | 8/2006 | Kodas et al. |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,547,400 B1 | 6/2009 | Carpenter et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKechnie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,897,536 B2 | 3/2011 | Saio et al. |
| 7,902,104 B2 | 3/2011 | Kalck |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,176,830 B1 | 5/2012 | Tan |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,378,877 B2 | 2/2013 | Tishin et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,518,846 B2 | 8/2013 | Uchikawa et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | van den Hoek et al. |
| 8,679,433 B2 * | 3/2014 | Yin ................... B01D 53/944 423/213.2 |
| 8,679,434 B1 | 3/2014 | Li et al. |
| 8,758,695 B2 | 6/2014 | Neubauer et al. |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,927,403 B2 | 1/2015 | Huotari et al. |
| 8,932,514 B1 | 1/2015 | Yin et al. |
| 8,969,237 B2 * | 3/2015 | Yin ................... B01D 53/944 427/446 |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | Van Den Hoek et al. |
| 9,308,524 B2 | 4/2016 | Yin et al. |
| 9,332,636 B2 | 5/2016 | Biberger |
| 9,427,732 B2 | 8/2016 | Yin et al. |
| 9,433,938 B2 | 9/2016 | van den Hoek et al. |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |

(56) References Cited

U.S. PATENT DOCUMENTS

| | | |
|---|---|---|
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0007092 A1 | 1/2004 | Yoshimura |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0178530 A1 | 9/2004 | Yadav |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0119398 A1 | 6/2005 | Zhang |
| 2005/0126338 A1 | 6/2005 | Yadav |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0009752 A1 | 1/2007 | Lefebvre et al. |
| 2007/0014919 A1 | 1/2007 | Hamalainen et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1 | 11/2007 | Kear et al. |
| 2007/0266825 A1 | 11/2007 | Ripley et al. |
| 2007/0272664 A1 | 11/2007 | Schroder |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0107586 A1 | 5/2008 | Smalley et al. |
| 2008/0108005 A1 | 5/2008 | Carpenter |
| 2008/0116118 A1 | 5/2008 | Zhu et al. |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0268270 A1 | 10/2008 | Chen et al. |
| 2008/0274344 A1 | 11/2008 | Veith et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0080592 A1 | 3/2009 | Arsenlis et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |

(56) References Cited

U.S. PATENT DOCUMENTS

| | | |
|---|---|---|
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0320457 A1 | 12/2009 | Wan |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0089742 A1 | 4/2010 | Suslov |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0180820 A1 | 7/2010 | Ishimaru et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0283013 A1 | 11/2010 | Sato et al. |
| 2010/0323118 A1 | 12/2010 | Mohanty et al. |
| 2011/0005211 A1 | 1/2011 | Tissler et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0052698 A1 | 3/2011 | Benoit et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel et al. |
| 2011/0180750 A1 | 7/2011 | Kleine Jaeger et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gömez et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2014/0369912 A1 | 12/2014 | Zheng et al. |
| 2015/0140317 A1 | 5/2015 | Biberger et al. |
| 2015/0141236 A1 | 5/2015 | Yin et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0217229 A1* | 8/2015 | Yin ................. B01D 53/944 |
| | | 423/213.5 |
| 2015/0266002 A1 | 9/2015 | Biberger et al. |
| 2015/0314260 A1 | 11/2015 | Biberger |
| 2015/0314581 A1 | 11/2015 | Biberger |
| 2015/0367331 A1 | 12/2015 | Biberger |
| 2016/0038874 A1 | 2/2016 | Yin et al. |
| 2016/0045867 A1 | 2/2016 | Kearl et al. |
| 2016/0059216 A1 | 3/2016 | Qi |
| 2016/0067679 A1 | 3/2016 | Yin et al. |
| 2016/0074855 A1 | 3/2016 | Qi et al. |
| 2016/0138870 A1 | 5/2016 | Biberger et al. |
| 2016/0144346 A1 | 5/2016 | Biberger et al. |
| 2016/0144352 A1 | 5/2016 | van den Hoek et al. |
| 2016/0184802 A1 | 6/2016 | Biberger et al. |
| 2016/0228852 A1 | 8/2016 | Biberger et al. |
| 2016/0236148 A1 | 8/2016 | Yin et al. |

FOREIGN PATENT DOCUMENTS

| | | |
|---|---|---|
| CN | 101301610 A | 11/2008 |
| CN | 101601999 A | 12/2009 |
| DE | 34 45 273 A1 | 6/1986 |
| EP | 0 223 104 A1 | 5/1987 |
| EP | 0 347 386 A1 | 12/1989 |
| EP | 0 385 742 A1 | 9/1990 |
| EP | 1 134 302 A1 | 9/2001 |
| EP | 1 195 196 A1 | 4/2002 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A | 5/1995 |
| JP | 7-138020 A | 5/1995 |

(56) References Cited

FOREIGN PATENT DOCUMENTS

| | | | |
|---|---|---|---|
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-170043 A | 6/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-181484 A | 7/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| JP | 2007-222732 A | 9/2007 |
| JP | 2007-253037 A | 10/2007 |
| JP | 2009-254929 A | 11/2009 |
| JP | 2009-279544 A | 12/2009 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/16882 | 3/2000 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |
| WO | WO-2015/061482 A1 | 4/2015 |
| WO | WO-2016/019067 A1 | 2/2016 |
| WO | WO-2016/033517 A1 | 3/2016 |

OTHER PUBLICATIONS

Li, J-G. et al. (2009). "Cobalt-Doped $TiO_2$ Nanocrystallites: Radio-Frequency Thermal Plasma Processing, Phase Structure, and Magnetic Properties," *J. Phys. Chem.* 113 (19): 8009-8015.

Magdassi, S. et al. (Apr. 2010). "Triggering the Sintering of Silver Nanoparticles at Room Temperature," *ACS Nano* 4(4): 1943-1948.
International Preliminary Report on Patentability dated Jan. 26, 2016, for PCT Patent Application No. PCT/US2014/048078, filed Jul. 24, 2014, published on Jan. 29, 2015, as WO 2015/013545; 14 pages.
Birlik, I. et al. (Jun. 15, 2010). "Nanoparticle Doped YBCO Films Prepared by Chemical Solution Deposition Method," *6th Nanoscience and Nanotechnology Conference*, Izmir, Turkey: 1 page.
Cospheric LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.
Büchel, R. et al. (2009). "Influence of Pt Location on $BaCO_3$ or $Al_2O_3$ During $NO_x$ Storage Reduction," *Journal of Catalysis* 261: 201-207.
Date, A. R. et al. (1987). "The Potential of Fire Assay and Inductively Coupled Plasama Source Mass Spectrometry for the Determination of Platinum Group Elements in Geological Materials," *Analyst* 112: 1217-1222.
Lamouroux, E. et al. (2007). "Identification of Key Parameters for the Selective Growth of Single or Double Wall Carbon Nanotubes on $FeMo/Al_2O_3$ CVD Catalysts," *Applied Catalysts A: General* 323: 162-173.
Martinez-Hansen, V. et al. (2009). "Development of Aligned Carbon Nanotubes Layers Over Stainless Steel Mesh Monoliths," *Catalysis Today* 147S: S71-S75.
Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.
Strobel, R. et al. (2003). "Flame-made Platinum/Alumina: Structural Properties and Catalytic Behaviour in Enantioselective Hydrogenation," *Journal of Catalysis* 213: 296-304.
International Search Report mailed Oct. 10, 2014, for PCT Patent Application No. PCT/US14/48078, filed Jul. 24, 2014; 3 pages.
Written Opinion mailed Oct. 10, 2014, for PCT Patent Application No. PCT/US14/48078, filed Jul. 24, 2014; 13 pages.
Ahmad, K. et al. (2008). "Hybrid Nanocomposites: A New Route Towards Tougher Alumina Ceramics," *Composites Science and Technology* 68: 1321-1327.
Babin, A. et al. (1985). "Solvents Used in the Arts," *Center for Safety in the Arts*: 16 pages.
Bateman, J. E. et al. (Dec. 17, 1998). "Alkylation of Porous Silicon by Direct Reaction with Alkenes and Alkynes," *Angew. Chem Int. Ed.* 37(19):2683-2685.
Carrot, G. et al. (Sep. 17, 2002). "Surface-Initiated Ring-Opening Polymerization: A Versatile Method for Nanoparticle Ordering," *Macromolecules* 35(22):8400-8404.
Chaim, R. et al. (2009). "Densification of Nanocrystalline $Y_2O_3$ Ceramic Powder by Spark Plasma Sintering," *Journal of European Ceramic Society* 29: 91-98.
Chau, J. K. H. et al. (2005). "Microwave Plasma Synthesis of Silver Nanopowders," *Materials Letters* 59: 905-908.
Chen, H.-S. et al. (Jul. 3, 2001). "On the Photoluminescence of Si Nanoparticles," *Mater. Phys. Mech.* 4:62-66.
Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.
Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.
Faber, K. T. et al. (Sep. 1988). "Toughening by Stress-Induced Microcracking in Two-Phase Ceramics," *Journal of the American Ceramic Society* 71: C-399-C401.
Fauchais, P. et al. (Jun. 1989). "La Projection Par Plasma: Une Revue," *Ann. Phys. Fr.* 14(3):261-310.
Fauchais, P. et al. (Jan. 1993). "Les Dépôts Par Plasma Thermique," *Revue Générale De L'Electricité*, RGE, Paris, France, No. 2, pp. 7-12 (in French).
Fauchais, P. et al. (Jan. 1996). "Plasma Spray: Study of the Coating Generation," *Ceramics International* 22(4):295-303.

(56) References Cited

OTHER PUBLICATIONS

Fojtik, A. et al. (Apr. 29, 1994). "Luminescent Colloidal Silicon Particles,"*Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:P9.1.1-P9.1.6.

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu—Bi Alloys Prepared by Co-Evaporation in a Continuous Gas Flow," NanoStructured Materials 7(6):605-610.

Kim, N. Y. et al. (Mar. 5, 1997). "Thermal Derivatization of Porous Silicon with Alcohols," *J. Am. Chem. Soc.* 1 19(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt—Rh Catalysts: I. Microstructural Characterization," *Journal of Catalysis* 154: 261-275.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by $HF-HNO_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Luo, J. et al. (2008). "Core/Shell Nanoparticles as Electrocatalysts for Fuel Cell Reactions," *Advanced Materials* 20: 4342-4347.

Mignard, D. et al. (2003). "Methanol Synthesis from Flue-Gas $CO_2$ and Renewable Electricity: A Feasibility Study," *International Journal of Hydrogen Energy* 28: 455-464.

Mühlenweg, H. et al. (2004). "Gas-Phase Reactions—Open Up New Roads to Nanoproducts," *Degussa ScienceNewsletter* No. 08, pp. 12-16.

Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.

Nasa (2009). "Enthalpy," Article located at http://www.grc.nasa.gov/WWW/K1212/airplane/enthalpy.htrnl, published by National Aeronautics and Space Administration on Nov. 23, 2009, 1 page.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.

"Plasma Spray and Wire Flame Spray Product Group," located at http://www.processmaterials.com/spray.html, published by Process Materials, Inc., last accessed Aug. 5, 2013, 2 pages.

"Platinum Group Metals: Annual Review 1996" (Oct. 1997). Engineering and Mining Journal, p. 63.

Rahaman, R. A. et al. (1995). "Synthesis of Powders," in *Ceramic Processing and Sintering.* Marcel Decker, Inc., New York, pp. 71-77.

Sailor, M. J. (1997). "Surface Chemistry of Luminescent Silicon Nanocrystallites," *Adv. Mater.* 9(10):783-793.

Schimpf, S. et al. (2002). "Supported Gold Nanoparticles: In-Depth Catalyst Characterization and Application in Hydrogenation and Oxidation Reactions," *Catalysis Today* 2592: 1-16.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Subramanian, S. et al. (1991). "Structure and Activity of Composite Oxide Supported Platinum-Iridium Catalysts," Applied Catalysts 74: 65-81.

Tao, Y.-T. (May 1993). "Structural Comparison of Self-Assembled Monolayers of n-Alkanoic Acids on the surfaces of Silver, Copper, and Aluminum," *J. Am. Chem. Soc.* 115(10):4350-4358.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.

Vardelle, A. et al. (1996). "Coating Generation: Vaporization of Particles in Plasma Spraying and Splat Formation," Universite de Limoges, 123 Avenue A. Thomas 87000, Limoges, France, Pure & Appl. Chem. 68(5):1093-1099.

Vardelle, M. et al. (Jun. 1991). "Experimental Investigation of Powder Vaporization in Thermal Plasma Jets," *Plasma Chemistry and Plasma Processing* 11(2):185-201.

Viswanathan, V. et al. (2006). "Challenges and Advances in Nanocomposite Processing Techniques," *Materials Science and Engineering* R 54: 121-285.

Wan, J. et al. (2005). "Spark Plasma Sintering of Silicon Nitride/Silicon Carbide Nanocomposites with Reduced Additive Amounts," *Scripta Materialia* 53: 663-667.

Yoshida, T. (1994). "The Future of Thermal Plasma Processing for Coating", *Pure & Appl. Chem.* 66(6):1223-1230.

Zou, J. et al. (Jun. 4, 2004). "Solution Synthesis of Ultrastable Luminescent Siloxane-Coated Silicon Nanoparticles," *Nano Letters* 4(7):1181-1186.

U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.

(56) References Cited

OTHER PUBLICATIONS

U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
Chemwatch (Aug. 2010). "Barium Acetate," *Santa Cruz Biotechnology, Inc.*, located at http://datasheets.scbt.com/sc-202968.pdf; 12 pages.
Yu, S. (2007). *Mechanistic Investigation of Nitrogen Oxide Storage and Reduction Catalyst*. University of South Carolina, pp. 53.

\* cited by examiner

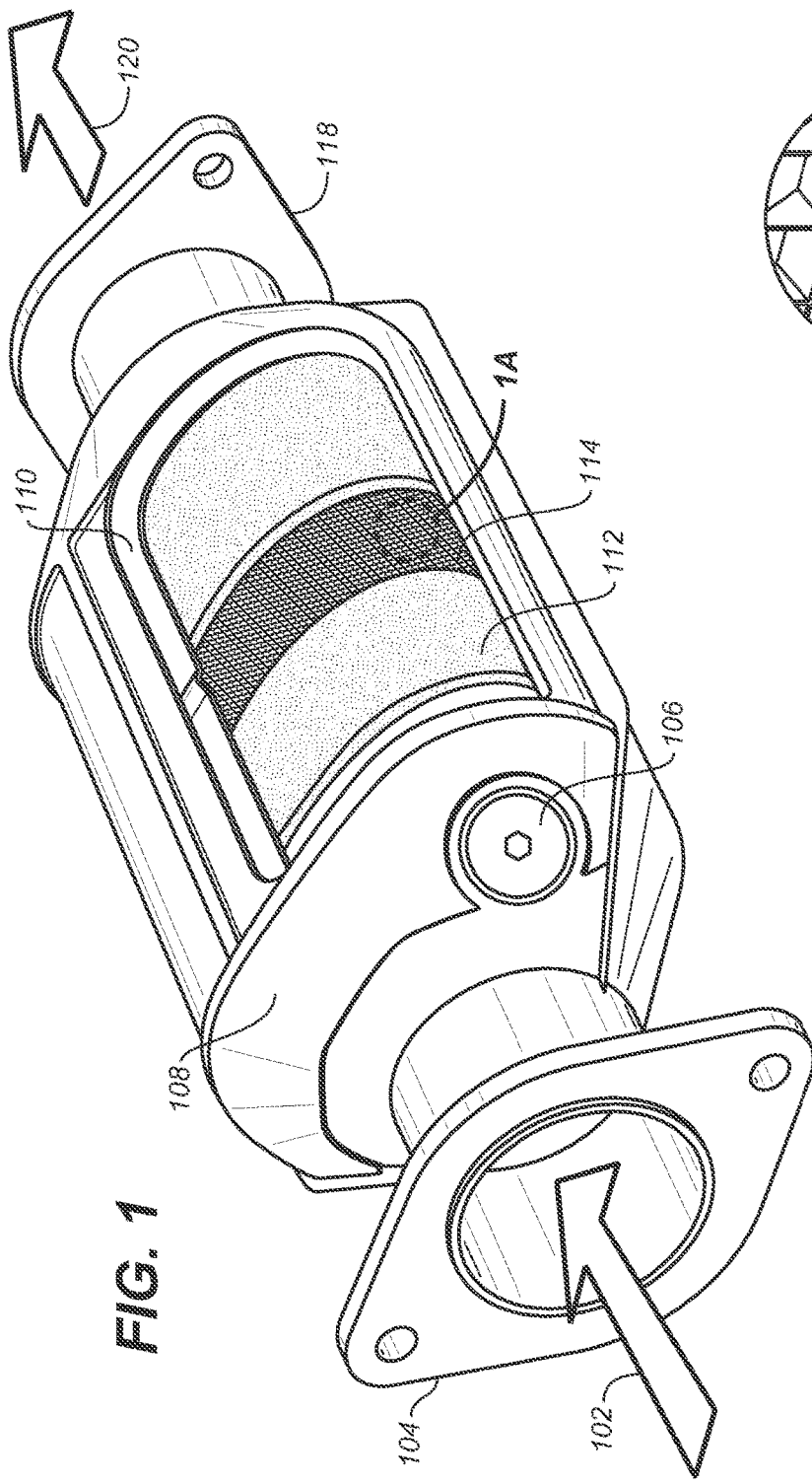
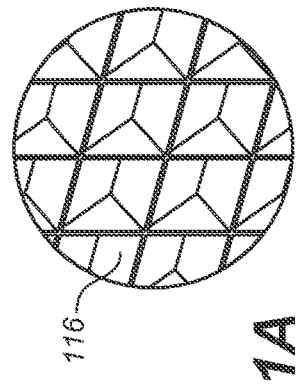

WASHCOATS AND COATED SUBSTRATES FOR CATALYTIC CONVERTERS AND METHODS OF MAKING AND USING SAME

CROSS-REFERENCE TO RELATED APPLICATIONS

This application claims priority benefit of U.S. Provisional Patent Application No. 61/858,551 filed Jul. 25, 2013. The entire contents of that application are hereby incorporated by reference herein.

FIELD OF THE INVENTION

The present invention relates to the field of catalysts. More specifically, the present invention relates to nanoparticle catalysts, catalytic converter washcoats, and catalytic converters formed from such washcoats.

BACKGROUND OF THE INVENTION

A significant portion of pollutant gases emitted by internal combustion engines are produced when the engine is initially started ("cold-start"), but before the catalytic converter in the emissions system has warmed up to its operating temperature. In order to reduce harmful emissions during the cold-start phase, such as that of a light-duty diesel vehicle (for example, an automobile or light truck), washcoats that contain zeolites can be used to coat the substrate used in the catalytic converter of the vehicle. These zeolites act as a temporary storage area for the pollutants carbon monoxide (CO), hydrocarbons (HC), and nitrogen oxides ($NO_x$) during the cold-start period, when the catalytic converter is still cold. After the catalytic converter heats up to its operating temperature, known as the light-off temperature, the stored gases are released and subsequently decomposed by the catalytically active material on the substrate.

A high light-off temperature is undesirable, as many vehicular trips are of short duration, and during the time required for the catalytic converter to reach its operating temperature (that is, the light-off temperature), pollutants must either be released untreated to the environment, or stored in the exhaust system until the light-off temperature is reached. Even if pollutants are trapped effectively prior to light-off, the catalytic converter may not reach operating temperature if multiple successive short trips are made, and the zeolites used for storage may become saturated, again resulting in release of pollutants to the environment.

Commercially available catalytic converters use platinum group metal (PGM) catalysts deposited on substrates by wet chemistry methods, such as precipitation of platinum ions and/or palladium ions from solution onto a substrate. These PGM catalysts are a considerable portion of the cost of catalytic converters. Accordingly, any reduction in the amount of PGM catalysts used to produce a catalytic converter is desirable. Commercially available catalytic converters also display a phenomenon known as "aging," in which they become less effective over time; the light-off temperature starts to rise as the catalytic converter ages, and emission levels also start to rise. Accordingly, reduction of the aging effect is also desirable, in order to prolong the efficacy of the catalytic converter for controlling emissions.

SUMMARY OF THE INVENTION

The disclosed catalysts and washcoats may provide, among other advantages, catalytic converters with significantly reduced light-off temperatures, especially in comparison to aged commercially available catalysts prepared using only wet-chemistry methods, while using the same amount or less of platinum group metal. Alternatively, the described catalysts and washcoats may reduce the amount of platinum group metal used to attain the same light-off temperature as aged commercially available catalysts prepared using only wet-chemistry methods. Thus, improved performance of the emission control system (that is, reduced emissions of one or more regulated pollutant), and/or reduced cost of the emission control system may be attained, as compared to catalytic converters prepared using only the previous wet-chemistry methods.

As described herein, catalytic converters having a reduced light-off temperature and/or reduced platinum group metal loading requirements may be produced by utilizing catalytically active powder comprising one or more plasma-generated catalyst components, and by separating the catalytically active powder comprising one or more plasma-generated catalyst components from the high concentration of zeolites, wherein the high concentration of zeolites is in a different coating layer than the catalytically active powder comprising one or more plasma-generated catalyst components. One embodiment, for example, is a multi-layer washcoat wherein the high concentration of zeolites is used in a first coating layer, while the catalytically active powder comprising one or more plasma-generated catalyst components is used in a second coating layer. Optionally, a corner-fill washcoat is applied to the substrate prior to application of subsequent washcoats.

In some embodiments, the invention comprises a coated substrate comprising a substrate; a washcoat layer comprising zeolite particles; and a washcoat layer comprising catalytically active particles comprising one or more plasma-generated catalyst components; wherein the catalytically active particles comprise composite nanoparticles bonded to micron-sized carrier particles, and the composite nanoparticles comprise a support nanoparticle and a catalytic nanoparticle. The composite nanoparticle can be plasma-generated, that is, produced by a plasma process. In another embodiment of the coated substrate, the washcoat layer comprising zeolite particles is formed on top of the washcoat layer comprising catalytically active particles comprising one or more plasma-generated catalyst components. In another embodiment of the coated substrate, the washcoat layer comprising catalytically active particles comprising one or more plasma-generated catalyst components is formed on top of the washcoat layer comprising zeolite particles. In any of the foregoing embodiments of the coated substrate, the catalytic nanoparticles comprising one or more plasma-generated catalyst components comprise at least one platinum group metal. In any of the foregoing embodiments of the coated substrate, the catalytic nanoparticles comprising one or more plasma-generated catalyst components can comprise platinum and palladium, such as platinum and palladium in a weight ratio from 8:1 to 1:1 platinum:palladium. In any of the foregoing embodiments of the coated substrate, the catalytic nanoparticles comprising one or more plasma-generated catalyst components can comprise platinum and palladium, such as platinum and palladium in a weight ratio from 7:1 to 2:1 platinum:palladium. In any of the foregoing embodiments of the coated substrate, the catalytic nanoparticles comprising one or more plasma-generated catalyst components can comprise platinum and palladium, such as platinum and palladium in a weight ratio from 6:1 to 3:1 platinum:palladium. In any of the foregoing embodiments of the coated substrate, the catalytic nanoparticles comprising one or more plasma-generated catalyst components can comprise platinum and palladium, such as platinum and palladium in a weight ratio from 5:1 to 3.5:1 platinum:palladium. In any of the foregoing embodiments of the coated substrate, the catalytic nanoparticles comprising one or more plasma-generated catalyst components can comprise platinum and palladium, such as platinum and palladium in a weight ratio of 4:1 platinum:palladium. An increase in the ratio of platinum to palladium is advantageous for the oxidation of NO to $NO_2$. In any of the foregoing embodiments of the coated substrate, the support nanoparticles can have an average diameter of 10 nm to 20 nm. In any of the foregoing embodiments of the coated substrate, the catalytic nanoparticles can have an average diameter of between 1 nm and 5 nm.

In any of the foregoing embodiments of the coated substrate, the washcoat layer can comprise zeolite particles comprising metal-oxide particles and boehmite particles. In any of the foregoing embodiments of the coated substrate, the metal-oxide particles can be aluminum-oxide particles. In any of the foregoing embodiments of the coated substrate, the zeolite particles can comprise 60% to 80% by weight of the mixture of zeolite particles, metal-oxide particles, and boehmite particles in the washcoat layer comprising zeolite particles. In any of the foregoing embodiments of the coated substrate, the boehmite particles can comprise 2% to 5% by weight of the mixture of zeolite particles, metal-oxide particles, and boehmite particles in the washcoat layer comprising zeolite particles. In any of the foregoing embodiments of the coated substrate, the metal-oxide particles can comprise 15% to 38% by weight of the mixture of zeolite particles, metal-oxide particles, and boehmite particles in the washcoat layer comprising zeolite particles. In any of the foregoing embodiments of the coated substrate, the washcoat layer comprising zeolite particles can comprise iron-exchanged zeolite particles. Iron-exchanged zeolite particles are typically prepared by cation-exchange of the zeolite material with an iron salt, such as an iron (III) salt or iron (II) salt, in aqueous solution. The weight percentage of iron can be determined by atomic absorption spectroscopy or other analytical methods. The presence of iron in zeolite particles provides beneficial cold-start characteristics. In particular, the inclusion of iron in the zeolite material provides for improved adsorption of hydrocarbons. Accordingly, catalytic converters comprised of iron-exchanged zeolite display improved temporary storage of pollutants prior to reaching the light-off temperature. In any of the foregoing embodiments of the coated substrate, the iron-exchanged zeolite particles in the washcoat layer can comprise 0.5-15% of iron by weight. In any of the foregoing embodiments of the coated substrate, the iron-exchanged zeolite particles in the washcoat layer can comprise 1-10% of iron by weight. In any of the foregoing embodiments of the coated substrate, the iron-exchanged zeolite particles in the washcoat layer can comprise 2-5% of iron by weight. In any of the foregoing embodiments of the coated substrate, the iron-exchanged zeolite particles in the washcoat layer can comprise 3% of iron by weight. In any of the foregoing embodiments of the coated substrate, the washcoat layer comprising zeolite particles does not include or is substantially free of platinum group metals. In any of the foregoing embodiments of the coated substrate, the washcoat layer comprising zeolite particles can alternatively further comprise palladium. The inclusion of palladium in the zeolite particles is advantageous as Pd is believed to oxidize hydrocarbons more readily than Pt, and locating the Pd as close to the zeolite-adsorbed hydrocarbons promotes interaction of the Pd catalyst and reactant. In any of the foregoing embodiments of the coated substrate, the zeolite particles in the washcoat layer can have a diameter of 0.2 microns to 8 microns. In any of the foregoing embodiments of the coated substrate, the washcoat layer comprising catalytically active particles comprising one or more plasma-generated catalyst components can further comprise boehmite particles and silica particles.

In any of the foregoing embodiments of the coated substrate, the washcoat layer comprising catalytically active particles comprising one or more plasma-generated catalyst components can be substantially free of zeolites. In any of the foregoing embodiments of the coated substrate, the catalytically active particles comprising one or more plasma-generated catalyst components can comprise 35% to 95% by weight of the combination of the catalytically active particles, boehmite particles, and silica particles in the washcoat layer comprising catalytically active particles comprising one or more plasma-generated catalyst components. In any of the foregoing embodiments of the coated substrate, the silica particles can be present in an amount up to 20% by weight of the combination of the catalytically active particles, boehmite particles, and silica particles in the washcoat layer comprising catalytically active particles comprising one or more plasma-generated catalyst components. In any of the foregoing embodiments of the coated substrate, the boehmite particles comprise 2% to 5% by weight of the combination of the catalytically active particles, the boehmite particles, and the silica particles in the washcoat layer comprising catalytically active particles comprising one or more plasma-generated catalyst components. In one embodiment of the coated substrate, the washcoat layer comprising catalytically active particles comprising one or more plasma-generated catalyst components comprises 92% by weight of the catalytically active particles, 3% by weight of the boehmite particles, and 5% by weight of the silica particles.

In any of the foregoing embodiments of the coated substrate, the substrate comprises cordierite. The substrate can comprise a honeycomb structure. In any of the foregoing embodiments of the coated substrate, the washcoat layer comprising zeolite particles can have a thickness of 25 g/l to 90 g/l. In any of the foregoing embodiments of the coated substrate, the washcoat layer comprising catalytically active particles comprising one or more plasma-generated catalyst components can have a thickness of 50 g/l to 250 g/l. Any of the foregoing embodiments of the coated substrate can further comprise a corner-fill layer deposited directly on the substrate.

In any of the foregoing embodiments of the coated substrate, the coated substrate can have a platinum group metal loading of 4 g/l or less and a light-off temperature for carbon monoxide at least 5° C. lower than the light-off temperature of a substrate with the same platinum group metal loading deposited using only wet-chemistry methods. In any of the foregoing embodiments of the coated substrate, the coated substrate has a platinum group metal loading of about 3.0 g/l to about 4.0 g/l.

In any of the foregoing embodiments of the coated substrate, the coated substrate can have a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals using only wet chemical methods having the same platinum group metal loading after 125,000 miles of operation in a vehicular catalytic converter. In any of the foregoing embodiments of the coated substrate, the coated substrate can have a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals using only wet chemical methods having the same platinum group metal loading after aging for 16 hours at 800° C.

In some embodiments, the invention comprises a catalytic converter comprising a coated substrate according to any of the foregoing embodiments. In further embodiments, the invention comprises an exhaust treatment system comprising a conduit for exhaust gas and a catalytic converter comprising a coated substrate according to any of the foregoing embodiments. In further embodiments, the invention comprises a diesel vehicle comprising a catalytic converter comprising a coated substrate according to any of the foregoing embodiments. The diesel vehicle can be a light-duty diesel vehicle.

In some embodiments, the invention comprises a method of treating an exhaust gas, where the method comprises contacting the coated substrate of any of the foregoing embodiments with the exhaust gas. The substrate can be housed within a catalytic converter configured to receive the exhaust gas.

In some embodiments, the invention comprises a method of forming a coated substrate, the method comprising a) coating a substrate with a washcoat composition comprising zeolite particles; and b) coating the substrate with a washcoat composition comprising catalytically active particles comprising one or more plasma-generated catalyst components; the catalytically active particles comprises composite nanoparticles which are bonded to micron-sized carrier particles, said composite nanoparticles comprising a support nanoparticle and a catalytic nanoparticle, and said composite nanoparticles being generated by a plasma process. The step of coating the substrate with the washcoat layer comprising zeolite particles can be performed before coating the substrate with the washcoat layer comprising catalytically active particles comprising one or more plasma-generated catalyst components, or the step of coating the substrate with the washcoat layer comprising catalytically active particles comprising one or more plasma-generated catalyst components can be performed before coating the substrate with the washcoat layer comprising zeolite particles. Any of the foregoing methods can additionally comprise the step of coating the substrate with a corner-fill washcoat prior to both step a) and step b). In some embodiments of any of the foregoing methods, the washcoat composition comprising zeolite particles comprises a thickness of 25 g/l to 90 g/l. In some embodiments of any of the foregoing methods, the washcoat composition comprising catalytically active particles comprising one or more plasma-generated catalyst components comprises a thickness of 50 g/l to 250 g/l.

In some embodiments, the invention comprises a washcoat composition comprising a solids content of 35% to 95% by weight of catalytically active particles comprising one or more plasma-generated catalyst components, said catalytically active particles comprising composite nanoparticles bonded to micron-sized carrier particles, the composite nanoparticles comprise a support nanoparticle and a catalytic nanoparticle and produced by a plasma process; 2% to 5% by weight of boehmite particles; and 2% to 55% by weight of metal-oxide particles. In additional embodiments, the washcoat composition can further comprise up to 20% by weight of silica particles. In any of the foregoing embodiments of the washcoat composition, the metal oxide particles can be aluminum oxide particles. In any of the foregoing embodiments of the washcoat composition, the solids can be suspended in an aqueous medium at a pH between 3 and 5. In any of the foregoing embodiments of the washcoat composition, the washcoat composition can be substantially free of zeolites. In any of the foregoing embodiments of the washcoat composition, the catalytically active particles comprising one or more plasma-generated catalyst components can comprise 92% by weight of the solids content. In any of the foregoing embodiments of the washcoat composition, the catalytically active particles comprising one or more plasma-generated catalyst components can comprise at least one platinum group metal, such as platinum and palladium, such as platinum and palladium in a 4:1 Pt/Pd weight/weight ratio. In further embodiments of the invention, the invention comprises a coated substrate comprising a washcoat according to any of the foregoing embodiments. In further embodiments, the coated substrate also comprises a washcoat layer comprising zeolite particles.

In some embodiments, the invention comprises a method of forming a coated substrate, the method comprising a) coating a substrate with a washcoat composition comprising zeolite particles; and b) coating the substrate with a washcoat composition comprising catalytically active particles comprising one or more plasma-generated catalyst components according to any of the foregoing embodiments of the washcoat compositions. In one embodiment of the method, coating the substrate with the washcoat layer comprising zeolite particles is performed before coating the substrate with the washcoat layer comprising catalytically active particles comprising one or more plasma-generated catalyst components. In another embodiment of the method, coating the substrate with the washcoat layer comprising catalytically active particles comprising one or more plasma-generated catalyst components is performed before coating the substrate with the washcoat layer comprising zeolite particles. Any of the foregoing embodiments of the method can further comprise the step of coating the substrate with a corner-fill washcoat prior to both step a) and step b). In any of the foregoing embodiments of the method, the washcoat composition comprising zeolite particles can comprise a thickness of 25 g/l to 90 g/l. In any of the foregoing embodiments of the method, the washcoat composition comprising catalytically active particles comprising one or more plasma-generated catalyst components can comprise a thickness of 50 g/l to 250 g/l.

In further embodiments, the invention comprises a catalytic converter comprising a coated substrate according to any of the foregoing embodiments of the coated substrate. In further embodiments, the invention comprises an exhaust treatment system comprising a conduit for exhaust gas and a catalytic converter comprising a coated substrate according to any of the foregoing embodiments of the coated substrate.

In further embodiments, the invention comprises a diesel vehicle comprising a catalytic converter comprising a coated substrate according to any of the foregoing embodiments of the coated substrate, such as a light-duty diesel vehicle.

In further embodiments, the invention comprises a diesel vehicle comprising a catalytic converter comprising between 3.0 g/l and 4.0 g/l of platinum group metal, wherein the vehicle complies with the European emission standard Euro 5. The diesel vehicle can be a light-duty diesel vehicle. In further embodiments, the invention comprises a diesel vehicle comprising a catalytic converter comprising between 3.0 g/l and 4.0 g/l of platinum group metal, wherein the vehicle complies with the European emission standard Euro 6. The diesel vehicle can be a light-duty diesel vehicle. In further embodiments of any of the foregoing embodiments of the vehicles, the catalytically active material comprising one or more plasma-generated catalyst components in the catalytic converter comprises composite nanoparticles bonded to micron-sized carrier particles, and the composite nanoparticles comprise a support nanoparticle and a catalytic nanoparticle; the composite nanoparticles can be generated by a plasma process. In further embodiments of any of the foregoing embodiments of the vehicles, the catalytic converter comprises a coated substrate, said coated substrate having a washcoat comprising zeolite particles and a separate washcoat comprising the catalytically active material comprising one or more plasma-generated catalyst components.

In further embodiments of any of the foregoing embodiments of the vehicles, the catalytic converter comprises a coated substrate comprising a substrate; a washcoat layer comprising zeolite particles; and a washcoat layer comprising catalytically active particles comprising one or more plasma-generated catalyst components; wherein the catalytically active particles comprising one or more plasma-generated catalyst components comprise composite nanoparticles bonded to micron-sized carrier particles, and the composite nanoparticles comprise a support nanoparticle and a catalytic nanoparticle; the composite nanoparticles can be plasma-generated nanoparticles. In one embodiment of any of the foregoing embodiments of the vehicles, the washcoat layer comprising zeolite particles is formed on top of the washcoat layer comprising catalytically active particles comprising one or more plasma-generated catalyst components. In one embodiment of any of the foregoing embodiments of the vehicles, the washcoat layer comprising catalytically active particles comprising one or more plasma-generated catalyst components is formed on top of the washcoat layer comprising zeolite particles. In further embodiments of any of the foregoing embodiments of the vehicles, the catalytic nanoparticles comprising one or more plasma-generated catalyst components can comprise at least one platinum group metal. In further embodiments of any of the foregoing embodiments of the vehicles, the catalytic nanoparticles comprising one or more plasma-generated catalyst components can comprise platinum and palladium, such as platinum and palladium in a weight ratio of 4:1 platinum:palladium. In further embodiments of any of the foregoing embodiments of the vehicles, the support nanoparticles have an average diameter of 10 nm to 20 nm. In further embodiments of any of the foregoing embodiments of the vehicles, the catalytic nanoparticles have an average diameter of between 1 nm and 5 nm. In further embodiments of any of the foregoing embodiments of the vehicles, the washcoat layer comprising zeolite particles can comprise metal-oxide particles and boehmite particles. In further embodiments of any of the foregoing embodiments of the vehicles, the metal-oxide particles can be aluminum-oxide particles. In further embodiments of any of the foregoing embodiments of the vehicles, the zeolite particles can comprise 60% to 80% by weight of the mixture of zeolite particles, metal-oxide particles, and boehmite particles in the washcoat layer comprising zeolite particles. In further embodiments of any of the foregoing embodiments of the vehicles, the boehmite particles can comprise 2% to 5% by weight of the mixture of zeolite particles, metal-oxide particles, and boehmite particles in the washcoat layer comprising zeolite particles. In further embodiments of any of the foregoing embodiments of the vehicles, the metal-oxide particles can comprise 15% to 38% by weight of the mixture of zeolite particles, metal-oxide particles, and boehmite particles in the washcoat layer comprising zeolite particles. In further embodiments of any of the foregoing embodiments of the vehicles, the washcoat layer comprising zeolite particles is comprised of iron-exchanged zeolite particles. In further embodiments of any of the foregoing embodiments of the vehicles, the washcoat layer comprising zeolite particles does not include platinum group metals, while in alternative embodiments of any of the foregoing embodiments of the vehicles, the washcoat layer comprising zeolite particles can include palladium. In further embodiments of any of the foregoing embodiments of the vehicles where the washcoat layer comprising zeolite particles can include palladium, the washcoat layer comprising zeolite particles is comprised of iron-exchanged zeolite particles and palladium. In further embodiments of any of the foregoing embodiments of the vehicles, the zeolite particles in the washcoat layer comprising zeolite particles can have a diameter of 0.2 microns to 8 microns. In further embodiments of any of the foregoing embodiments of the vehicles, the washcoat layer comprising catalytically active particles comprising one or more plasma-generated catalyst components can further comprise boehmite particles and silica particles. In further embodiments of any of the foregoing embodiments of the vehicles, the catalytically active particles comprising one or more plasma-generated catalyst components can comprise 35% to 95% by weight of the combination of the catalytically active particles, boehmite particles, and silica particles in the washcoat layer comprising catalytically active particles comprising one or more plasma-generated catalyst components. In further embodiments of any of the foregoing embodiments of the vehicles, the silica particles can be present in an amount up to 20% by weight of the combination of the catalytically active particles, boehmite particles, and silica particles in the washcoat layer comprising catalytically active particles comprising one or more plasma-generated catalyst components. In further embodiments of any of the foregoing embodiments of the vehicles, the boehmite particles can comprise 2% to 5% by weight of the combination of the catalytically active particles, the boehmite particles, and the silica particles in the washcoat layer comprising catalytically active particles comprising one or more plasma-generated catalyst components. In further embodiments of any of the foregoing embodiments of the vehicles, the washcoat layer can comprise catalytically active particles comprising one or more plasma-generated catalyst components, which layer comprises 92% by weight of the catalytically active particles, 3% by weight of the boehmite particles, and 5% by weight of the silica particles. In further embodiments of any of the foregoing embodiments of the vehicles, the substrate can comprise cordierite. In further embodiments of any of the foregoing embodiments of the vehicles, the substrate can comprise a honeycomb structure. In further embodiments of any of the foregoing embodiments of the vehicles, the washcoat layer comprising zeolite particles can have a thickness of 25 g/l to 90 g/l. In further embodiments of any of the foregoing embodiments of the vehicles, the washcoat layer comprising catalytically active particles comprising one or more plasma-generated catalyst components can have a thickness of 50 g/l to 250 g/l. Any of the foregoing embodiments of the vehicles can further comprise a corner-fill layer deposited directly on the substrate.

It is understood that aspects and embodiments of the invention described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

Any of the embodiments described above and herein are suitable for use in diesel engines, such as light-duty diesel engines, and diesel vehicles, such as light-duty diesel vehicles.

The systems, compositions, substrates, and methods described herein, including any embodiment of the invention as described herein, may be used alone or may be used in combination with other systems, compositions, substrates, and methods.

BRIEF DESCRIPTION OF THE DRAWINGS

FIG. 1 illustrates a catalytic converter in accordance with some embodiments of the present invention, while FIG. 1A is a magnified view of a portion of the drawing of FIG. 1.

DETAILED DESCRIPTION OF THE INVENTION

Figure 2:
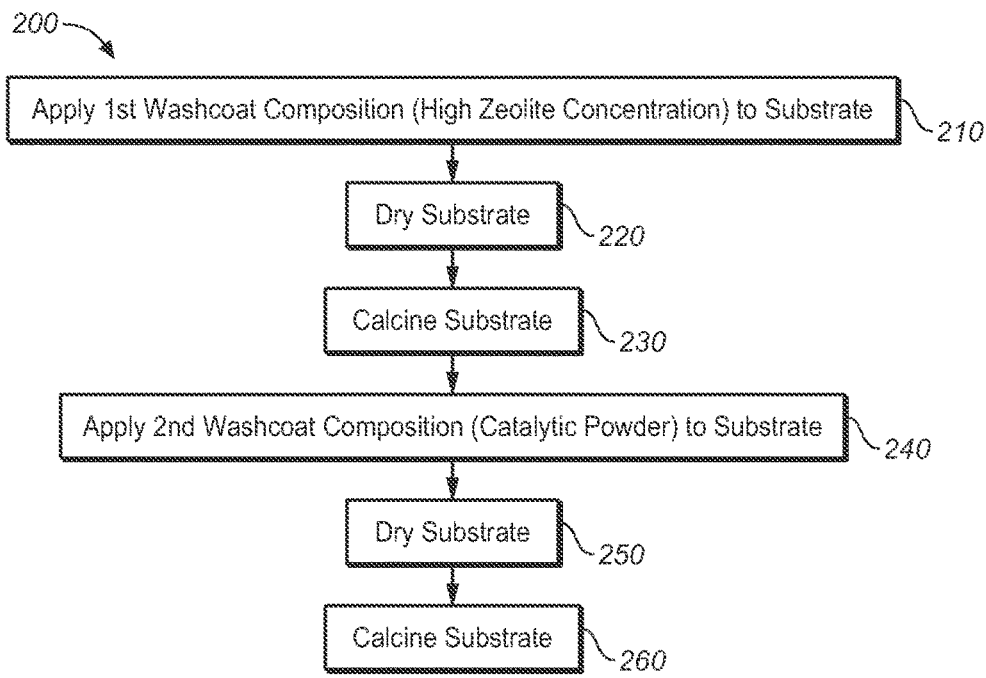
FIG. 2 illustrates a method of forming a coated substrate in accordance with some embodiments of the present invention.

Described are composite nanoparticle catalysts, washcoat formulations, coated substrates, and catalytic converters. Also described are methods of making and using these composite nanoparticle catalysts, washcoat formulations, coated substrates, and catalytic converters. The invention also embraces catalyst-containing washcoat compositions, and methods of making the washcoats by combining the various washcoat ingredients. It has been found that the described composite nanoparticle catalysts and washcoat solutions provide for increased performance relative to prior catalysts and washcoat formulations when used to produce catalytic converters, allowing for the production of catalytic converters having reduced light-off temperatures, reduced emissions, and/or reduced platinum group metal loading requirements, as compared to catalytic converters having catalysts prepared using only wet-chemistry methods.

It is understood that the coated substrates described herein, catalytic converters using the coated substrates described herein, and exhaust treatment systems using the coated substrates described herein, are particularly useful for diesel engines and diesel vehicles, especially light-duty diesel engines and light-duty diesel vehicles.

Composite nanoparticles may include catalytic nanoparticles and support nanoparticles that are bonded together to form nano-on-nano composite nano particles. These composite nano particles may then be bonded to a micron-sized carrier particle to form micron-sized catalytically active particles. The composite nanoparticles may be produced, for example, in a plasma reactor in such a way that consistent nano-on-nano composite particles are produced. These composite particles are then bonded to micron-sized carrier particles to produce micron-sized catalytically active particles bearing composite nanoparticles, which may offer better initial (engine start-up) performance, better performance over the lifetime of the catalyst, and/or less reduction in performance over the life of the catalyst as compared to previous catalysts used in catalytic converters, such as catalysts prepared using wet-chemistry methods. Individual composite nanoparticles bonded to micron-sized carrier particles can be comprised of a single platinum group metal or multiple platinum group metals. Composite nanoparticles bonded to micron-sized carrier particles where the composite nanoparticles are comprised of multiple platinum group metals, may be present together with composite nanoparticles bonded to micron-sized carrier particles where the composite nanoparticles are comprised of a single platinum group metal. The previously described micron-sized carriers bonded to composite nanoparticles, where the composite nanoparticles are produced in a plasma reactor, are an example of "catalytically active powder comprising one or more plasma-generated catalyst components" as used herein.

Further, the washcoat formulations may be formulated in order to provide one or more layers on a catalyst substrate, such as a catalytic converter substrate. In some embodiments, the washcoat formulations may form two or more layers in which catalytically active material comprising one or more plasma-generated catalyst components, such as micron-sized catalytically active particles bearing plasma-generated composite nano particles, are in a separate layer than a layer containing a high concentration of zeolites. One embodiment, for example, is a multi-layer washcoat in which a first washcoat layer includes a relatively higher concentration of zeolites and a second, distinct washcoat layer includes a higher concentration of catalytically active material comprising one or more plasma-generated catalyst components relative to the first layer. Preferably, the layer with the catalytically active material comprising one or more plasma-generated catalyst components includes no zeolites. The order and placement of these two layers on a substrate may be changed in different embodiments and, in further embodiments, additional washcoat formulations/layers may also be used over, under, or between the washcoats, for example, a corner-fill washcoat layer which is initially deposited on the substrate to be coated. In other embodiments, the two layers can be directly disposed on each other, that is, there are no intervening layers between the first and second washcoat layers. The described washcoat formulations may include a lower amount of platinum group metals and/or offer better performance when compared to previous washcoat formulations, particularly when these washcoat formulations utilize the micron-sized particles bearing plasma-generated composite nanoparticles.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. Additionally, it is contemplated that certain method steps can be performed in alternative sequences to those disclosed in the flowcharts.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

By "substantial absence of any platinum group metals" is meant that less than about 5%, less than about 2%, less than about 1%, less than about 0.5%, less than about 0.1%, less than about 0.05%, less than about 0.025%, or less than about 0.01% of platinum group metals are present by weight. Preferably, substantial absence of any platinum group metals indicates that less than about 1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication, or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, substantially each" of a specific component, a specific composition, a specific compound, or a specific ingredient is meant that at least about 99% of the specific component, the specific composition, the specific compound, or the specific ingredient is present by number or by weight.

This disclosure provides several embodiments. It is contemplated that any features from any embodiment can be combined with any features from any other embodiment. In this fashion, hybrid configurations of the disclosed features are within the scope of the present invention.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

This disclosure refers to both particles and powders. These two terms are equivalent, except for the caveat that a singular "powder" refers to a collection of particles. The present invention can apply to a wide variety of powders and particles. The terms "nanoparticle" and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. Preferably, the nanoparticles have an average grain size less than 250 nanometers and an aspect ratio between one and one million. In some embodiments, the nanoparticles have an average grain size of about 50 nm or less, about 30 nm or less, or about 20 nm or less. In additional embodiments, the nanoparticles have an average diameter of about 50 nm or less, about 30 nm or less, or about 20 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nanoparticles have a grain size of about 50 nm or less, about 30 nm or less, or about 20 nm or less. In additional embodiments, the nanoparticles have a diameter of about 50 nm or less, about 30 nm or less, or about 20 nm or less.

The terms "micro-particle," "micro-sized particle" "micron-particle," and "micron-sized particle" are generally understood to encompass a particle on the order of micrometers in diameter, typically between about 0.5 µm to 1000 µm, about 1 µm to 1000 µm, about 1 µm to 100 µm, or about 1 µm to 50 µm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

Composite Nanoparticle Catalyst

A composite nanoparticle catalyst may include a catalytic nanoparticle attached to a support nanoparticle to form a "nano-on-nano" composite nanoparticle. The composite nanoparticles can be produced by a plasma-based method, such as by vaporizing the catalytic material and support material in a plasma gun or plasma chamber, and then condensing the plasma into nanoparticles. Multiple nano-on-nano particles may then be bonded to a micron-sized carrier particle to form a composite micro/nanoparticle, that is, a micro-particle bearing composite nanoparticles. These composite micro/nanoparticles may be used in washcoat formulations and catalytic converters as described herein. A micron-sized carrier particle (which can be produced by any method, such as plasma, wet chemistry, milling, or other methods) combined with composite nanoparticles that are generated by plasma methods is an example of catalytically active particles comprising one or more plasma-generated catalyst components. (In the preceding example, both the support nanoparticle and catalytic nanoparticle of the composite nanoparticle are plasma generated, which meets the criterion of comprising one or more plasma-generated catalytic components.) Composite micro/nanoparticles of different compositions may be present in a single washcoat layer. The use of these particles can reduce requirements for platinum group metal content and/or significantly enhance performance, particularly in terms of reduced light-off temperature, as compared with currently available commercial catalytic converters prepared by wet-chemistry methods. The wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to alumina micro-particles, followed by drying and calcining, resulting in precipitation of platinum onto the alumina. The platinum group metals deposited by wet-chemical methods onto metal oxide supports, such as alumina, are mobile at high temperatures, such as temperatures encountered in catalytic converters. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal catalysts are prepared by plasma-based methods. In one embodiment, the platinum group nano size metal particle is deposited on a nano sized metal oxide support, which has much lower mobility than the PGM deposited by wet chemistry methods. The resulting plasma-produced catalysts age at a much slower rate than the wet-chemistry produced catalysts. Thus, catalytic converters using plasma-produced catalysts can maintain a larger surface area of exposed catalyst to gases emitted by the engine over a longer period of time, leading to better emissions performance.

Production of Composite Nanoparticles by Plasma-Based Methods ("Nano-on-Nano" Particles or "NN" Particles)

The initial step in producing suitable catalysts may involve producing composite nanoparticles. The composite nanoparticles comprise a catalytic nanoparticle comprising one or more platinum group metals, and a support nanoparticle, typically a metal oxide such as aluminum oxide. As the name "nanoparticle" implies, the nanoparticles have sizes on the order of nanometers.

The composite nanoparticles may be formed by plasma reactor methods, by feeding platinum group metal(s) and support material into a plasma gun, where the materials are vaporized. Plasma guns such as those disclosed in US 2011/0143041 can be used, and techniques such as those disclosed in U.S. Pat. Nos. 5,989,648, 6,689,192, 6,755,886, and US 2005/0233380 can be used to generate plasma. A working gas, such as argon, is supplied to the plasma gun for the generation of plasma; in one embodiment, an argon/hydrogen mixture (in the ratio of 10:2 $Ar/H_2$) is used as the working gas. The platinum group metal or metals, such as platinum, palladium, or platinum/palladium in any ratio, such as 4:1 platinum:palladium by weight, or about 4:1 platinum:palladium by weight, and which are generally in the form of metal particles of about 0.5 to 6 microns in diameter, can be introduced into the plasma reactor as a fluidized powder in a carrier gas stream such as argon. Metal oxide, typically aluminum oxide in a particle size of about 15 to 25 microns diameter, is also introduced as a fluidized powder in carrier gas. However, other methods of introducing the materials into the reactor can be used, such as in a liquid slurry. A composition of about 35% to 45% platinum group metal(s) and about 65% to 55% metal oxide (by weight) is typically used, preferably a ratio of about 40% platinum group metal(s) to about 60% metal oxide. Examples of ranges of materials that can be used are from about 0% to about 40% platinum, about 0% to about 40% palladium, and about 55% to about 65% aluminum oxide; in some embodiments, from about 20% to about 30% platinum, about 10% to about 15% palladium, and about 50% to about 65% aluminum oxide are used; in further embodiments, from about 23.3% to about 30% platinum, about 11.7% to about 15% palladium, and about 55% to about 65% aluminum oxide are used. An exemplary composition contains about 26.7% platinum, about 13.3% palladium, and about 60% aluminum oxide. Any solid or liquid materials are rapidly vaporized or turned into plasma. The kinetic energy of the superheated material, which can reach temperatures of 20,000 to 30,000 Kelvin, ensures extremely thorough mixing of all components.

The superheated material of the plasma stream is then quenched rapidly, using such methods as the turbulent quench chamber disclosed in US 2008/0277267. Argon quench gas at high flow rates, such as 2400 to 2600 liters per minute, is injected into the superheated material. The material is further cooled in a cool-down tube, and collected and analyzed to ensure proper size ranges of material.

The plasma production method described above produces highly uniform composite nanoparticles, where the composite nanoparticles comprise a catalytic nanoparticle bonded to a support nanoparticle. The catalytic nanoparticle comprises the platinum group metal or metals, such as Pt:Pd in a 4:1 ratio by weight. In some embodiments, the catalytic nanoparticles have an average diameter or average grain size between approximately 0.3 nm and approximately 10 nm, preferably between approximately 1 nm to approximately 5 nm, that is, approximately 3 nm +/−2 nm. In some embodiments, the support nanoparticles, comprising the metal oxide such as aluminum oxide, have an average diameter of approximately 20 nm or less, or approximately 15 nm or less, or between approximately 10 nm and approximately 20 nm, that is, approximately 15 nm +/−5 nm, or between approximately 10 nm and approximately 15 nm, that is, approximately 12.5 nm +/−2.5 nm. In some embodiments, the support nanoparticles, comprising the metal oxide such as aluminum oxide, have a diameter of approximately 20 nm or less, or approximately 15 nm or less, or between approximately 10 nm and approximately 20 nm, that is, approximately 15 nm +/−5 nm, or between approximately 10 nm and approximately 15 nm, that is, approximately 12.5 nm +/−2.5 nm.

The Pt/Pd-alumina composite nanoparticles, when produced under reducing conditions, such as by using argon/hydrogen working gas, results in a partially reduced alumina surface on the support nanoparticle to which the PGM nanoparticle is bonded, as described in US 2011/0143915 at paragraphs 0014-0022. The partially reduced alumina surface, or $Al_2O_{(3-x)}$ where x is greater than zero, but less than three, inhibits migration of the platinum group metal on the alumina surface at high temperatures. This in turn limits the agglomeration of platinum group metal when the particles are exposed to prolonged elevated temperatures. Such agglomeration is undesirable for many catalytic applications, as it reduces the surface area of PGM catalyst available for reaction.

The composite nanoparticles comprising two nanoparticles (catalytic or support) are referred to as "nano-on-nano" particles or "NN" particles. When the nano-on-nano (NN) particles are generated by plasma, they fall in the category of catalytically active powder comprising one or more plasma generated catalyst components.

Production of Micron-Sized Carrier Particles Bearing Composite Nanoparticles ("Nano-on-Nano-on-Micron" Particles or "NNm" Particles)

The plasma-generated composite nanoparticles (nano-on-nano particles) may be further bonded to micron-sized carrier particles to produce composite micro/nanoparticles, referred to as "nano-on-nano-on-micron" particles or "NNm" particles. When the nano-on-nano-on micron (NNm) particles are made with plasma-generated nano-on-nano (NN) particles, they fall within the category of catalytically active powder comprising one or more plasma-generated catalyst components. The carrier particles are typically metal oxide particles, such as alumina ($Al_2O_3$). The micron-sized particles can have an average size between about 1 micron and about 100 microns, such as between about 1 micron and about 10 microns, between about 3 microns and about 7 microns, or between about 4 microns and about 6 microns.

In general, the nano-on-nano-on-micron particles are produced by a process of suspending the composite nanoparticles (nano-on-nano particles) in water, adjusting the pH of the suspension to between about 2 and about 7, between about 3 and about 5, or about 4, adding surfactants to the suspension (or, alternatively, adding the surfactants to the water before suspending the composite nanoparticles in the water), sonicating the composite nanoparticle suspension, applying the suspension to micron-sized metal oxide particles until the point of incipient wetness, thereby impregnating the micron-sized particles with composite nanoparticles, drying the micron-sized metal oxide particles which have been impregnated with composite nanoparticles, and calcining the micron-sized metal oxide particles which have been impregnated with composite nanoparticles.

Typically, the composite nanoparticles are suspended in water, and the suspension is adjusted to have a pH of between about 2 and about 7, preferably between about 3 and about 5, more preferably a pH of about 4 (the pH is adjusted with acetic acid or another organic acid). Dispersants and/or surfactants are added to the composite nanoparticles. Surfactants suitable for use include Jeffsperse® X3202 (Chemical Abstracts Registry No. 68123-18-2, and described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are nonionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant is added in a range of about 0.5% to about 5%, with about 2% being a typical value.

The mixture of aqueous surfactants and composite nanoparticles is sonicated to disperse the composite nanoparticles. The quantity of composite nanoparticles particles in the dispersion is usually in the range of about 2% to about 15% (by mass). The dispersion is then applied to porous, micron-sized $Al_2O_3$, which may be purchased from companies such as Rhodia or Sasol. The porous, micron-sized, $Al_2O_3$ powders may be stabilized with a small percentage of lanthanum (about 2% to about 4% La). One commercial alumina powder suitable for use is MI-386, purchased from Grace Davison or Rhodia. The usable surface for this powder, defined by pore sizes greater than 0.28 μm, is approximately 2.8 $m^2/g$. The ratio of composite nanoparticles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nanoparticles may be used with about 122 grams of carrier micro-particles. The aqueous dispersion of composite nanoparticles is applied in small portions (such as by dripping or other methods) to the micron-sized powder until the point of incipient wetness, producing a material similar to damp sand.

The micron-sized carrier particles, impregnated with the composite nanoparticles, may then be dried (for example, at about 30° C. to about 95° C., preferably about 60° C. to about 70° C., at atmospheric pressure or at reduced pressure such as from about 1 pascal to about 90,000 pascal). After drying, the particles may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nanoparticles, also referred to as nano-on-nano-on-micron particles, or NNm particles. The drying step may be performed before the calcining step to remove the water before heating at the higher calcining temperatures; this avoids boiling of the water, which would disrupt the impregnated nanoparticles which are lodged in the pores of the micron-sized carrier.

The NNm particles may contain from about 1% to about 6% PGM by weight, or in another embodiment from about 2% to 3% PGM by weight, or in another embodiment, about 2.5% PGM by weight, of the total mass of the NNm particle. The NNm particles can then be used for formulations for coating substrates, where the coated substrates may be used in catalytic converters.

Examples of production of NNm material are described in the following co-owned patents and patent applications: U.S. Patent Publication No. 2005/0233380, U.S. Patent Publication No. 2006/0096393, U.S. patent application Ser. No. 12/151,810, U.S. patent application Ser. No. 12/152,084, U.S. patent application Ser. No. 12/151,809, U.S. Pat. No. 7,905,942, U.S. patent application Ser. No. 12/152,111, U.S. Patent Publication 2008/0280756, U.S. Patent Publication 2008/0277270, U.S. patent application Ser. No. 12/001,643, U.S. patent application Ser. No. 12/474,081, U.S. patent application Ser. No. 12/001,602, U.S. patent application Ser. No. 12/001,644, U.S. patent application Ser. No. 12/962,518, U.S. patent application Ser. No. 12/962,473, U.S. patent application Ser. No. 12/962,490, U.S. patent application Ser. No. 12/969,264, U.S. patent application Ser. No. 12/962,508, U.S. patent application Ser. No. 12/965,745, U.S. patent application Ser. No. 12/969,503, and U.S. patent application Ser. No. 13/033,514, WO 2011/081834 (PCT/US2010/59763) and US 2011/0143915 (U.S. patent application Ser. No. 12/962,473).

NNm Particles with Inhibited Migration of Platinum Group Metals

The NNm particles including an aluminum oxide micron-sized carrier particle bearing composite nanoparticles, where the composite nanoparticles are produced under reducing conditions, are particularly advantageous for use in catalytic converter applications. The platinum group metal of the catalytic nanoparticle has a greater affinity for the partially reduced $Al_2O_{(3-x)}$ surface of the support nanoparticle than for the $Al_2O_3$ surface of the micron-sized carrier particles. Thus, at elevated temperatures, neighboring PGM nanoparticles bound to neighboring $Al_2O_{(3-x)}$ support nanoparticles are less likely to migrate on the $Al_2O_3$ micron-sized carrier particle surface and agglomerate into larger catalyst clumps. Since the larger agglomerations of catalyst have less surface area, and are less effective as catalysts, the inhibition of migration and agglomeration provides a significant advantage for the NNm particles. In contrast, platinum particles deposited by wet-chemical precipitation onto alumina support demonstrate higher mobility and migration, forming agglomerations of catalyst and leading to decreased catalytic efficacy over time (that is, catalyst aging).

Washcoat Compositions and Layers Using Nano-on-Nano-on-Micron Catalyst Particles: Application to Substrates Washcoat formulations comprising the nano-on-nano-on-micron particles (that is, the composite micro/nanoparticles, which are the micron-sized carrier particles bearing composite nanoparticles) may be used to provide one or more layers on a substrate used for catalysis, such as a catalytic converter substrate. Additional washcoats can also be used for improved performance. In some embodiments, the washcoat formulations may include two or more different washcoats formulations that allow for the separation of one or more washcoat layers containing high concentrations of zeolite particles from one or more washcoat layers containing platinum group metal catalyst comprising one or more plasma-generated catalyst components, such as the NNm particles described above, on a catalytic converter substrate. The formulations may be used to form washcoat layers and catalytic converter substrates that include reduced amounts of platinum group metals and/or offer better performance when compared to previous washcoat layers and formulations and catalytic converter substrates.

Some embodiments of washcoat formulations may be formulated to form one or more of the following four basic washcoat layer configurations:

Substrate-Corner Fill-Catalytic Layer-Zeolite Layer (S-F-C-Z)
Substrate-Catalytic Layer-Zeolite Layer (S-C-Z)
Substrate-Corner Fill-Zeolite Layer-Catalytic Layer (S-F-Z-C)
Substrate-Zeolite Layer-Catalytic Layer (S-Z-C)

In the configurations above: 1) the Substrate (S) may be any substrate suitable for use in a catalytic converter, 2) the Zeolite Layer (Z) is a washcoat layer that includes a higher percentage of zeolite than the Catalytic Layer, 3) the Catalytic Layer (C) is a washcoat layer that includes a higher percentage of catalytically active particles than the Zeolite Layer, and 4) the Corner Fill (F) is a filler layer that may be used to fill corners of the substrate prior to deposition of additional layers. In some embodiments, the Zeolite Layer is comprised of iron-exchanged zeolite particles comprising about 1-15% of iron by weight. In some embodiments, the Zeolite Layer is comprised of iron-exchanged zeolite particles comprising about 1-10% of iron by weight. In some embodiments, the Zeolite Layer is comprised of iron-exchanged zeolite particles comprising about 2-10% of iron by weight. In some embodiments, the Zeolite Layer is comprised of iron-exchanged zeolite particles comprising about 1-8% of iron by weight. In some embodiments, the Zeolite Layer is comprised of iron-exchanged zeolite particles comprising about 2-8% of iron by weight. In some embodiments, the Zeolite Layer is comprised of iron-exchanged zeolite particles comprising about 1-6% of iron by weight. In some embodiments, the Zeolite Layer is comprised of iron-exchanged zeolite particles comprising about 2-6% of iron by weight. In some embodiments, the Zeolite Layer is comprised of iron-exchanged zeolite particles comprising about 1-5% of iron by weight. In some embodiments, the Zeolite Layer is comprised of iron-exchanged zeolite particles comprising about 2-5% of iron by weight. In some embodiments, the Zeolite Layer is comprised of iron-exchanged zeolite particles comprising about 1-4% of iron by weight. In some embodiments, the Zeolite Layer is comprised of iron-exchanged zeolite particles comprising about 2-4% of iron by weight. In some embodiments, the Zeolite Layer is comprised of iron-exchanged zeolite particles comprising about 3% of iron by weight.

In some embodiments, the Zeolite Layer is comprised of zeolite particles impregnated with palladium. In some embodiments, the Zeolite Layer is comprised of palladium-impregnated iron-exchanged zeolite particles comprising about 1-15% of iron by weight. In some embodiments, the Zeolite Layer is comprised of palladium-impregnated iron-exchanged zeolite particles comprising about 1-10% of iron by weight. In some embodiments, the Zeolite Layer is comprised of palladium-impregnated iron-exchanged zeolite particles comprising about 2-10% of iron by weight. In some embodiments, the Zeolite Layer is comprised of palladium-impregnated iron-exchanged zeolite particles comprising about 1-8% of iron by weight. In some embodiments, the Zeolite Layer is comprised of palladium-impregnated iron-exchanged zeolite particles comprising about 2-8% of iron by weight. In some embodiments, the Zeolite Layer is comprised of palladium-impregnated iron-exchanged zeolite particles comprising about 1-6% of iron by weight. In some embodiments, the Zeolite Layer is comprised of palladium-impregnated iron-exchanged zeolite particles comprising about 2-6% of iron by weight. In some embodiments, the Zeolite Layer is comprised of palladium-impregnated iron-exchanged zeolite particles comprising about 1-5% of iron by weight. In some embodiments, the Zeolite Layer is comprised of palladium-impregnated iron-exchanged zeolite particles comprising about 2-5% of iron by weight. In some embodiments, the Zeolite Layer is comprised of palladium-impregnated iron-exchanged zeolite particles comprising about 1-4% of iron by weight. In some embodiments, the Zeolite Layer is comprised of palladium-impregnated iron-exchanged zeolite particles comprising about 2-4% of iron by weight. In some embodiments, the Zeolite Layer is comprised of palladium-impregnated iron-exchanged zeolite particles comprising about 3% of iron by weight. In some embodiments, the micron-sized support (referred to as "filler") in the Catalytic Layer may be impregnated with palladium. Palladium may be added to the filler by wet chemical methods or by preparation of NNm particles. In one embodiment, the Catalytic Layer contains no zeolites or is substantially free of zeolites. The palladium-impregnated zeolite can comprise about 0.1-5% palladium by weight, such as about 0.1%, about 1%, about 2%, about 3%, about 4%, or about 5% palladium by weight, or about 0.1 to 2% Pd by weight, about 2% to 5% Pd by weight, or about 0.5% to 2% Pd by weight. In one embodiment, the palladium-impregnated zeolite can comprise about 1% palladium by weight.

It should be noted that, in some embodiments, additional washcoat layers can be disposed under, over, or between any of the washcoat layers indicated in these four basic configurations; that is, further layers can be present on the catalytic converter substrate in addition to the ones listed in the configurations above. In other embodiments, additional washcoat layers are not applied; that is, the washcoats listed in the configurations above are the only washcoats present on the catalytic converter substrate.

Various configurations of washcoat layers disposed on the substrate are depicted in the figures, such as FIGS. 3, 6, 8, and 9. The relative thickness of the substrate, washcoat layers, and other elements in the figures, such as FIGS. 3, 6, 8, and 9, are not drawn to scale.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may include a honeycomb structure, which provides numerous channels and results in a high surface area. The high surface area of the coated substrate with its applied washcoats in the catalytic converter provides for effective treatment of the exhaust gas flowing through the catalytic converter.

General Washcoat Preparation Procedure

Washcoats are prepared by suspending the designated materials in an aqueous solution, adjusting the pH to between about 2 and about 7, to between about 3 and about 5, or to about 4, and adjusting the viscosity, if necessary, using cellulose, cornstarch, or other thickeners, to a value between about 300 cP to about 1200 cP.

The washcoat is applied to the substrate (which may already have one or more previously-applied washcoats) by coating the substrate with the aqueous solution, blowing excess washcoat off of the substrate (and optionally collecting and recycling the excess washcoat blown off of the substrate), drying the substrate, and calcining the substrate.

Corner-Fill Washcoat Compositions and Layers

The corner fill washcoat layer (F) may be a relatively inexpensive layer, which can be applied to the substrate to fill up the "corners" and other areas of the substrate where exhaust gases are unlikely to penetrate in significant amounts. The corner fill layer is schematically diagrammed in FIG. 9, which shows a single rectangular channel 900 in a substrate coated in the S-F-C-Z configuration. The wall 910 of the substrate channel has been coated with corner-fill washcoat layer 920, then catalyst-containing washcoat layer 930, then zeolite particle-containing washcoat layer 940. When the coated substrate is operating in the catalytic converter, exhaust gases pass through the lumen 950 of the channel. The corners of the channel (one of which, 960, is indicated by an arrow) have a relatively thick coating, and exhaust gases will be less likely to contact those regions. In, for example, the S-C-Z configuration, the layers 920 and 930 would be a single layer, the catalyst-containing washcoat layer, and significant amounts of expensive platinum group metal would be located in the corners (such as 960) where they are relatively inaccessible for catalysis. Thus, while the S-C-Z configuration can be used, it may not be as cost-effective. The corner fill washcoat layer may not provide an equivalent cost savings in the S-Z-C configuration, as zeolites are relatively inexpensive.

While a rectangular shape is shown for illustration, an equivalent analysis holds for any substrate with polygonal-shaped channels, or any substrate with channels that are not essentially cylindrical. For substrates with essentially cylindrical channels, which by definition do not have corners, a corner-fill washcoat may not be necessary for economic reasons (although it may still be applied for other reasons, such as to adjust the diameter of the channels).

The corner-fill washcoat compositions may comprise aluminum oxide particles (i.e., alumina). Aluminum-oxide particles such as MI-386 material from Grace Davison, or the like, for example, can be used. The size of the aluminum oxide particles is generally above about 0.2 microns, preferably above about 1 micron. The solids content of the corner-fill washcoat include about 80% to about 98% by weight porous alumina (MI-386 or the like) and about 20% to about 2% boehmite, such as about 90% to 97% alumina and about 10% to 3% boehmite, or about 95% to 97% alumina and about 5% to about 3% boehmite, such as a corner-fill washcoat including about 97% porous alumina and about 3% boehmite In some embodiments, each of the aluminum oxide particles or substantially each of the aluminum oxide particles in the corner-fill washcoat composition have a diameter of approximately 0.2 microns to approximately 8 microns, such as about 4 microns to about 6 microns. In some embodiments, the aluminum oxide particles in the corner-fill washcoat composition have an average grain size of approximately 0.2 microns to approximately 8 microns, such as about 4 microns to about 6 microns. In some embodiments, at least about 75%, at least about 80%, at least about 90%, or at least about 95% of the aluminum oxide particles in the corner-fill washcoat composition have a particle size falling within the range of approximately 0.2 microns to approximately 8 microns, such as within the range of about 4 microns to about 6 microns. After a washcoat layer has been applied to a substrate, it may be dried, then calcined, onto the substrate. The corner-fill washcoat may be applied in a thickness of from about 30 g/l up to about 100 g/l; a typical value may be about 50 g/l.

Zeolite Washcoat Compositions and Zeolite Layers

Zeolite particles may be used to trap hazardous gases, such as hydrocarbons, carbon monoxide, and nitrogen oxides, during cold start of an internal combustion engine. The Zeolite Layer (Z) is a washcoat layer, deposited using a washcoat composition that includes a higher percentage of zeolite than the Catalytic layer. In some embodiments, the zeolites used in the Zeolite Layer and washcoat are iron-exchanged zeolites, such as zeolites comprising 3% iron. In some embodiments, the Zeolite Layer and washcoat includes no catalytically active particles (such as no PGM-containing particles). In some embodiments, the Zeolite Layer includes zeolites impregnated with palladium. In still other embodiments, the Zeolite Layer and washcoat includes iron-exchanged zeolites, such as zeolites comprising 3% iron. In still further embodiments, the Zeolite Layer and washcoat includes iron-exchanged zeolites, such as zeolites comprising 3% iron, which are impregnated with palladium. The amount of palladium on the zeolite can range from about 0.1% to 5% by weight, such as about 0.1%, about 1%, about 2%, about 3%, about 4%, or about 5% by weight, or about 0.1 to 2% Pd by weight, about 2% to 5% Pd by weight, or about 0.5% to 2% Pd by weight. The amount of palladium impregnated into the zeolite can be adjusted in order to amount to approximately 50% of the total palladium contained in all washcoat layers.

Iron-Exchanged Zeolites

As noted previously herein, zeolites act as a temporary storage component (i.e., a trap) for the pollutants carbon monoxide (CO), hydrocarbons (HC), and nitrogen oxides ($NO_x$) during the cold-start period, when the catalytic converter is still cold. After the catalytic converter heats up to its operating temperature, known as the light-off temperature, the stored gases are released and subsequently decomposed by the catalytically active material on the substrate (typically, platinum, palladium, and mixtures thereof, as described herein). See, for example, Kryl et al., Ind. Eng. Chem. Res. 44:9524 (2005).

Zeolites can be modified by ion-exchange into the aluminosilicate zeolite matrix. Common ions for such exchange are iron or copper. Thus, iron-exchanged zeolites (iron-ion-exchanged zeolites, iron-impregnated zeolites) and copper-exchanged zeolites have been produced by soaking zeolite materials in solutions containing iron or copper atoms. These materials, particularly iron-exchanged zeolites, have been used in systems for converting nitrogen oxides to nitrogen. See, for example, US 2009/0260346, which describes use of iron-exchanged or copper-exchanged zeolites and ammonia for reduction of nitrogen oxides to nitrogen; U.S. Pat. No. 5,451,387, which describes use of iron-exchanged ZSM-5 zeolite with ammonia to convert $NO_x$ to $N_2$; EP 756,891; and EP 2,141,333, which describes cerium-exchanged zeolites and iron-exchanged zeolites for $NO_x$ reduction. Other uses of iron-exchanged zeolites, such as for Friedel-Crafts alkylation, have also been proposed; see, e.g., Bidart et al., Catalysis Letters, 75:155 (2001)

The instant inventors have discovered that iron-exchanged zeolites also have superior hydrocarbon trapping ability as compared to zeolites without such iron-exchange modification. Thus, inclusion of iron-exchanged zeolites in catalytic converters can lead to dramatically improved cold-start performance and improved pollution control.

Iron-exchanged zeolites can be easily prepared simply by immersing zeolites (such as ZSM-5 zeolite or beta-zeolite) in solutions containing ferric or ferrous ions, such as ferric nitrate, ferric sulfate, ferrous sulfate, ferrous acetate, ferric chloride, at concentrations of 10 mM to 100 mM, for 12-48 hours. See, e.g., Lee et al., Materials Transactions 50:2476 (2009); U.S. Pat. No. 5,451,387; Xin et al., Chem. Commun 7590-7592 (2009); Chen et al., Catalysis Today 42:73 (1998); and Sato et al., Catalysis Letters 12:193 (1992). Iron-exchanged zeolites can also be purchased commercially, for example, from Clariant (formerly Süd-Chemie), Charlotte, N.C.

Use of iron-exchanged zeolites in the washcoats and catalysts disclosed herein can reduce levels of hydrocarbons in exhaust gases, such as in cold-start exhaust gases, by at least about 5%, at least about 10%, at least about 15%, at least about 20%, or at least about 25%, compared to the same catalyst configurations using non-iron-exchanged zeolites.

Use of iron-exchanged zeolites in the washcoats and catalysts disclosed herein can also reduce levels of carbon monoxide in exhaust gases, such as in cold-start exhaust gases, by at least about 5%, at least about 10%, at least about 15%, at least about 20%, or at least about 25%, compared to the same catalyst configurations using non-iron-exchanged zeolites.

In some embodiments, the zeolite layer and washcoat compositions comprise, consist essentially of, or consist of zeolite particles, boehmite particles, and metal-oxide particles. The metal-oxide particles are preferably porous. The metal-oxide particles may be aluminum-oxide particles (e.g., MI-386 from Grace Davison or the like). The aluminum-oxide particles may be porous. Different configurations of the weight concentrations of the zeolite particles, boehmite particles, and metal-oxide particles may be employed. In the following descriptions, the percentages of the components of the washcoat compositions are provided in terms of the amount of solids present in the washcoat compositions, as the washcoat compositions can be provided in an aqueous suspension or, in some instances, as dry powder. The zeolite layer refers to the zeolite washcoat composition after it has been applied to the substrate, dried, and calcined.

In some embodiments, the zeolite particles comprise at least 50%, comprise more than about 50%, or comprise about 50% to about 100% by weight of the combination of zeolite particles, boehmite particles, and metal-oxide particles in the zeolite washcoat composition or zeolite layer. In some embodiments, the zeolite particles make up approximately 60% to approximately 80%, for example, approximately 65% to approximately 70% or approximately 70% to approximately 80%, by weight of the combination of zeolite particles, boehmite particles, and metal-oxide particles in the zeolite particle-containing washcoat composition or zeolite layer. In some embodiments, the zeolite particles in the zeolite particle-containing washcoat composition or zeolite layer each have a diameter of approximately 0.2 microns to approximately 8 microns, such as about 4 microns to about 6 microns, prior to coating. In some embodiments, at least about 75%, at least about 80%, at least about 90%, or at least about 95% of the zeolite particles in the zeolite particle-containing washcoat composition or zeolite layer have a particle size falling with the range of approximately 0.2 microns to approximately 8 microns, such as within the range of about 4 microns to about 6 microns. In some embodiments, the boehmite particles make up approximately 2% to approximately 5% by weight of the combination of zeolite particles, boehmite particles, and metal-oxide particles in the zeolite particle-containing washcoat composition or zeolite layer. In some embodiments, the boehmite particles make up approximately 3% by weight of the combination of zeolite particles, boehmite particles, and metal-oxide particles in the zeolite particle-containing washcoat composition or zeolite layer. In some embodiments, the zeolite particles in the zeolite particle-containing washcoat composition or zeolite layer are iron-exchanged zeolites, for example, zeolites comprising 3% iron. In some embodiments, the metal-oxide particles make up approximately 15% to approximately 38%, for example, approximately 15% to approximately 30%, approximately 17% to approximately 23% or approximately 17% to approximately 22%, by weight of the mixture of zeolite particles, metal-oxide particles, and boehmite particles in the zeolite particle-containing washcoat composition or zeolite layer. In some embodiments, the metal-oxide particles make up approximately 15% to approximately 38%, for example, approximately 15% to approximately 30%, approximately 17% to approximately 23% or approximately 17% to approximately 22%, by weight of the mixture of zeolite particles (wherein the zeolite particles can be iron-exchanged zeolite particles, or non-iron-exchanged zeolite particles), metal-oxide particles, and boehmite particles in the zeolite particle-containing washcoat composition or zeolite layer. In some embodiments, the metal-oxide particles make up approximately 15% to approximately 23% by weight of the mixture of zeolite particles (wherein the zeolite particles can be iron-exchanged zeolite particles, or non-iron-exchanged zeolite particles), metal-oxide particles, and boehmite particles in the zeolite particle-containing washcoat composition or zeolite layer. In some embodiments, the metal-oxide particles make up approximately 15% to approximately 23% by weight of the mixture of zeolite particles (wherein the zeolite particles can be iron-exchanged zeolite particles, or non-iron-exchanged zeolite particles), metal-oxide particles, and boehmite particles in the zeolite particle-containing washcoat composition or zeolite layer. In some embodiments, the metal-oxide particles make up approximately 25% to approximately 35% by weight of the mixture of zeolite particles (wherein the zeolite particles can be iron-exchanged zeolite particles, or non-iron-exchanged zeolite particles), metal-oxide particles, and boehmite particles in the zeolite particle-containing washcoat composition or zeolite layer. In some embodiments, the metal-oxide particles make up approximately 25% to approximately 35% by weight of the mixture of zeolite particles (wherein the zeolite particles can be iron-exchanged zeolite particles, or non-iron-exchanged zeolite particles), metal-oxide particles, and boehmite particles in the zeolite particle-containing washcoat composition or zeolite layer. In some embodiments, the zeolite-particle containing washcoat composition or zeolite layer contains about 3% boehmite particles, about 67% zeolite particles, and about 30% porous aluminum-oxide particles, wherein the zeolite particles can be iron-exchanged zeolite particles, or non-iron-exchanged zeolite particles. In some embodiments, the zeolite-particle containing washcoat composition or zeolite layer comprises about 3% boehmite particles, about 70% zeolite particles, and about 30% porous aluminum-oxide particles, wherein the zeolite particles can be iron-exchanged zeolite particles, or non-iron-exchanged zeolite particles.

In some embodiments, the zeolite particle-containing washcoat composition or zeolite layer does not comprise any platinum group metals. As discussed above, the six platinum group metals are ruthenium, rhodium, palladium, osmium, iridium, and platinum. In some embodiments, the zeolite particle-containing washcoat composition or zeolite layer is characterized by a substantial absence of any platinum group metals. In some embodiments, the zeolite particle-containing washcoat composition or zeolite layer is 100% free of any platinum group metals. In some embodiments, the zeolite particle-containing washcoat composition or zeolite layer is approximately 100% free of any platinum group metals. In some embodiments, the zeolite particle-containing washcoat composition or zeolite layer does not comprise any catalytic particles. In some embodiments, the zeolite particle-containing washcoat composition or zeolite layer is characterized by a substantial absence of any catalytic particles. In some embodiments, the zeolite particle-containing washcoat composition or zeolite layer is 100% free of any catalytic particles. In some embodiments, the zeolite particle-containing washcoat composition or zeolite layer is approximately 100% free of any catalytic particles. In all of the above embodiments, the zeolite particles can be iron-exchanged zeolite particles, or non-iron-exchanged zeolite particles.

In other embodiments, the zeolite particle-containing washcoat composition or zeolite layer further comprises palladium, where the palladium is impregnated into the zeolite particles. The zeolite particles can be iron-exchanged zeolite particles, or non-iron-exchanged zeolite particles. In some embodiments, the zeolite particle-containing washcoat composition or zeolite layer may include by weight about 2% to about 5% boehmite particles, about 60% to about 80% zeolite particles, and the rest porous aluminum-oxide particles (i.e., about 15% to about 38%). In one embodiment, the zeolite particle-containing washcoat composition or zeolite layer includes by weight about 2% to about 5% boehmite particles, about 75% to about 80% zeolite particles, and the rest porous aluminum-oxide particles (i.e., about 15% to about 23%). In another embodiments, the zeolite particle-containing washcoat composition or zeolite layer includes by weight about 2% to about 5% boehmite particles, about 65% to about 70% zeolite particles, and the rest porous aluminum-oxide particles (i.e., about 25% to about 33%). In some embodiments, the zeolite-particle containing washcoat composition or zeolite layer contains about 3% boehmite particles, about 67% zeolite particles, and about 30% porous aluminum-oxide particles. In all of the above embodiments, the zeolite particles can be iron-exchanged zeolite particles, or non-iron-exchanged zeolite particles.

In some embodiments, the zeolite particle-containing washcoat composition is mixed with water and acid, such as acetic acid, prior to coating of a substrate with the zeolite particle-containing washcoat composition, thereby forming an aqueous mixture of the zeolite particle-containing washcoat composition, water, and acid. This aqueous mixture of the zeolite particle-containing washcoat composition, water, and acid may then be applied to the substrate (where the substrate may or may not already have other washcoat layers applied to it). In some embodiments, the pH of this aqueous mixture may be adjusted to a pH level of about 2 to about 7 prior to it being applied to the substrate. In some embodiments, the pH of this aqueous mixture may be adjusted to a pH level of about 4 prior to it being applied to the substrate.

In some embodiments, the zeolite layer (that is, the zeolite particle-containing washcoat composition applied to the substrate, or the zeolite-particle containing washcoat layer) has a thickness of approximately 25 g/l to approximately 90 g/l (grams/liter), approximately 50 g/l to approximately 80 g/l, or approximately 70 to approximately 90 g/l. In some embodiments, the zeolite layer has a thickness of approximately 50 g/l, 60 g/l, 70 g/l, 80 g/l, or 90 g/l. In some embodiments, the zeolite layer has a thickness of approximately 80 g/l.

In some embodiments, where the zeolite layer is applied on top of the catalyst-containing layer (i.e., the catalyst-containing layer is closer to the substrate than the zeolite layer), the zeolite layer has a thickness of about 70 g/l to about 90 g/l.

In some embodiments, where the zeolite layer is applied under the catalyst-containing layer (i.e., the zeolite layer is closer to the substrate than the catalyst-containing layer), the zeolite layer has a thickness of about 50 g/l to about 80 g/l.

Catalytic Active Particle-Containing Washcoat Compositions and Catalytically Active Layers (where Catalytically Active Particles Comprise One or More Plasma-Generated Catalyst Components)

The catalyst-containing washcoat composition and the catalyst layer on the substrate, contains catalytically active material and can be formed in a variety of ways. Preferred catalysts are platinum group metals (PGMs). Platinum group metals are the metals platinum, palladium, rhodium, ruthenium, osmium, and iridium. The individual metals can be used as catalysts, and various combinations of metals can also be used. For example, the plasma-generated NNm micron-sized particles described above are preferably used. The catalytically active particles may have composite nanoparticles, where the composite nanoparticles have a population of support nanoparticles bearing catalytic nanoparticles comprising platinum and a population of support nanoparticles bearing catalytic nanoparticles comprising palladium. The micron-sized support particles bearing composite particles may include support nanoparticles bearing catalytic nanoparticles, where the catalytic nanoparticles include a platinum/palladium alloy, such as a 4:1 Pt/Pd ratio (weight/weight). The catalytically active particles may have composite nanoparticles, where the composite nanoparticles have a population of support nanoparticles bearing catalytic nanoparticles comprising a platinum/palladium alloy and a population of support nanoparticles bearing catalytic nanoparticles comprising palladium. In some embodiments, the micron-sized carrier particles are alumina (aluminum oxide) particles on which a plurality of composite nanoparticles are attached, the composite nanoparticles comprising a support nanoparticle and a catalytic nanoparticle. In one embodiment, MI-386 alumina powder from Grace Davison is used as the micron-sized alumina particles.

In the following descriptions, the percentages of the components of the washcoat compositions are provided in terms of the amount of solids present in the washcoat compositions, as the washcoat compositions can be provided in an aqueous suspension or, in some instances, as dry powder. The catalyst layer (or catalyst-containing layer) refers to the catalyst-containing washcoat composition after it has been applied to the substrate, dried, and calcined.

The previously described zeolite-particle containing washcoat compositions and zeolite-particle containing layers can be free of, or in an alternative embodiment, substantially free of, catalytic particles or platinum group metals. The previously described zeolite-particle containing washcoat compositions and zeolite-particle containing layers can comprise iron-exchanged zeolite particles or non-iron-exchanged zeolite particles. The previously described zeolite-particle containing washcoat compositions and zeolite-particle containing layers, which can be iron-exchanged zeolite particles, or non-iron-exchanged zeolite particles, can comprise palladium which is impregnated into zeolite particles. It is preferred that the catalyst-containing washcoat compositions and layers which comprise one or more plasma-generated catalyst components are free of, or substantially free of, zeolites. However, in some embodiments, the catalyst-containing washcoat compositions and catalyst layers can contain an amount of zeolites, such as up to about 20%, up to about 10%, or up to about 5% of the total solids in the catalyst-containing washcoat compositions or catalyst-containing layers, where the washcoat compositions or layers comprise one or more plasma-generated catalyst components.

In some embodiments, the catalyst-containing washcoat composition further includes "spacer" or "filler" particles, where the spacer particles may be ceramic, metal oxide, or metallic particles. In some embodiments, the spacer particles may be silica, alumina, boehmite, or zeolite particles, or any mixture of the foregoing, such as boehmite particles, silica particles and zeolite particles in any proportion.

In some embodiments where the catalyst-containing washcoat composition comprising one or more plasma-generated catalyst components, and catalyst layers comprising one or more plasma-generated catalyst components, are substantially free of zeolites, the catalyst-containing washcoat composition comprises, consists essentially of, or consists of silica particles, boehmite particles, and NNm particles. In some embodiments, the NNm particles make up between approximately 35% to approximately 95% by weight of the combination of the NNm particles, the boehmite particles, and the silica particles in the catalyst-containing washcoat composition or catalyst-containing layer. In some embodiments, the NNm particles make up between approximately 40% to approximately 92% by weight of the combination of the NNm particles, the boehmite particles, and the silica particles in the catalyst-containing washcoat composition or catalyst-containing layer. In some embodiments, the NNm particles make up between approximately 60% to approximately 95% by weight of the combination of the NNm particles, the boehmite particles, and the silica particles in the catalyst-containing washcoat composition or catalyst-containing layer. In some embodiments, the NNm particles make up between approximately 80% to approximately 95% by weight of the combination of the NNm particles, the boehmite particles, and the silica particles in the catalyst-containing washcoat composition or catalyst-containing layer. In some embodiments, the NNm particles make up between approximately 80% to approximately 92% by weight of the combination of the NNm particles, the boehmite particles, and the silica particles in the catalyst-containing washcoat composition or catalyst-containing layer. In some embodiments, the NNm particles make up approximately 92% by weight of the combination of the NNm particles, the boehmite particles, and the silica particles in the catalyst-containing washcoat composition or catalyst-containing layer.

In some embodiments, the percentage of platinum group metal in the catalyst-containing washcoat composition comprising one or more plasma-generated catalyst components, and in the catalyst layer comprising one or more plasma-generated catalyst components, ranges from between about 0.25% to about 4%, about 0.5% to about 4%, about 0.5% to about 3%, about 1% to about 3%, about 1% to about 2%, about 1% to about 1.5%, about 1.5% to about 3%, about 1.5% to about 2.5%, about 1.5% to about 2%, about 2% to about 3%, about 2.5% to about 3%, or about 2% to about 2.5%. In some embodiments, the percentage of platinum group metal in the catalyst-containing washcoat composition comprising one or more plasma-generated catalyst components, and catalyst layer comprising one or more plasma-generated catalyst components, is about 0.5%, about 0.75%, about 1%, about 1.25%, about 1.5%, about 1.75%, about 2%, about 2.25%, about 2.5%, about 2.75%, or about 3%. In some embodiments, the percentage of platinum group metal in the catalyst-containing washcoat composition comprising one or more plasma-generated catalyst components, and catalyst layer comprising one or more plasma-generated catalyst components, is about 2.3%.

In some embodiments, the silica particles make up approximately 20% or less by weight of the combination of the nano-on-nano-on-micron particles, the boehmite particles, and the silica particles in the catalyst-containing washcoat composition comprising one or more plasma-generated catalyst components or the catalyst-containing layer comprising one or more plasma-generated catalyst components; or the silica particles make up approximately 10% or less by weight of the combination of the nano-on-nano-on-micron particles, the boehmite particles, and the silica particles in the catalyst-containing washcoat composition or catalyst-containing layer; in further embodiments, the silica particles make up approximately 5% or less by weight of the combination of the nano-on-nano-on-micron particles, the boehmite particles, and the silica particles in the catalyst-containing washcoat composition or catalyst-containing layer. In various embodiments, the silica particles make up approximately 1% to approximately 20%, approximately 1% to approximately 10%, approximately 1% to approximately 5%, about 20%, about 10%, about 5%, or about 1% by weight of the combination of the nano-on-nano-on-micron particles, the boehmite particles, and the silica particles in the catalyst-containing washcoat composition comprising one or more plasma-generated catalyst components or catalyst-containing layer comprising one or more plasma-generated catalyst components. In some embodiments, the boehmite particles make up approximately 2% to approximately 5% by weight of the combination of the nano-on-nano-on-micron particles, the boehmite particles, and the silica particles in the catalyst-containing washcoat composition comprising one or more plasma-generated catalyst components or catalyst-containing layer comprising one or more plasma-generated catalyst components. In some embodiments, the boehmite particles make up approximately 3% by weight of the combination of the nano-on-nano-on-micron particles, the boehmite particles, and the silica particles in the catalyst-containing washcoat composition comprising one or more plasma-generated catalyst components or catalyst-containing layer comprising one or more plasma-generated catalyst components.

In some embodiments, the catalyst-containing washcoat composition comprising one or more plasma-generated catalyst components or catalyst-containing layer comprising one or more plasma-generated catalyst components further comprises metal-oxide particles, such as the metal oxide particles discussed above (e.g., porous metal-oxides, aluminum-oxides, porous aluminum-oxides, etc.). In some embodiments, these metal-oxide particles further comprise up to approximately 65%, up to approximately 60%, up to approximately 55%, or up to approximately 54%, such as approximately 2% to approximately 54%, by weight of the combination of the nano-on-nano-on-micron particles, the boehmite particles, the silica particles, and the metal-oxide particles in the catalyst-containing washcoat composition comprising one or more plasma-generated catalyst components or catalyst-containing layer comprising one or more plasma-generated catalyst components. It is contemplated that the concentration ranges discussed above for the nano-on-nano-on-micron particles, the boehmite particles, and the silica particles can be applied to the combination of those materials with the metal-oxide particles.

In other embodiments, the catalyst-containing washcoat composition comprising one or more plasma-generated catalyst components, or the catalyst-containing layer comprising one or more plasma-generated catalyst components, comprises, consists essentially of, or consists of zeolite particles, boehmite particles, and nano-on-nano-on-micron particles. In some embodiments, the nano-on-nano-on-micron particles make up between approximately 35% to approximately 95% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the nano-on-nano-on-micron particles make up between approximately 40% to approximately 92% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the nano-on-nano-on-micron particles make up between approximately 60% to approximately 95% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the nano-on-nano-on-micron particles make up between approximately 80% to approximately 95% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the nano-on-nano-on-micron particles make up between approximately 80% to approximately 92% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the nano-on-nano-on-micron particles make up approximately 92% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the zeolite particles make up less than approximately 20%, less than approximately 10%, or less than approximately 5%, by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the zeolite particles make up approximately 1% to approximately 5% by weight, such as about 5% by weight, of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the boehmite particles make up approximately 2% to approximately 5% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components. In some embodiments, the boehmite particles make up approximately 3% by weight of the combination of the nano-on-nano-on-micron particles, the boehmite particles, and the zeolite particles in the catalyst-containing washcoat composition comprising one or more plasma-generated catalyst components or catalyst-containing layer comprising one or more plasma-generated catalyst components.

In some embodiments, the catalyst-containing washcoat composition comprising one or more plasma-generated catalyst components or catalyst-containing layer comprising one or more plasma-generated catalyst components further includes metal-oxide particles, such as the metal oxide particles discussed above (e.g., porous metal-oxides, aluminum-oxides, porous aluminum-oxides, etc.). In some embodiments, these metal-oxide particles make up approximately 0% to approximately 54%, such as approximately 2% to approximately 54%, by weight of the combination of the nano-on-nano-on-micron particles, the boehmite particles, the zeolite particles, and the metal-oxide particles in the catalyst-containing washcoat composition comprising one or more plasma-generated catalyst components or catalyst-containing layer comprising one or more plasma-generated catalyst components. It is contemplated that the concentration ranges discussed above for the nano-on-nano-on-micron particles, the boehmite particles, and the zeolite particles can be applied to the combination of those materials with the metal-oxide particles.

In some embodiments, the catalyst-containing washcoat composition comprising one or more plasma-generated catalyst components or catalyst-containing layer comprising one or more plasma-generated catalyst components comprises micron-sized support particles bearing composite catalytic nanoparticles, where the catalytic nanoparticles comprise a platinum/palladium alloy. In other embodiments, the catalyst-containing washcoat composition comprising one or more plasma-generated catalyst components or catalyst-containing layer comprising one or more plasma-generated catalyst components comprises micron-sized support particles bearing composite catalytic nanoparticles comprising platinum. In further embodiments, the catalyst-containing washcoat composition comprising one or more plasma-generated catalyst components or catalyst-containing layer comprising one or more plasma-generated catalyst components comprises micron-sized support particles bearing composite catalytic nanoparticles, where the composite nanoparticles have a population of support nanoparticles bearing catalytic nanoparticles comprising a platinum/palladium alloy and a population of support nanoparticles bearing catalytic nanoparticles comprising palladium.

In any of the foregoing embodiments, it will be understood that the amounts of platinum and palladium can be adjusted such that the total amount of platinum and palladium in the combined washcoat layers is from about 8:1 to 1:1 Pt/Pd ratio (weight/weight). In any of the foregoing embodiments, a ratio between about 7:1 to 2:1 platinum:palladium (weight/weight); about 6:1 to 3:1 platinum:palladium (weight/weight); about 5:1 to 3:1 platinum:palladium (weight/weight); about 4.5:1 to 3.5:1 platinum:palladium (weight/weight), or a ratio of about 4:1 platinum:palladium (weight/weight), about 3:1 platinum:palladium (weight/weight) about 2:1 platinum:palladium (weight/weight), or about 1:1 platinum:palladium (weight/weight) can be used. In any of the foregoing embodiments, the total amount of platinum and palladium in the combined washcoat layers can be at about a 4:1 Pt/Pd ratio (weight/weight). In any of the foregoing embodiments, the total amount of platinum and palladium in the combined washcoat layers can be at about a 3:1 Pt/Pd ratio (weight/weight). In any of the foregoing embodiments, the total amount of platinum and palladium in the combined washcoat layers can be at about a 2:1 Pt/Pd ratio (weight/weight). In any of the foregoing embodiments, the total amount of platinum and palladium in the combined washcoat layers can be at about a 1:1 Pt/Pd ratio (weight/weight).

The platinum and palladium can be distributed in among any components of the washcoats used to make the catalyst. For example, the nanoparticles made by plasma preparation methods can comprise all of the platinum and palladium used. Alternatively, the nanoparticles made by plasma preparation methods can comprise all of the platinum and some of the palladium used, while the remaining portion of the palladium can be distributed on one or more other components of the washcoat layers used to make the catalyst. For example, if the total amount of platinum:palladium in the catalyst is present in a 4:1 ratio, the nanoparticles can comprise 100% of the platinum used and about 50% of the palladium used, resulting in nanoparticles having about an 8:1 platinum:palladium ratio, while the remaining 50% of the palladium is distributed on another component (such as the zeolite or an aluminum oxide filler described herein). Thus the ratio would be 8 parts platinum in the plasma-prepared nanoparticle, 1 part palladium in the plasma-prepared nanoparticle, and 1 part palladium in another component of the washcoat layers, resulting in an 8:2 or 4:1 platinum:palladium ratio overall.

A portion of the palladium can be present in any of the following washcoat components: zeolites (either iron-exchanged zeolites or non-iron-exchanged zeolites). Pd can be deposited on zeolites by standard wet-chemical techniques, involving impregnation of a zeolite particle with a solution of a palladium salt, such as a solution of a palladium acid salt, to the point of incipient wetness, followed by drying and calcination to convert the palladium salt to elemental palladium. The amount of palladium on the zeolite can range from about 0.1% to 5% by weight, such as about 0.1%, about 1%, about 2%, about 3%, about 4%, or about 5% by weight, or about 0.1 to 2% Pd by weight, about 2% to 5% Pd by weight, or about 0.5% to 2% Pd by weight. The amount of palladium on the zeolite can be adjusted in order to amount to approximately 50% of the total palladium contained in all washcoat layers, as discussed in the preceding paragraphs.

filler material. Filler material in the form of micron-sized porous alumina (porous aluminum oxide) is used in various layers of the washcoats. Palladium can be deposited in on the filler material either by standard wet-chemical techniques (impregnation to incipient wetness of a palladium salt solution on micron-sized porous alumina, followed by drying/calcination), or by preparing Pd/Al$_2$O$_3$ nano-on-nano ("NN") composite nanoparticles, forming a suspension of the composite nanoparticles, and impregnating the micron-sized porous alumina with the Pd/Al$_2$O$_3$ composite nanoparticles ("NNm"). The amount of palladium on the micron-sized alumina can range from about 1% to 5% by weight, such as about 1%, about 2%, about 3%, about 4%, or about 5% by weight, or about 1 to 3% Pd by weight, about 2% to 3% Pd by weight, or about 1% to 2% Pd by weight. The amount of palladium on the micron-sized alumina can be adjusted in order to amount to approximately 50% of the total palladium contained in all washcoat layers, as discussed in the preceding paragraphs.

In some embodiments, the catalyst-containing washcoat composition comprising one or more plasma-generated catalyst components is mixed with water and acid, such as acetic acid, prior to the coating of the substrate with the catalyst-containing washcoat composition, thereby forming an aqueous mixture of the catalyst-containing washcoat composition, water, and acid. The washcoats can be made by mixing the solid ingredients (about 30% by weight) with water (about 70% by weight), and adding acetic acid to adjust the pH to about 4. The washcoat slurry can then be milled to arrive at an average particle size of about 4 µm to about 6 µm. This aqueous mixture of the catalyst-containing washcoat composition comprising one or more plasma-generated catalyst components, water, and acid is then applied to the substrate (where the substrate may or may not already have other washcoat layers applied to it). The washcoat can be coated onto the substrate by either dip-coating or vacuum coating. In some embodiments, the pH of this aqueous mixture is adjusted to a pH level of about 2 to about 7 prior to it being applied to the substrate. In some embodiments, the pH of this aqueous mixture is adjusted to a pH level of about 4 prior to it being applied to the substrate. In some embodiments, the viscosity of the aqueous washcoat is adjusted by mixing with a cellulose solution, with corn starch, or with similar thickeners. In some embodiments, the viscosity is adjusted to a value between about 300 cP to about 1200 cP. The washcoat can be aged for about 24 hours to about 48 hours after cellulose or corn starch addition. The substrate can optionally be pre-wetted prior to coating.

In some embodiments, the catalyst-containing washcoat composition comprises a thickness of approximately 50 g/l to approximately 250 g/l, such as approximately 50 g/l to approximately 140 g/l, approximately 70 g/l to approximately 140 g/l, approximately 90 g/l to approximately 140 g/l, or approximately 110 g/l to approximately 130 g/l. In some embodiments, the catalyst-containing washcoat composition comprises a thickness of approximately 50 g/l, approximately 60 g/l, approximately 70 g/l, approximately 80 g/l, approximately 90 g/l, approximately 100 g/l, approximately 110 g/l, approximately 120 g/l, approximately 130 g/l, or approximately 140 g/l. Preferably, the catalyst-containing washcoat composition comprises a thickness of approximately 120 g/l.

Drying and Calcining Conditions

Once each washcoat is applied to the substrate (which may or may not have already been coated with previous substrates), excess washcoat is blown off and the residue collected and recycled. The washcoat may then be dried. Drying of the washcoats can be performed at room temperature or elevated temperature (for example, from about 30° C. to about 95° C., preferably about 60° C. to about 70° C.), at atmospheric pressure or at reduced pressure (for example, from about 1 pascal to about 90,000 pascal, or from about 7.5 mTorr to about 675 Torr), in ambient atmosphere or under an inert atmosphere (such as nitrogen or argon), and with or without passing a stream of gas over the substrate (for example, dry air, dry nitrogen gas or dry argon gas). In some embodiments, the drying process is a hot-drying process. A hot drying process includes any way to remove the solvent at a temperature greater than room temperature, but at a temperature below a standard calcining temperature. In some embodiments, the drying process may be a flash drying process, involving the rapid evaporation of moisture from the substrate via a sudden reduction in pressure or by placing the substrate in an updraft of warm air. It is contemplated that other drying processes may also be used.

After drying the washcoat onto the substrate, the washcoat may then be calcined onto the substrate. Calcining takes place at elevated temperatures, such as from 400° C. to about 700° C., preferably about 500° C. to about 600° C., more preferably at about 540° C. to about 560° C. or at about 550° C. Calcining can take place at atmospheric pressure or at reduced pressure (for example, from about 1 pascal to about 90,000 pascal, or about 7.5 mTorr to about 675 Torr), in ambient atmosphere or under an inert atmosphere (such as nitrogen or argon), and with or without passing a stream of gas over the substrate (for example, dry air, dry nitrogen gas, or dry argon gas).

Washcoat Formulations

Table 1 lists exemplary embodiments of the washcoat formulations. Specifically, the composition of the various washcoat layers (Corner Fill Layer, Catalytic Layer (which comprises one or more plasma-generated catalyst components), and Zeolite Layer) are provided. Iron-exchanged zeolite is indicated as "Zeolite (Fe)", while non-iron-exchanged zeolite is simply indicated as "Zeolite."

In some embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of zeolite particles. In other embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of iron-exchanged zeolite particles. In further embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of zeolite particles impregnated with palladium. In still further embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of iron-exchanged zeolite particles comprising palladium.

In some embodiments, the washcoat layers are formulated as follows: 1) the Corner Fill Layer is comprised of alumina, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of alumina, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of alumina, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In still other embodiments, the washcoat layers are formulated as follows: 1) the Corner Fill Layer is comprised of alumina, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of alumina, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of alumina, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of alumina, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In still other embodiments, the washcoat layers are formulated as follows: 1) the Corner Fill Layer is comprised of alumina, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In still other embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In yet further embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In still further embodiments, the washcoat layers are formulated as follows: 1) the Corner Fill Layer is comprised of zeolite particles impregnated with palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In still other embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In yet other embodiments, the washcoat layers are formulated as follows: 1) the Corner Fill Layer is comprised of zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In yet other embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In still further embodiments, the washcoat layers are formulated as follows: 1) the Corner Fill Layer is comprised of zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In still further embodiments, the washcoat layers are formulated as follows: 1) the Corner Fill Layer is comprised of iron-exchanged zeolite particles, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of zeolite particles. In other embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of iron-exchanged zeolite particles. In further embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of zeolite particles impregnated with palladium. In other embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of MI-386 support particles bearing composite catalytic nanoparticles, where the catalytic nanoparticles comprise a platinum/palladium alloy, and 3) the Zeolite Layer is comprised of iron-exchanged zeolite particles comprising palladium.

In some embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In yet other embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In some embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In some embodiments, the washcoat layers are formulated as follows: 1) the Corner Fill Layer is comprised of MI-386 support particles bearing composite catalytic nanoparticles, where the catalytic nanoparticles comprise a platinum/palladium alloy, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In still other embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of zeolite particles impregnated with palladium. In yet further embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In yet other embodiments, the washcoat layers are formulated as follows: 1) the Corner Fill Layer is comprised of a population of micron-sized support particles bearing composite catalytic nanoparticles, where the population of particles is comprised of MI-386 support particles bearing composite catalytic nanoparticles comprising a platinum/palladium alloy, and MI-386 support particles bearing composite catalytic nanoparticles comprising palladium, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles. In other embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles. In further embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of zeolite particles impregnated with palladium. In some embodiments, the washcoat layers are formulated as follows: 1) the Corner Fill Layer is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, 2) the Catalytic Layer comprising one or more plasma-generated catalyst components is comprised of a population of micron-sized particles, where the population of particles is comprised of MI-386 support particles bearing composite catalytic nanoparticles, where the catalytic nanoparticles comprise a platinum/palladium alloy, and MI-386 particles impregnated with palladium by wet chemical methods, and 3) the Zeolite Layer is comprised of iron-exchanged zeolite particles comprising palladium.

In some embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles. In other embodiments, the washcoat layers are formulated as follows: 1) the Corner Fill Layer is comprised of alumina, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles.

In some embodiments, the washcoat layers are formulated as follows: 1) the Corner Fill Layer is comprised of zeolite particles impregnated with palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles. In other embodiments, the washcoat layers are formulated as follows: 1) the Corner Fill Layer is comprised of zeolite particles impregnated with palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles. In further embodiments, the washcoat layers are formulated as follows: 1) the Corner Fill Layer is comprised of zeolite particles impregnated with palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles impregnated with palladium. In still other embodiments, the washcoat layers are formulated as follows: 1) the Corner Fill Layer is comprised of zeolite particles impregnated with palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles. In other embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles. In further embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles impregnated with palladium. In yet further embodiments, the washcoat layers are formulated as follows: 1) the Corner Fill Layer is comprised of iron-exchanged zeolite particles comprising palladium, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles comprising palladium.

In some embodiments, the washcoat layers are formulated as follows: 1) the Corner Fill Layer is comprised of zeolite particles, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles impregnated with palladium. In other embodiments, the washcoat layers are formulated as follows: 1) the Corner Fill Layer is comprised of zeolite particles, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles comprising palladium.

In some embodiments, the washcoat layers are formulated as follows: 1) the Corner Fill Layer is comprised of iron-exchanged zeolite particles, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of zeolite particles impregnated with palladium. In other embodiments, the washcoat layers are formulated as follows: 1) the Corner Fill Layer is comprised of iron-exchanged zeolite particles, 2) the Catalytic Layer comprising one or more plasma-generated catalyst components is comprised of MI-386 support particles bearing composite catalytic nanoparticles, where the catalytic nanoparticles comprise platinum, and 3) the Zeolite Layer is comprised of iron-exchanged zeolite particles comprising palladium.

In some embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 support particles bearing composite catalytic nanoparticles comprising palladium, and 3) the Zeolite Layer is comprised of zeolite particles. In other embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 support particles bearing composite catalytic nanoparticles comprising palladium, and 3) the Zeolite Layer is comprised of iron-exchanged zeolite particles. In further embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 support particles bearing composite catalytic nanoparticles comprising palladium, and 3) the Zeolite Layer is comprised of zeolite particles impregnated with palladium. In still further embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 support particles bearing composite catalytic nanoparticles comprising palladium, and 3) the Zeolite Layer is comprised of iron-exchanged zeolite particles comprising palladium.

In some embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 particles impregnated with palladium, and 3) the Zeolite Layer is comprised of zeolite particles. In other embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 particles impregnated with palladium, and 3) the Zeolite Layer is comprised of iron-exchanged zeolite particles. In further embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 particles impregnated with palladium, and 3) the Zeolite Layer is comprised of zeolite particles impregnated with palladium. In yet other embodiments, the washcoat layers are formulated as follows: 1) the Corner Fill Layer is comprised of MI-386 support particles bearing composite catalytic nanoparticles, where the catalytic nanoparticles comprise platinum, 2) the Catalytic Layer comprising one or more plasma-generated catalyst components is comprised of a population of micron-sized support particles, where the population of particles is comprised of MI-386 support particles bearing composite catalytic nanoparticles comprising platinum, and MI-386 particles impregnated with palladium, and 3) the Zeolite Layer is comprised of iron-exchanged zeolite particles comprising palladium.

In any of the foregoing embodiments of the washcoat layer formulations, the ratio of the total amount of platinum to palladium in the combined washcoat layers ranges from 8:1 to 1:1. In some embodiments, the ratio of the total amount of platinum/palladium in the combined washcoat layers is 4:1.

Catalytic Converters and Methods of Producing Catalytic Converters

In some embodiments, the invention provides for catalytic converters, which can comprise any of the washcoat layers and washcoat configurations described herein. The catalytic converters are useful in a variety of applications, such as in diesel vehicles, such as in light-duty diesel vehicles.

FIG. 1 illustrates a catalytic converter in accordance with some embodiments. Catalytically active material is included in a washcoat composition, which is coated onto a substrate to form a coated substrate. The coated substrate 114 is enclosed within an insulating material 112, which in turn is enclosed within a metallic container 110 (of, for example, stainless steel). A heat shield 108 and a gas sensor (for example, an oxygen sensor) 106 are depicted. The catalytic converter may be affixed to the exhaust system of the vehicle through flanges 104 and 118. The exhaust gas, which includes the raw emissions of hydrocarbons, carbon monoxide, and nitrogen oxides, enters the catalytic converter at 102. As the raw emissions pass through the catalytic converter, they react with the catalytically active material on the coated substrate, resulting in tailpipe emissions of water, carbon dioxide, and nitrogen exiting at 120. FIG. 1A is a magnified view of a section of the coated substrate 114, which shows the honeycomb structure of the coated substrate. The coated substrates, which are discussed in further detail below, may be incorporated into a catalytic converter for use in a vehicle emissions control system.

FIGS. 2-8 illustrate various methods of forming coated substrates for use in a catalytic converter. Any of the catalyst-containing washcoats or zeolite particle-containing washcoats disclosed herein can be used in these illustrative methods. Any of the corner-fill washcoats disclosed herein can be used in any of the illustrative methods where a corner-fill washcoat is used.

FIG. 2 illustrates a method 200 of forming a coated substrate in accordance with some embodiments of the present invention. The method comprises coating a substrate with a zeolite particle-containing washcoat composition, wherein the zeolite particle-containing washcoat composition comprises zeolite particles in high concentration; and coating the resulting coated substrate with a catalyst-containing washcoat composition comprising one or more plasma-generated catalyst components to form the coated substrate, wherein the catalyst-containing washcoat composition comprises catalytic powder. Preferably, a drying process and a calcining process are performed between each coating step. This configuration is designated S-Z-C (substrate-zeolite layer-catalyst layer).

At step 210, a first washcoat composition, a zeolite particle-containing composition, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 220, a first drying process is performed on the substrate. Examples of such drying processes include, but are not limited to, a hot-drying process, or a flash drying process.

At step 230, a first calcining process is performed on the substrate. It is contemplated that the length and temperature of the calcination process can vary depending on the characteristics of the components in a particular embodiment.

At step 240, a second washcoat composition, a catalyst-containing washcoat composition, comprising one or more plasma-generated catalyst components, is applied to the substrate in order to coat the first washcoat layer with a second washcoat layer.

At step 250, a second drying process is performed on the substrate. Examples of such drying processes include, but are not limited to, a hot-drying process, or a flash drying process.

At step 260, a second calcining process is performed on the substrate. It is contemplated that the length and temperature of the calcination process can vary depending on the characteristics of the components in a particular embodiment.

After the second calcining process, the coated substrate includes a first layer and a second layer on its surface. The first layer includes a high concentration of zeolites. The second layer, disposed over the first layer, includes catalytic material comprising one or more plasma-generated catalyst components. This method illustrates the production of the Substrate-Zeolite Particles-Catalytic Powder configuration (S-Z-C) without additional washcoat layers; the method can be readily modified to apply additional washcoat layers as desired, before or after any step illustrated. Preferably, a drying process and a calcining process are performed between each coating step.

Figure 3A:
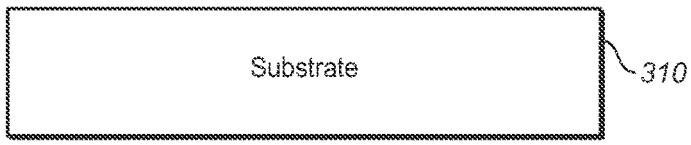
FIGS. 3A-C illustrate formation of a coated substrate at different stages of a washcoat coating method in accordance with some embodiments of the present invention.
Figure 3B:
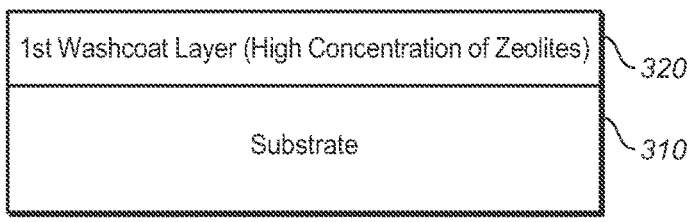
Figure 3C:
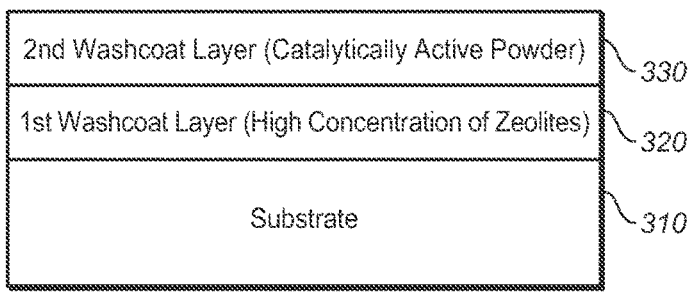

FIGS. 3A-C illustrate the production of a coated substrate at different stages of a washcoat coating method in accordance with some embodiments of the present invention.

FIG. 3A illustrates a substrate 310 prior to being coated with the first washcoat composition. Preferably, the substrate 310 comprises, consists essentially of, or consists of cordierite and comprises a honeycomb structure. However, it is contemplated that other configurations of the substrate 310 are also within the scope of the present invention. It should be noted that the depiction of substrate 310 in FIGS. 3A-C illustrates only a portion of the surface being coated, and thus the subsequent washcoat layers illustrated as being coated onto this portion of the substrate are shown as only coating the top surface of the portion of the substrate. If the depiction of the substrate 310 in FIGS. 3A-C had been meant to illustrate the entire substrate, the washcoat layers would be shown as coating the entire surface of the substrate, and not just the top surface, as is depicted in FIGS. 3A-C for the portion of the substrate shown.

FIG. 3B illustrates the substrate 310 after its surface has been coated with a zeolite particle-containing washcoat composition, as discussed in the process depicted in FIG. 2. The first washcoat composition including zeolite particles can be applied, dried, and calcined. A resulting first washcoat layer 320 is formed on the surface of the substrate 310. This first washcoat layer 320 includes a high concentration of zeolite particles.

FIG. 3C illustrates the substrate 310 after the first washcoat layer 320 has been coated with a second washcoat composition, as discussed in the process depicted in FIG. 2. The second washcoat composition containing catalytic powder comprising one or more plasma-generated catalyst components can be applied, dried, and calcined. As a result, a second washcoat layer 330 is formed over the first washcoat layer 320. This second washcoat layer 330 comprises catalytically active powder comprising one or more plasma-generated catalyst components. This coated substrate is in the Substrate-Zeolite Particles-Catalytic Powder configuration (S-Z-C) without additional washcoat layers; additional washcoat layers can be included as desired, under, over, or between any layers illustrated.

Figure 5:
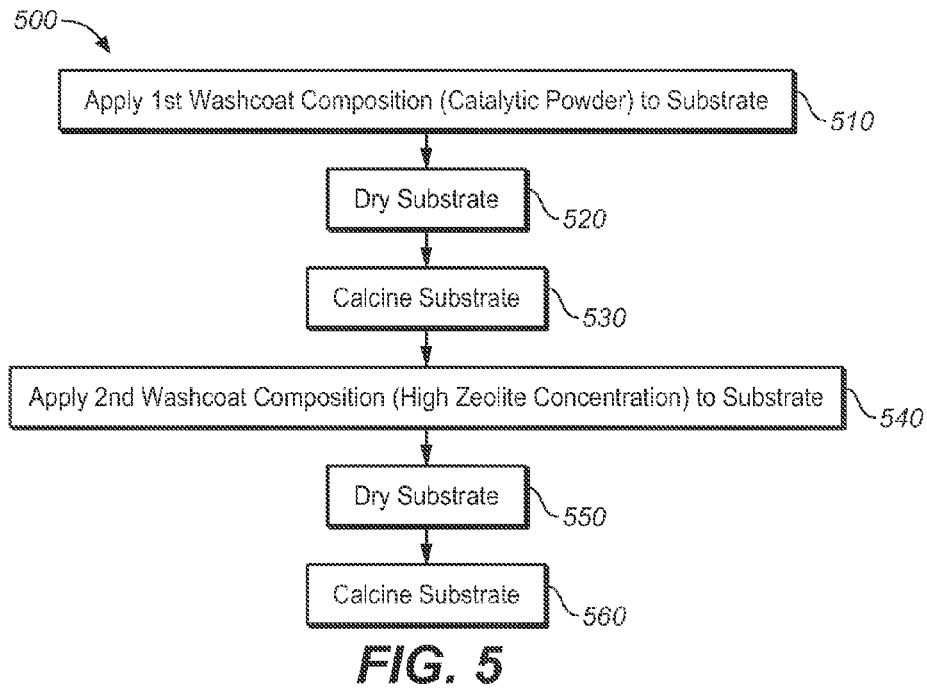
FIG. 5 illustrates a method of forming a coated substrate in accordance with some embodiments of the present invention.

FIG. 5 illustrates a method 500 of forming a coated substrate in accordance with some embodiments. The method comprises: coating a substrate with a washcoat composition which comprises a composition comprising catalytic particles comprising one or more plasma-generated catalyst components (referred to as a catalyst-containing washcoat composition, a catalytically active powder-containing washcoat composition, or a catalyst powder-containing washcoat composition) to form a catalytic particle-coated substrate; and coating the resulting catalytic particle-coated substrate with yet another subsequent washcoat composition which comprises zeolite particles in high concentration (referred to as a zeolite particle-containing washcoat composition), to form the fully coated substrate, which is a catalytic particle-coated/zeolite particle-coated substrate. Preferably, a drying process and a calcining process are performed between each coating step. This configuration is designated S-C-Z (substrate-catalyst layer-zeolite layer).

At step 510, a first washcoat composition, a catalytic powder-containing composition, comprising one or more plasma-generated catalyst components, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 520, a first drying process is performed on the substrate. Examples of such drying processes include, but are not limited to, a hot-drying process, or a flash drying process.

At step 530, a first calcining process is performed on the substrate. It is contemplated that the length and temperature of the calcination process can vary depending on the characteristics of the components in a particular embodiment.

At step 540, a second washcoat composition, a zeolite particle-containing washcoat composition, is applied to the substrate in order to coat the first washcoat layer with a second washcoat layer.

At step 550, a second drying process is performed on the substrate. Examples of such drying processes include, but are not limited to, a hot-drying process, or a flash drying process.

At step 560, a second calcining process is performed on the substrate. It is contemplated that the length and temperature of the calcination process can vary depending on the characteristics of the components in a particular embodiment.

After the second calcining process, the coated substrate comprises a first layer and a second layer on its surface. The first layer comprises catalytic material comprising one or more plasma-generated catalyst components. The second layer, disposed over the first layer, comprises a high concentration of zeolite. This method illustrates the production of the Substrate-Catalytic Powder-Zeolite Particles configuration (S-C-Z) without additional washcoat layers; the method can be readily modified to apply additional washcoat layers as desired, before or after any step illustrated.

Figure 6A:
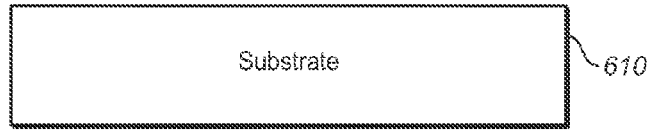
FIGS. 6A-C illustrate formation of a coated substrate at different stages of a washcoat coating method in accordance with some embodiments of the present invention.
Figure 6B:
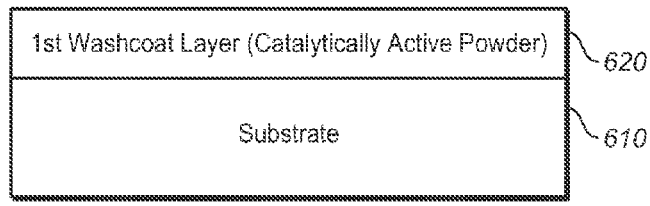
Figure 6C:
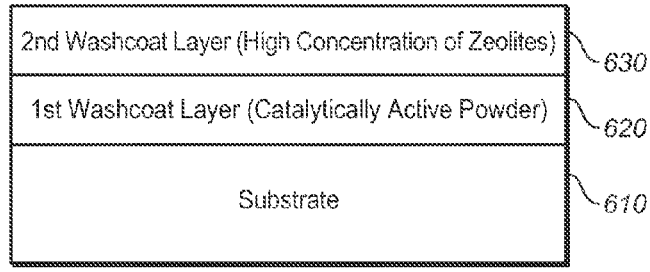

FIGS. 6A-C illustrate the production of a coated substrate at different stages of a washcoat coating method in accordance with some embodiments.

FIG. 6A illustrates a substrate 610 prior to being coated with the first washcoat composition. Preferably, the substrate 610 comprises, consists essentially of, or consists of cordierite and comprises a honeycomb structure. However, it is contemplated that other configurations of the substrate 610 are also within the scope of the present invention. It should be noted that the depiction of substrate 610 in FIGS. 6A-C illustrates only a portion of the surface being coated, and thus the subsequent washcoat layers illustrated as being coated onto this portion of the substrate are shown as only coating the top surface of the portion of the substrate. If the depiction of the substrate 610 in FIGS. 6A-C had been meant to illustrate the entire substrate, the washcoat layers would be shown as coating the entire surface of the substrate, and not just the top surface, as is depicted in FIGS. 6A-C for the portion of the substrate shown.

FIG. 6B illustrates the substrate 610 after its surface has been coated with a catalyst-containing washcoat composition, as discussed in the process depicted in FIG. 5. The first washcoat composition containing catalytic powder comprising one or more plasma-generated catalyst components can be applied, dried, and calcined. A resulting first washcoat layer 620 is formed on the surface of the substrate 610. This first washcoat layer 620 comprises catalytic powder.

FIG. 6C illustrates the substrate 610 after the first washcoat layer 620 has been coated with a second washcoat composition, as discussed in the process depicted in FIG. 5. The second washcoat composition containing zeolite particles can be applied, dried, and calcined. As a result, a second washcoat layer 630 is formed over the first washcoat layer 620. This second washcoat layer 630 comprises zeolite particles, preferably in a high concentration. This coated substrate is in the Substrate-Catalytic Powder-Zeolite Particles configuration (S-C-Z) without additional washcoat layers; additional washcoat layers can be included as desired, under, over, or between any layers illustrated.

Figure 7:
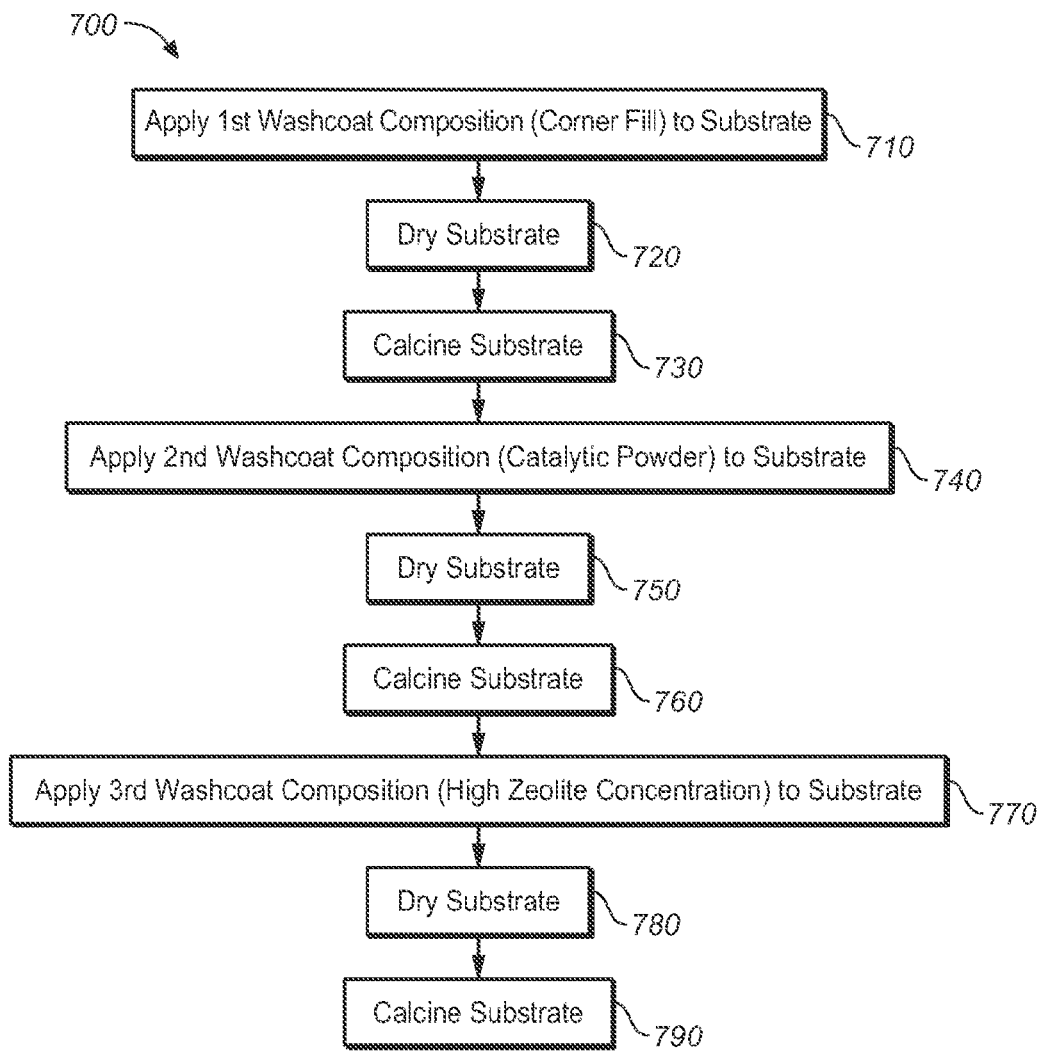
FIG. 7 illustrates a method of forming a coated substrate in accordance with some embodiments of the present invention.

FIG. 7 illustrates a method 700 of forming a coated substrate in accordance with some embodiments. The method comprises coating a substrate with a washcoat composition which comprises a corner-fill washcoat composition comprising alumina; coating the resulting corner-fill-coated substrate with a subsequent washcoat composition, which comprises a composition comprising catalytic particles comprising one or more plasma-generated catalyst components (referred to as a catalyst-containing washcoat composition, a catalytically active powder-containing washcoat composition, or a catalyst powder-containing washcoat composition) to form a corner-fill-coated/catalyst particle-coated substrate; and coating the resulting corner-fill-coated/catalyst layer-coated substrate with yet another subsequent washcoat composition which comprises zeolite particles in high concentration (referred to as a zeolite particle-containing washcoat composition), to form the fully-coated substrate, which is a corner-fill-coated/catalyst particle-coated/zeolite particle-coated substrate. Preferably, a drying process and a calcining process are performed between each coating step. This configuration is designated S-F-C-Z (substrate-corner fill layer-catalyst layer-zeolite layer).

At step 710, a first washcoat composition, a corner-fill washcoat composition, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 720, a first drying process is performed on the substrate. Examples of such drying processes include, but are not limited to, a hot-drying process, or a flash drying process.

At step 730, a first calcining process is performed on the substrate. It is contemplated that the length and temperature of the calcination process can vary depending on the characteristics of the components in a particular embodiment.

At step 740, a second washcoat composition, a catalyst-containing washcoat composition comprising one or more plasma-generated catalyst components, is applied to the substrate in order to coat the first washcoat layer with a second washcoat layer.

At step 750, a second drying process is performed on the substrate. Examples of such drying processes include, but are not limited to, a hot-drying process, or a flash drying process.

At step 760, a second calcining process is performed on the substrate. It is contemplated that the length and temperature of the calcination process can vary depending on the characteristics of the components in a particular embodiment.

At step 770, a third washcoat composition, a zeolite particle-containing washcoat composition, is applied to the substrate in order to coat the second washcoat layer with a third washcoat layer.

At step 780, a third drying process is performed on the substrate. Examples of such drying processes include, but are not limited to, a hot-drying process, or a flash drying process.

At step 790, a third calcining process is performed on the substrate. It is contemplated that the length and temperature of the calcination process can vary depending on the characteristics of the components in a particular embodiment.

After the third calcining process, the coated substrate comprises a first layer, a second layer, and a third layer on its surface. The first layer, disposed over the substrate, contains corner-fill material such as aluminum oxide. The second layer, disposed over the first layer, comprises catalytic material comprising one or more plasma-generated catalyst components. The third layer, disposed over the second layer, comprises a high concentration of zeolite. This method illustrates the production of the Substrate-Corner Fill-Catalytic Powder-Zeolite Particles configuration (S-F-C-Z) without additional washcoat layers; the method can be readily modified to apply additional washcoat layers as desired, before or after any step illustrated.

FIGS. 8A-D illustrate the production of a coated substrate at different stages of a washcoat coating method in accordance with some embodiments.

Figure 8A:
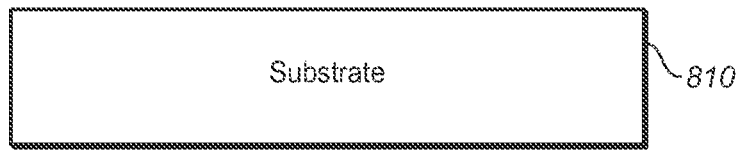
FIGS. 8A-D illustrate formation of a coated substrate at different stages of a washcoat coating method in accordance with some embodiments of the present invention.

FIG. 8A illustrates a substrate 810 prior to being coated with the first washcoat composition. Preferably, the substrate 810 comprises, consists essentially of, or consists of cordierite and comprises a honeycomb structure. However, it is contemplated that other configurations of the substrate 810 may also be used. It should be noted that the depiction of substrate 810 in FIGS. 8A-D illustrates only a portion of the surface being coated, and thus the subsequent washcoat layers illustrated as being coated onto this portion of the substrate are shown as only coating the top surface of the portion of the substrate. If the depiction of the substrate 810 in FIGS. 8A-D had been meant to illustrate the entire substrate, the washcoat layers would be shown as coating the entire surface of the substrate, and not just the top surface, as is depicted in FIGS. 8A-D for the portion of the substrate shown.

Figure 8B:
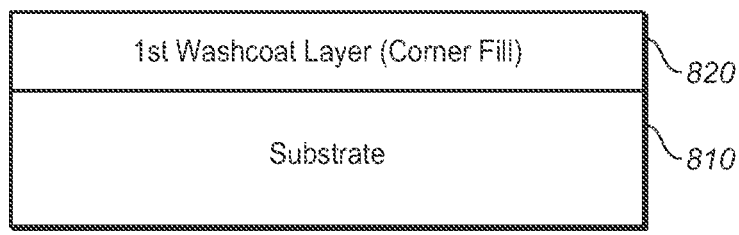

FIG. 8B illustrates the substrate 810 after its surface has been coated with a corner-fill washcoat composition, as discussed in the process depicted in FIG. 7. The first washcoat composition containing corner fill material can be applied, dried, and calcined. A resulting first washcoat layer 820 is formed on the surface of the substrate 810. This first washcoat layer 820 comprises corner fill material, such as aluminum oxide.

Figure 8C:
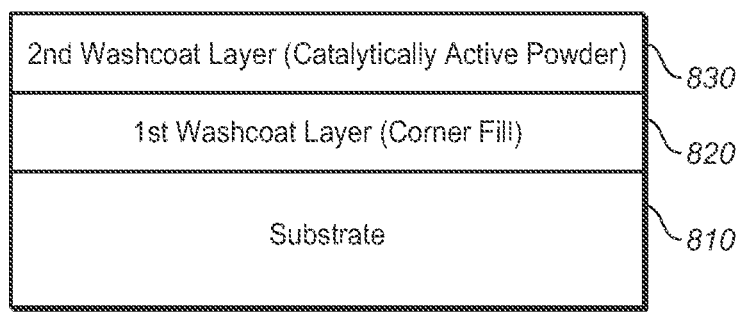

FIG. 8C illustrates the substrate 810 after the first washcoat layer 820 has been coated with a second washcoat composition, as discussed in the process depicted in FIG. 7. The second washcoat composition containing catalytic powder comprising one or more plasma-generated catalyst components can be applied, dried, and calcined. As a result, a second washcoat layer 830 is formed over the first washcoat layer 820. This second washcoat layer 830 comprises catalytic powder comprising one or more plasma-generated catalyst components.

Figure 8D:
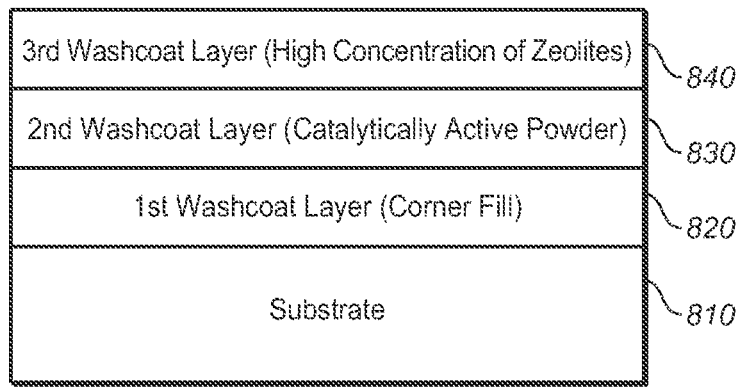

FIG. 8D illustrates the substrate 810 after the second washcoat layer 830 has been coated with a third washcoat composition, as discussed in the process depicted in FIG. 7. The third composition containing zeolite particles can be applied, dried, and calcined. As a result, a third washcoat layer 840 is formed over the second washcoat layer 830. This third washcoat layer 840 comprises zeolite particles, preferably in a high concentration. This coated substrate is in the Substrate-Corner Fill-Catalytic Powder-Zeolite Particles configuration (S-F-C-Z) without additional washcoat layers; additional washcoat layers can be included as desired, under, over, or between any layers illustrated.

While not illustrated, the invention also comprises a method of forming a coated substrate in accordance with the S-F-Z-C (substrate-corner fill layer-zeolite layer-catalyst layer) embodiment. The method comprises coating a substrate with a washcoat composition which comprises a corner-fill washcoat composition comprising alumina; coating the resulting corner-fill-coated substrate with a subsequent washcoat composition, which comprises a composition comprising zeolite particles (referred to as a zeolite particle-containing washcoat composition) to form a corner-fill-coated/zeolite particle-coated substrate; and coating the resulting corner-fill-coated/zeolite layer-coated substrate with yet another subsequent washcoat composition which comprises catalyst particles comprising one or more plasma-generated catalyst components (referred to as a catalyst-containing washcoat composition, a catalytically active powder-containing washcoat composition, or a catalyst powder-containing washcoat composition), to form the fully-coated substrate, which is a corner-fill-coated/zeolite particle-coated/catalyst particle-coated substrate. Preferably, a drying process and a calcining process are performed between each coating step. This configuration is designated S-F-Z-C (substrate-corner fill layer-zeolite layer-catalyst layer).

Figure 9:
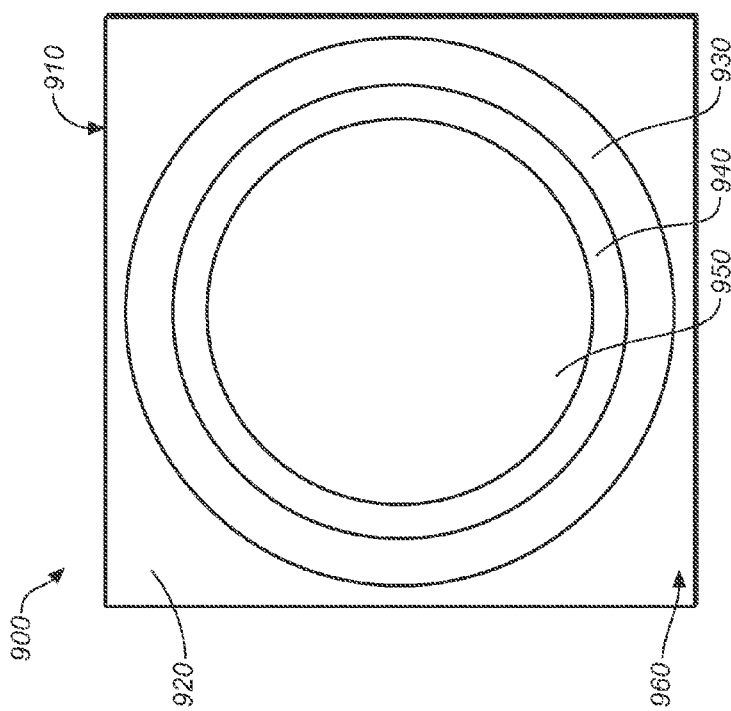
FIG. 9 shows a single rectangular channel in a coated substrate prepared according to one embodiment of the present invention.

FIG. 9 shows a single rectangular channel 900 in a coated substrate coated in the S-F-C-Z configuration, without additional washcoat layers. The wall 910 of the substrate channel has been coated with corner-fill washcoat layer 920, then catalyst-containing washcoat layer (comprising one or more plasma-generated catalyst components) 930, then zeolite particle-containing washcoat layer 940. Exhaust gases pass through the lumen 950 of the channel when the coated substrate is employed in a catalytic converter as part of an emissions control system.

Exhaust Systems, Vehicles, and Emissions Performance

In some embodiments of the invention, a coated substrate as disclosed herein is housed within a catalytic converter in a position configured to receive exhaust gas from an internal combustion engine, such as in an exhaust system of an internal combustion engine. The catalytic converter can be used with the exhaust from a diesel engine, such as a light-duty diesel engine. The catalytic converter can be installed on a vehicle containing a diesel engine, such as a light-duty diesel engine.

The coated substrate is placed into a housing, such as that shown in FIG. 1, which can in turn be placed into an exhaust system (also referred to as an exhaust treatment system) of an internal combustion engine. The internal combustion engine can be a diesel engine, such as a light-duty diesel engine, such as the engine of a light-duty diesel vehicle. The exhaust system of the internal combustion engine receives exhaust gases from the engine, typically into an exhaust manifold, and delivers the exhaust gases to an exhaust treatment system. The catalytic converter forms part of the exhaust system and is often referred to as the diesel oxidation catalyst (DOC). The exhaust system can also include a diesel particulate filter (DPF) and/or a selective catalytic reduction unit (SCR unit) and/or a lean $NO_x$ trap (LNT); typical arrangements, in the sequence that exhaust gases are received from the engine, are DOC-DPF and DOC-DPF-SCR. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a diesel engine, such as a light-duty diesel engine, refers to having the exhaust gas proceed through an exhaust system (exhaust treatment system) prior to release into the environment. As noted above, typically the exhaust gas from the engine will flow through an exhaust system comprising a diesel oxidation catalyst and a diesel particulate filter, or an exhaust system comprising a diesel oxidation catalyst, a diesel particulate filter, and selective catalytic reduction unit (SCR), prior to release into the environment.

The United States Environmental Protection Agency defines a "light-duty diesel vehicle" ("LDDV") as a diesel-powered motor vehicle, other than a diesel bus, that has a gross vehicle weight rating of 8,500 pounds or less and is designed primarily for transporting persons or property. In Europe, a "light-duty diesel engine" has been considered to be an engine used in a vehicle of 3.5 metric tons or less (7,716 pounds or less) (see European directives 1992/21 EC and 1995/48 EC). In some embodiments of the invention, a light-duty diesel vehicle is a diesel vehicle weighing about 8,500 pounds or less, or about 7,700 pounds or less, and a light-duty diesel engine is an engine used in a light-duty diesel vehicle.

When used in a catalytic converter, the coated substrates disclosed herein may provide a significant improvement over other catalytic converters. The zeolites in the coated substrate act as an intermediate storage device for the exhaust gases while the exhaust gas is still cold. The undesirable gases (including, but not limited to, hydrocarbons, carbon monoxide, and nitrogen oxides or $NO_x$) adsorb to the zeolites during the cold start phase, while the catalyst is not yet active, and are released later when the catalyst reaches a temperature sufficient to effectively decompose the gases (that is, the light-off temperature).

In some embodiments, catalytic converters and exhaust treatment systems employing the coated substrates disclosed herein display emissions of 3400 mg/mile or less of CO emissions and 400 mg/mile or less of $NO_x$ emissions; 3400 mg/mile or less of CO emissions and 200 mg/mile or less of $NO_x$ emissions; or 1700 mg/mile or less of CO emissions and 200 mg/mile or less of $NO_x$ emissions. The disclosed coated substrates, used as catalytic converter substrates, can be used in an emission system to meet or exceed these standards. In some embodiments, the coated substrate is used in a catalytic converter (diesel oxidation catalyst) in the configuration DOC-DPF or DOC-DPF-SCR to meet or exceed these standards.

Emissions limits for Europe are summarized at the URL europa.eu/legislation_summaries/environment/air_pollution/l28186_en.htm. The Euro 5 emissions standards, in force as of September 2009, specify a limit of 500 mg/km of CO emissions, 180 mg/km of $NO_x$ emissions, and 230 mg/km of HC (hydrocarbon)+$NO_x$ emissions. The Euro 6 emissions standards, scheduled for implementation as of September 2014, specify a limit of 500 mg/km of CO emissions, 80 mg/km of $NO_x$ emissions, and 170 mg/km of HC (hydrocarbon)+$NO_x$ emissions. The disclosed catalytic converter substrates can be used in an emission system to meet or exceed these standards. In some embodiments, the coated substrate is used in a catalytic converter (diesel oxidation catalyst) in the configuration DOC-DPF or DOC-DPF-SCR to meet or exceed these standards.

In some embodiments, a catalytic converter made with a coated substrate of the invention, loaded with 5.0 g/l of PGM or less, displays a carbon monoxide light-off temperature at least 5 degrees C. lower than a catalytic converter made using only wet chemistry methods and having the same or similar PGM loading. In some embodiments, a catalytic converter made with a coated substrate of the invention, loaded with 5.0 g/l of PGM or less, displays a carbon monoxide light-off temperature at least 10 degrees C. lower than a catalytic converter made using only wet chemistry methods and having the same or similar PGM loading. In some embodiments, a catalytic converter made with a coated substrate of the invention, loaded with 4.0 g/l of PGM or less, displays a carbon monoxide light-off temperature at least 5 degrees C. lower than a catalytic converter made using only wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−3 degrees C. of the carbon monoxide light-off temperature of a catalytic converter made using only wet chemistry methods, while the catalytic converter made with a coated substrate employing 30% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made using only wet chemistry methods, while the catalytic converter made with a coated substrate employing 30% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−4 degrees C. of the carbon monoxide light-off temperature of a catalytic converter made using only wet chemistry methods, while the catalytic converter made with a coated substrate employing 40% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made using only wet chemistry methods, while the catalytic converter made with a coated substrate employing 40% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−5 degrees C. of the carbon monoxide light-off temperature of a catalytic converter made using only wet chemistry methods, while the catalytic converter made with a coated substrate of the invention employing 50% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made using only wet chemistry methods, while the catalytic converter made with a coated substrate of the invention employing 50% less catalyst than the catalytic converter made using only wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with United States EPA emissions requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with the same standard. In some embodiments, the coated substrate is used in a catalytic converter (diesel oxidation catalyst) in the configuration DOC-DPF or DOC-DPF-SCR to meet or exceed these standards. The emissions requirements can be intermediate life requirements or full life requirements. The requirements can be TLEV requirements, LEV requirements, or ULEV requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with EPA TLEV/LEV intermediate life requirements. In some embodiments, a catalytic converter made with a coated substrate of the invention employed on a diesel engine or diesel vehicle, such as a light-duty diesel engine or light-duty diesel vehicle, complies with EPA TLEV/LEV full life requirements. In some embodiments, a catalytic converter made with a coated substrate of the invention employed on a diesel engine or diesel vehicle, such as a light-duty diesel engine or light-duty diesel vehicle, complies with EPA ULEV intermediate life requirements. In some embodiments, a catalytic converter made with a coated substrate of the invention employed on a diesel engine or diesel vehicle, such as a light-duty diesel engine or light-duty diesel vehicle, complies with EPA ULEV full life requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine or diesel vehicle, such as a light-duty diesel engine or light-duty diesel vehicle, complies with EPA TLEV/LEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA TLEV/LEV full life requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA ULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA ULEV full life requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with that standard. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with Euro 5 requirements. In some embodiments, a catalytic converter made with a coated substrate of the invention employed on a diesel engine or diesel vehicle, such as a light-duty diesel engine or light-duty diesel vehicle, complies with Euro 6 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine or diesel vehicle, such as a light-duty diesel engine or light-duty diesel vehicle, complies with Euro 5 requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with Euro 5 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which complies with Euro 6 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, displays carbon monoxide emissions of 4200 mg/mile or less. In some embodiments, a catalytic converter made with a coated substrate of the invention and employed on a diesel engine or diesel vehicle, such as a light-duty diesel engine or light-duty diesel vehicle, displays carbon monoxide emissions of 3400 mg/mile or less. In some embodiments, a catalytic converter made with a coated substrate of the invention and employed on a diesel engine or diesel vehicle, such as a light-duty diesel engine or light-duty diesel vehicle, displays carbon monoxide emissions of 2100 mg/mile or less. In another embodiment, a catalytic converter made with a coated substrate of the invention and employed on a diesel engine or diesel vehicle, such as a light-duty diesel engine or light-duty diesel vehicle, displays carbon monoxide emissions of 1700 mg/mile or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays carbon monoxide emissions of 500 mg/km or less. In some embodiments, a catalytic converter made with a coated substrate of the invention and employed on a diesel engine or diesel vehicle, such as a light-duty diesel engine or light-duty diesel vehicle, displays carbon monoxide emissions of 375 mg/km or less. In some embodiments, a catalytic converter made with a coated substrate of the invention and employed on a diesel engine or diesel vehicle, such as a light-duty diesel engine or light-duty diesel vehicle, displays carbon monoxide emissions of 250 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays $NO_x$ emissions of 180 mg/km or less. In some embodiments, a catalytic converter made with a coated substrate of the invention and employed on a diesel engine or diesel vehicle, such as a light-duty diesel engine or light-duty diesel vehicle, displays $NO_x$ emissions of 80 mg/km or less. In some embodiments, a catalytic converter made with a coated substrate of the invention and employed on a diesel engine or diesel vehicle, such as a light-duty diesel engine or light-duty diesel vehicle, displays $NO_x$ emissions of 40 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays $NO_x$ plus HC emissions of 230 mg/km or less. In some embodiments, a catalytic converter made with a coated substrate of the invention and employed on a diesel engine or diesel vehicle, such as a light-duty diesel engine or light-duty diesel vehicle, displays $NO_x$ plus HC emissions of 170 mg/km or less. In some embodiments, a catalytic converter made with a coated substrate of the invention and employed on a diesel engine or diesel vehicle, such as a light-duty diesel engine or light-duty diesel vehicle, displays $NO_x$ plus HC emissions of 85 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays carbon monoxide emissions of 500 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays carbon monoxide emissions of 375 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays carbon monoxide emissions of 250 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a diesel engine or diesel vehicle, such as a light-duty diesel engine or light-duty diesel vehicle, displays $NO_x$ emissions of 180 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ emissions of 80 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ emissions of 40 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a diesel engine or diesel vehicle, such as a light-duty diesel engine or light-duty diesel vehicle, displays $NO_x$ plus HC emissions of 230 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ plus HC emissions of 170 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ plus HC emissions of 85 mg/km or less, while using at least about 30% less, up to about 30% less, at least about 40% less, up to about 40% less, at least about 50% less, or up to about 50% less, platinum group metal or platinum group metal loading, as compared to a catalytic converter made using only wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a diesel engine or vehicle, such as a light-duty diesel engine or light-duty diesel vehicle), or 2) a catalytic converter made using only wet chemistry, which uses the minimal amount of platinum group metal to achieve the performance standard indicated.

In some embodiments, for the above-described comparisons, both the coated substrate according to the invention, and the catalyst used in the commercially available catalytic converter or the catalyst prepared using only wet chemistry methods, are aged (by the same amount) prior to testing. In some embodiments, both the coated substrate according to the invention, and the catalyst substrate used in the commercially available catalytic converter or the catalyst substrate prepared using only wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the invention, and the catalyst substrate used in the commercially available catalytic converter or the catalyst substrate prepared using only wet chemistry methods, are artificially aged (by the same amount) prior to testing. In some embodiments, they are artificially aged by heating to about 400° C., about 500° C., about 600° C., about 700° C., about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours. In some embodiments, they are artificially aged by heating to about 800° C. for about 16 hours.

In some embodiments, for the above-described comparisons, the thrifting (reduction) of platinum group metal for the catalytic converters made with substrates of the invention is compared with either 1) a commercially available catalytic converter, made using only wet chemistry, for the application disclosed (e.g., for use on a diesel engine or vehicle, such as a light-duty diesel engine or light-duty diesel vehicle), or 2) a catalytic converter made using only wet chemistry, which uses the minimal amount of platinum group metal to achieve the performance standard indicated, and after the coated substrate according to the invention and the catalyst substrate used in the commercially available catalyst or catalyst made using only wet chemistry with the minimal amount of PGM to achieve the performance standard indicated are aged as described above.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_x$, and/or HC described above.

Exemplary Embodiments

The invention is further described by the following embodiments. The features of each of the embodiments are combinable with any of the other embodiments where appropriate and practical.

Embodiment 1. A coated substrate comprising:
a substrate;
a washcoat layer comprising iron-exchanged zeolite particles, and
a washcoat layer comprising catalytically active Nano-on-Nano-on-micro (NNm) particles, the catalytically active Nano-on-Nano-on-micro (NNm) particles comprising composite nanoparticles bonded to micron-sized carrier particles, and the composite nanoparticles comprising a support nanoparticle and a catalytic nanoparticle.

Embodiment 2. The coated substrate of Embodiment 1, wherein the iron-exchanged zeolite particles comprise between about 0.5% and about 15% iron by weight.

Embodiment 3. The coated substrate of Embodiment 1, wherein the iron-exchanged zeolite particles comprise between about 1% and about 10% iron by weight.

Embodiment 4. The coated substrate of Embodiment 1, wherein the iron-exchanged zeolite particles comprise between about 2% and about 5% iron by weight.

Embodiment 5. The coated substrate of Embodiment 1, wherein the iron-exchanged zeolite particles comprise about 3% iron by weight.

Embodiment 6. The coated substrate of Embodiment 1, wherein the washcoat layer comprising iron-exchanged zeolite particles is formed on top of the washcoat layer comprising catalytically active Nano-on-Nano-on-micro (NNm) particles.

Embodiment 7. The coated substrate of Embodiment 1, wherein the washcoat layer comprising catalytically active Nano-on-Nano-on-micro (NNm) particles is formed on top of the washcoat layer comprising iron-exchanged zeolite particles.

Embodiment 8. The coated substrate of Embodiment 1, wherein the washcoat layer comprising catalytically active Nano-on-Nano-on-micro (NNm) particles further comprises a filler material comprised of micron-sized particles comprising palladium.

Embodiment 9. The coated substrate of Embodiment 8, wherein the filler material is alumina.

Embodiment 10. The coated substrate of any one of Embodiments 1-9, wherein the iron-exchanged zeolite particles further comprise palladium.

Embodiment 11. The coated substrate of any one of Embodiments 1-10, wherein the catalytically active Nano-on-Nano-on-micro (NNm) particles comprise at least one platinum group metal.

Embodiment 12. The coated substrate of any one of Embodiments 1-11, wherein the catalytically active Nano-on-Nano-on-micro (NNm) particles comprise platinum.

Embodiment 13. The coated substrate of any one of Embodiments 1-12, wherein the catalytically active Nano-on-Nano-on-micro (NNm) particles comprise platinum and palladium.

Embodiment 14. The coated substrate of Embodiment 13, wherein the catalytically active Nano-on-Nano-on-micro (NNm) particles comprise platinum and palladium in a weight ratio from about 8:1 to about 1:1.

Embodiment 15. The coated substrate of Embodiment 13 or 14, wherein the catalytically active Nano-on-Nano-on-micro (NNm) particles comprise platinum and palladium in a weight ratio from about 7:1 to about 2:1.

Embodiment 16. The coated substrate of any one of Embodiments 13-15, wherein the catalytically active Nano-on-Nano-on-micro (NNm) particles comprise platinum and palladium in a weight ratio from about 6:1 to about 3:1.

Embodiment 17. The coated substrate of any one of Embodiments 13-16, wherein the catalytically active Nano-on-Nano-on-micro (NNm) particles comprise platinum and palladium in a weight ratio from about 5:1 to about 3.5:1.

Embodiment 18. The coated substrate of any one of Embodiments 13-17, wherein the catalytically active Nano-on-Nano-on-micro (NNm) particles comprise platinum and palladium in a weight ratio of about 4:1.

Embodiment 19. The coated substrate of any one of Embodiments 1-18, wherein the support nanoparticles have an average diameter of about 10 nm to about 20 nm Embodiment 20. The coated substrate of any one of Embodiments 1-19, wherein the support nanoparticles have an average diameter of about 1 nm to about 5 nm Embodiment 21. The coated substrate of any one of Embodiments 1-20, wherein the washcoat layer comprising iron-exchanged zeolite particles further comprises metal-oxide particles and boehmite particles.

Embodiment 22. The coated substrate of Embodiment 21, wherein the metal-oxide particles are aluminum-oxide particles.

Embodiment 23. The coated substrate of any one of Embodiments 1-22, wherein the iron-exchanged zeolite particles comprise 60% to 80% by weight of the mixture of iron-exchanged zeolite particles, metal-oxide particles, and boehmite particles in the washcoat layer comprising iron-exchanged zeolite particles.

Embodiment 24. The coated substrate of any one of Embodiments 1-23, wherein the boehmite particles comprise 2% to 5% by weight of the mixture of iron-exchanged zeolite particles, metal-oxide particles, and boehmite particles in the washcoat layer comprising iron-exchanged zeolite particles.

Embodiment 25. The coated substrate of any one of Embodiments 1-24, wherein the metal-oxide particles comprise 15% to 38% by weight of the mixture of iron-exchanged zeolite particles, metal-oxide particles, and boehmite particles in the washcoat layer comprising iron-exchanged zeolite particles.

Embodiment 26. The coated substrate of any one of Embodiments 1-25, wherein the washcoat layer comprising iron-exchanged zeolite particles does not include platinum group metals.

Embodiment 27. The coated substrate of any one of Embodiments 1-26, wherein the iron-exchanged zeolite particles in the washcoat layer comprising iron-exchanged zeolite particles each have a diameter of 0.2 microns to 8 microns.

Embodiment 28. The coated substrate of any one of Embodiments 1-27, wherein the washcoat layer comprising catalytically active Nano-on-Nano-on micro (NNm) particles further comprises boehmite particles and silica particles.

Embodiment 29. The coated substrate of any one of Embodiments 1-28, wherein the washcoat layer comprising catalytically active Nano-on-Nano-on micro (NNm) particles is substantially free of zeolites.

Embodiment 30. The coated substrate of Embodiment 29, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat layer comprising catalytically active particles.

Embodiment 31. The coated substrate of Embodiment 29 or 30, wherein the silica particles are present in an amount up to 20% by weight of the combination of the catalytically active Nano-on-Nano-on micro (NNm) particles, boehmite particles, and silica particles in the washcoat layer comprising catalytically active Nano-on-Nano-on micro (NNm) particles.

Embodiment 32. The coated substrate of any one of Embodiments 29-31, wherein the boehmite particles comprise 2% to 5% by weight of the combination of the catalytically active Nano-on-Nano-on micro (NNm) particles, the boehmite particles, and the silica particles in the washcoat layer comprising catalytically active Nano-on-Nano-on micro (NNm) particles.

Embodiment 33. The coated substrate of Embodiment 29, wherein the washcoat layer comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 34. The coated substrate of any one of Embodiments 1-33, wherein the substrate comprises cordierite.

Embodiment 35. The coated substrate of any one of Embodiments 1-34, wherein the substrate comprises a honeycomb structure.

Embodiment 36. The coated substrate of any one of Embodiments 1-35, wherein the washcoat layer comprising iron-exchanged zeolite particles has a thickness of 25 g/l to 90 g/l.

Embodiment 37. The coated substrate of any one of Embodiments 1-36, wherein the washcoat layer comprising catalytically active Nano-on-Nano-on micro (NNm) particles has a thickness of 50 g/l to 250 g/l.

Embodiment 38 The coated substrate of any one of Embodiments 1-37, further comprising a corner-fill layer deposited directly on the substrate.

Embodiment 39. The coated substrate of Embodiment 38, wherein the corner-fill layer comprises zeolite particles.

Embodiment 40. The coated substrate of Embodiment 39, wherein the zeolite particles in the corner-fill layer are iron-exchanged zeolite particles.

Embodiment 41. The coated substrate of Embodiment 40, wherein the iron-exchanged zeolite particles in the corner-fill layer comprise palladium.

Embodiment 42. The coated substrate of Embodiment 38, wherein the corner-fill layer comprises catalytically active Nano-on-Nano-on micro (NNm) particles.

Embodiment 43. The coated substrate of any one of Embodiments 1-42, wherein a total content of platinum and a total content of palladium has a platinum:palladium weight ratio from about 8:1 to about 1:1.

Embodiment 44. The coated substrate of Embodiment 43, wherein a total content of platinum and a total content of palladium has a platinum:palladium weight ratio from about 7:1 to about 2:1.

Embodiment 45. The coated substrate of Embodiment 43 or 44, wherein a total content of platinum and a total content of palladium has a platinum:palladium weight ratio from about 6:1 to about 3:1.

Embodiment 46. The coated substrate of any one of Embodiments 43-45, wherein a total content of platinum and a total content of palladium has a platinum:palladium weight ratio from about 5:1 to about 3.5:1.

Embodiment 47. The coated substrate of any one of Embodiments 43-46, wherein a total content of platinum and a total content of palladium has a platinum:palladium weight ratio of about 4:1.

Embodiment 48. The coated substrate of any one of Embodiments 1-47, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 49. The coated substrate of any one of Embodiments 1-48, wherein the coated substrate has a platinum group metal loading of about 3.0 g/l to about 4.0 g/l.

Embodiment 50. The coated substrate of any one of Embodiments 1-49, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 51. The coated substrate of any one of Embodiments 1-50, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 52. A catalytic converter comprising a coated substrate according to any one of Embodiments 1-51.

Embodiment 53. An exhaust treatment system comprising a conduit for exhaust gas and a catalytic converter according to Embodiment 52.

Embodiment 54. A diesel vehicle comprising a catalytic converter according to Embodiment 52.

Embodiment 55. The diesel vehicle of Embodiment 54, wherein said diesel vehicle is a light-duty diesel vehicle.

Embodiment 56. A method of treating an exhaust gas, comprising contacting the coated substrate of any one of Embodiments 1-51, with the exhaust gas.

Embodiment 57. A method of treating an exhaust gas, comprising contacting the coated substrate of any one of Embodiments 1-51 with the exhaust gas, wherein the substrate is housed within a catalytic converter configured to receive the exhaust gas.

Embodiment 58. A coated substrate comprising:
a substrate;
a washcoat layer comprising zeolite particles; and
a washcoat layer comprising catalytically active Nano-on-Nano-on-micro (NNm) particles comprising platinum, the catalytically active Nano-on-Nano-on-micro (NNm) particles comprising composite nanoparticles bonded to micron-sized carrier particles, and the composite nanoparticles comprising a support nanoparticle and a catalytic nanoparticle,
wherein a total content of platinum and a total content of palladium has a platinum:palladium weight ratio from about 8:1 to about 2.5:1.

Embodiment 59. The coated substrate of Embodiment 58, wherein the zeolite particles are iron-exchanged zeolite particles.

Embodiment 60. The coated substrate of Embodiment 59, wherein the iron-exchanged zeolite particles comprise between about 0.5% and about 15% iron by weight.

Embodiment 61. The coated substrate of Embodiment 59 or 60, wherein the iron-exchanged zeolite particles comprise between about 1% and about 10% iron by weight.

Embodiment 62. The coated substrate of any one of Embodiments 59-61, wherein the iron-exchanged zeolite particles comprise between about 2% and about 5% iron by weight.

Embodiment 63. The coated substrate of any one of Embodiments 59-62, wherein the iron-exchanged zeolite particles comprise about 3% iron by weight.

Embodiment 64. The coated substrate of Embodiment 58, wherein the washcoat layer comprising zeolite particles is formed on top of the washcoat layer comprising catalytically active Nano-on-Nano-on-micro (NNm) particles.

Embodiment 65. The coated substrate of Embodiment 58, wherein the washcoat layer comprising catalytically active Nano-on-Nano-on-micro (NNm) particles is formed on top of the washcoat layer comprising zeolite particles.

Embodiment 66. The coated substrate of Embodiment 58, wherein the washcoat layer comprising catalytically active Nano-on-Nano-on-micro (NNm) particles further comprises a filler material comprised of micron-sized particles comprising palladium.

Embodiment 67. The coated substrate of Embodiment 66, wherein the filler material is alumina.

Embodiment 68. The coated substrate of Embodiment 58, wherein the zeolite particles further comprise palladium.

Embodiment 69. The coated substrate of any one of Embodiments 59-63, wherein the iron-exchanged zeolite particles further comprise palladium.

Embodiment 70. The coated substrate of any one of Embodiments 58-69, wherein the catalytically active Nano-on-Nano-on-micro (NNm) particles comprise at least one platinum group metal.

Embodiment 71. The coated substrate of any one of Embodiments 58-70, wherein the catalytically active Nano-on-Nano-on-micro (NNm) particles comprise platinum.

Embodiment 72. The coated substrate of any one of Embodiments 58-71, wherein the catalytically active Nano-on-Nano-on-micro (NNm) particles comprise platinum and palladium.

Embodiment 73. The coated substrate of Embodiment 72, wherein the catalytically active Nano-on-Nano-on-micro (NNm) particles comprise platinum and palladium in a weight ratio from about 8:1 to about 1:1.

Embodiment 74. The coated substrate of Embodiment 72 or 73, wherein the catalytically active Nano-on-Nano-on-micro (NNm) particles comprise platinum and palladium in a weight ratio from about 7:1 to about 2:1.

Embodiment 75. The coated substrate of any one of Embodiments 72-74, wherein the catalytically active Nano-on-Nano-on-micro (NNm) particles comprise platinum and palladium in a weight ratio from about 6:1 to about 3:1.

Embodiment 76. The coated substrate of any one of Embodiments 72-75, wherein the catalytically active Nano-on-Nano-on-micro (NNm) particles comprise platinum and palladium in a weight ratio from about 5:1 to about 3.5:1.

Embodiment 77. The coated substrate of any one of Embodiments 72-76, wherein the catalytically active Nano-on-Nano-on-micro (NNm) particles comprise platinum and palladium in a weight ratio of about 4:1.

Embodiment 78. The coated substrate of any one of Embodiments 58-77, wherein the support nanoparticles have an average diameter of about 10 nm to about 20 nm.

Embodiment 79. The coated substrate of any one of Embodiments 58-78, wherein the support nanoparticles have an average diameter of about 1 nm to about 5 nm.

Embodiment 80. The coated substrate of any one of Embodiments 58-79, wherein the washcoat layer comprising zeolite particles comprises metal-oxide particles and boehmite particles.

Embodiment 81. The coated substrate of Embodiment 80, wherein the metal-oxide particles are aluminum-oxide particles.

Embodiment 82. The coated substrate of any one of Embodiments 58-81, wherein the zeolite particles comprise 60% to 80% by weight of the mixture of zeolite particles, metal-oxide particles, and boehmite particles in the washcoat layer comprising zeolite particles.

Embodiment 83. The coated substrate of any one of Embodiments 58-82, wherein the boehmite particles comprise 2% to 5% by weight of the mixture of zeolite particles, metal-oxide particles, and boehmite particles in the washcoat layer comprising zeolite particles.

Embodiment 84. The coated substrate of any one of Embodiments 58-83, wherein the metal-oxide particles comprise 15% to 38% by weight of the mixture of zeolite particles, metal-oxide particles, and boehmite particles in the washcoat layer comprising zeolite particles.

Embodiment 85. The coated substrate of any one of Embodiments 58-84, wherein the washcoat layer comprising zeolite particles does not include platinum group metals.

Embodiment 86. The coated substrate of any one of Embodiments 58-85, wherein the iron-exchanged zeolite particles in the washcoat layer comprising zeolite particles each have a diameter of 0.2 microns to 8 microns.

Embodiment 87. The coated substrate of any one of Embodiments 58-86, wherein the washcoat layer comprising catalytically active Nano-on-Nano-on micro (NNm) particles further comprises boehmite particles and silica particles.

Embodiment 88. The coated substrate of any one of Embodiments 58-87, wherein the washcoat layer comprising catalytically active Nano-on-Nano-on micro (NNm) particles is substantially free of zeolites.

Embodiment 89. The coated substrate of Embodiment 88, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat layer comprising catalytically active particles.

Embodiment 90. The coated substrate of Embodiment 88 or 89, wherein the silica particles are present in an amount up to 20% by weight of the combination of the catalytically active Nano-on-Nano-on micro (NNm) particles, boehmite particles, and silica particles in the washcoat layer comprising catalytically active Nano-on-Nano-on micro (NNm) particles.

Embodiment 91. The coated substrate of any one of Embodiments 88-90, wherein the boehmite particles comprise 2% to 5% by weight of the combination of the catalytically active Nano-on-Nano-on micro (NNm) particles, the boehmite particles, and the silica particles in the washcoat layer comprising catalytically active Nano-on-Nano-on micro (NNm) particles.

Embodiment 92. The coated substrate of Embodiment 88, wherein the washcoat layer comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 93. The coated substrate of any one of Embodiments 58-92, wherein the substrate comprises cordierite.

Embodiment 94. The coated substrate of any one of Embodiments 58-93, wherein the substrate comprises a honeycomb structure.

Embodiment 95. The coated substrate of any one of Embodiments 58-94, wherein the washcoat layer comprising iron-exchanged zeolite particles has a thickness of 25 g/l to 90 g/l.

Embodiment 96. The coated substrate of any one of Embodiments 58-95, wherein the washcoat layer comprising catalytically active Nano-on-Nano-on micro (NNm) particles has a thickness of 50 g/l to 250 g/l.

Embodiment 97. The coated substrate of any one of Embodiments 58-96, further comprising a corner-fill layer deposited directly on the substrate.

Embodiment 98. The coated substrate of Embodiment 97, wherein the corner-fill layer comprises zeolite particles.

Embodiment 99. The coated substrate of Embodiment 98, wherein the zeolite particles in the corner-fill layer comprise palladium.

Embodiment 100. The coated substrate of Embodiment 97, wherein the corner-fill layer comprises iron-exchanged zeolite particles.

Embodiment 101. The coated substrate of Embodiment 100, wherein the iron-exchanged zeolite particles in the corner-fill layer comprise palladium.

Embodiment 102. The coated substrate of Embodiment 97, wherein the corner-fill layer comprises catalytically active Nano-on-Nano-on micro (NNm) particles.

Embodiment 103. The coated substrate of any one of Embodiments 58-102, wherein a total content of platinum and a total content of palladium has a platinum:palladium weight ratio from about 8:1 to about 1:1.

Embodiment 104. The coated substrate of Embodiment 103, wherein a total content of platinum and a total content of palladium has a platinum:palladium weight ratio from about 7:1 to about 2:1.

Embodiment 105. The coated substrate of Embodiment 103 or 104, wherein a total content of platinum and a total content of palladium has a platinum:palladium weight ratio from about 6:1 to about 3:1.

Embodiment 106. The coated substrate of any one of Embodiments 103-105, wherein a total content of platinum and a total content of palladium has a platinum:palladium weight ratio from about 5:1 to about 3.5:1.

Embodiment 107. The coated substrate of any one of Embodiments 103-106, wherein a total content of platinum and a total content of palladium has a platinum:palladium weight ratio of about 4:1.

Embodiment 108. The coated substrate of any one of Embodiments 58-107, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 109. The coated substrate of any one of Embodiments 58-108, wherein the coated substrate has a platinum group metal loading of about 3.0 g/l to about 4.0 g/l.

Embodiment 110. The coated substrate of any one of Embodiments 58-109, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 111. The coated substrate of any one of Embodiments 58-110, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 112. A catalytic converter comprising a coated substrate according to any one of Embodiments 58-111.

Embodiment 113. An exhaust treatment system comprising a conduit for exhaust gas and a catalytic converter according to Embodiment 112.

Embodiment 114. A diesel vehicle comprising a catalytic converter according to Embodiment 112.

Embodiment 115. The diesel vehicle of Embodiment 114, wherein said diesel vehicle is a light-duty diesel vehicle.

Embodiment 116. A method of treating an exhaust gas, comprising contacting the coated substrate of any one of Embodiments 58-111, with the exhaust gas.

Embodiment 117. A method of treating an exhaust gas, comprising contacting the coated substrate of any one of Embodiments 58-111 with the exhaust gas, wherein the substrate is housed within a catalytic converter configured to receive the exhaust gas.

Embodiment 118. A coated substrate comprising:
a substrate;
a washcoat layer comprising zeolite particles; and
a washcoat layer comprising catalytically active Nano-on-Nano-on-micro (NNm) particles, the catalytically active Nano-on-Nano-on-micro (NNm) particles comprising composite nanoparticles bonded to micron-sized carrier particles, and the composite nanoparticles comprising a support nanoparticle and a catalytic nanoparticle, and wherein the zeolite particles comprise palladium.

Embodiment 119. The coated substrate of Embodiment 118, wherein the zeolite particles are iron-exchanged zeolite particles.

Embodiment 120. The coated substrate of Embodiment 119, wherein the iron-exchanged zeolite particles comprise between about 0.5% and about 15% iron by weight.

Embodiment 121. The coated substrate of Embodiment 119 or 120, wherein the iron-exchanged zeolite particles comprise between about 1% and about 10% iron by weight.

Embodiment 122. The coated substrate of any one of Embodiments 118-121, wherein the iron-exchanged zeolite particles comprise between about 2% and about 5% iron by weight.

Embodiment 123. The coated substrate of any one of Embodiments 118-122, wherein the iron-exchanged zeolite particles comprise about 3% iron by weight.

Embodiment 124. The coated substrate of Embodiment 118, wherein the washcoat layer comprising zeolite particles is formed on top of the washcoat layer comprising catalytically active Nano-on-Nano-on-micro (NNm) particles.

Embodiment 125. The coated substrate of Embodiment 118, wherein the washcoat layer comprising catalytically active Nano-on-Nano-on-micro (NNm) particles is formed on top of the washcoat layer comprising zeolite particles.

Embodiment 126. The coated substrate of Embodiment 118, wherein the washcoat layer comprising catalytically active Nano-on-Nano-on-micro (NNm) particles further comprises a filler material comprised of micron-sized particles comprising palladium.

Embodiment 127. The coated substrate of Embodiment 126, wherein the filler material is alumina.

Embodiment 128. The coated substrate of any one of Embodiments 118-127, wherein the catalytically active Nano-on-Nano-on-micro (NNm) particles comprise at least one platinum group metal.

Embodiment 129. The coated substrate of any one of Embodiments 118-128, wherein the catalytically active Nano-on-Nano-on-micro (NNm) particles comprise platinum.

Embodiment 130. The coated substrate of any one of Embodiments 118-129, wherein the catalytically active Nano-on-Nano-on-micro (NNm) particles comprise platinum and palladium.

Embodiment 131. The coated substrate of Embodiment 130, wherein the catalytically active Nano-on-Nano-on-micro (NNm) particles comprise platinum and palladium in a weight ratio from about 8:1 to about 1:1.

Embodiment 132. The coated substrate of Embodiment 130 or 131, wherein the catalytically active Nano-on-Nano-on-micro (NNm) particles comprise platinum and palladium in a weight ratio from about 7:1 to about 2:1.

Embodiment 133. The coated substrate of any one of Embodiments 130-132, wherein the catalytically active Nano-on-Nano-on-micro (NNm) particles comprise platinum and palladium in a weight ratio from about 6:1 to about 3:1.

Embodiment 134. The coated substrate of any one of Embodiments 130-133, wherein the catalytically active Nano-on-Nano-on-micro (NNm) particles comprise platinum and palladium in a weight ratio from about 5:1 to about 3.5:1.

Embodiment 135. The coated substrate of any one of Embodiments 130-134, wherein the catalytically active Nano-on-Nano-on-micro (NNm) particles comprise platinum and palladium in a weight ratio of about 4:1.

Embodiment 136. The coated substrate of any one of Embodiments 118-135, wherein the support nanoparticles have an average diameter of about 10 nm to about 20 nm Embodiment 137. The coated substrate of any one of Embodiments 118-136, wherein the support nanoparticles have an average diameter of about 1 nm to about 5 nm Embodiment 138. The coated substrate of any one of Embodiments 118-137, wherein the washcoat layer comprising iron-exchanged zeolite particles comprises metal-oxide particles and boehmite particles.

Embodiment 139. The coated substrate of Embodiment 138, wherein the metal-oxide particles are aluminum-oxide particles.

Embodiment 140. The coated substrate of any one of Embodiments 118-139, wherein the zeolite particles comprise 60% to 80% by weight of the mixture of zeolite particles, metal-oxide particles, and boehmite particles in the washcoat layer comprising zeolite particles.

Embodiment 141. The coated substrate of any one of Embodiments 118-140, wherein the boehmite particles comprise 2% to 5% by weight of the mixture of zeolite particles, metal-oxide particles, and boehmite particles in the washcoat layer comprising zeolite particles.

Embodiment 142. The coated substrate of any one of Embodiments 118-141, wherein the metal-oxide particles comprise 15% to 38% by weight of the mixture of zeolite particles, metal-oxide particles, and boehmite particles in the washcoat layer comprising zeolite particles.

Embodiment 143. The coated substrate of any one of Embodiments 118-142, wherein the washcoat layer comprising zeolite particles does not include platinum group metals.

Embodiment 144. The coated substrate of any one of Embodiments 118-143, wherein the zeolite particles in the washcoat layer comprising zeolite particles each have a diameter of 0.2 microns to 8 microns.

Embodiment 145. The coated substrate of any one of Embodiments 118-144, wherein the washcoat layer comprising catalytically active Nano-on-Nano-on micro (NNm) particles further comprises boehmite particles and silica particles.

Embodiment 146. The coated substrate of any one of Embodiments 118-145, wherein the washcoat layer comprising catalytically active Nano-on-Nano-on micro (NNm) particles is substantially free of zeolites.

Embodiment 147. The coated substrate of Embodiment 146, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat layer comprising catalytically active particles.

Embodiment 148. The coated substrate of Embodiment 146 or 147, wherein the silica particles are present in an amount up to 20% by weight of the combination of the catalytically active Nano-on-Nano-on micro (NNm) particles, boehmite particles, and silica particles in the washcoat layer comprising catalytically active Nano-on-Nano-on micro (NNm) particles.

Embodiment 149. The coated substrate of any one of Embodiments 146-148, wherein the boehmite particles comprise 2% to 5% by weight of the combination of the catalytically active Nano-on-Nano-on micro (NNm) particles, the boehmite particles, and the silica particles in the washcoat layer comprising catalytically active Nano-on-Nano-on micro (NNm) particles.

Embodiment 150. The coated substrate of Embodiment 146, wherein the washcoat layer comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 151. The coated substrate of any one of Embodiments 118-150, wherein the substrate comprises cordierite.

Embodiment 152. The coated substrate of any one of Embodiments 118-151, wherein the substrate comprises a honeycomb structure.

Embodiment 153. The coated substrate of any one of Embodiments 118-152, wherein the washcoat layer comprising iron-exchanged zeolite particles has a thickness of 25 g/l to 90 g/l.

Embodiment 154. The coated substrate of any one of Embodiments 118-153, wherein the washcoat layer comprising catalytically active Nano-on-Nano-on micro (NNm) particles has a thickness of 50 g/l to 250 g/l.

Embodiment 155. The coated substrate of any one of Embodiments 118-154, further comprising a corner-fill layer deposited directly on the substrate.

Embodiment 156. The coated substrate of Embodiment 155, wherein the corner-fill layer comprises zeolite particles.

Embodiment 157. The coated substrate of Embodiment 156, wherein the zeolite particles in the corner-fill layer comprise palladium.

Embodiment 158. The coated substrate of Embodiment 155, wherein the corner-fill layer comprises iron-exchanged zeolite particles.

Embodiment 159. The coated substrate of Embodiment 158, wherein the iron-exchanged zeolite particles in the corner-fill layer comprise palladium.

Embodiment 160. The coated substrate of Embodiment 155, wherein the corner-fill layer comprises catalytically active Nano-on-Nano-on micro (NNm) particles.

Embodiment 161. The coated substrate of any one of Embodiments 118-160, wherein a total content of platinum and a total content of palladium has a platinum:palladium weight ratio from about 8:1 to about 1:1.

Embodiment 162. The coated substrate of Embodiment 161, wherein a total content of platinum and a total content of palladium has a platinum:palladium weight ratio from about 7:1 to about 2:1.

Embodiment 163. The coated substrate of Embodiment 161 or 162, wherein a total content of platinum and a total content of palladium has a platinum:palladium weight ratio from about 6:1 to about 3:1.

Embodiment 164. The coated substrate of any one of Embodiments 161-163, wherein a total content of platinum and a total content of palladium has a platinum:palladium weight ratio from about 5:1 to about 3.5:1.

Embodiment 165. The coated substrate of any one of Embodiments 161-164, wherein a total content of platinum and a total content of palladium has a platinum:palladium weight ratio of about 4:1.

Embodiment 166. The coated substrate of any one of Embodiments 118-165, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 167. The coated substrate of any one of Embodiments 118-166, wherein the coated substrate has a platinum group metal loading of about 3.0 g/l to about 4.0 g/l.

Embodiment 168. The coated substrate of any one of Embodiments 118-167, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 169. The coated substrate of any one of Embodiments 118-168, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 170. A catalytic converter comprising a coated substrate according to any one of Embodiments 118-169.

Embodiment 171. An exhaust treatment system comprising a conduit for exhaust gas and a catalytic converter according to Embodiment 170.

Embodiment 172. A diesel vehicle comprising a catalytic converter according to Embodiment 170.

Embodiment 173. The diesel vehicle of Embodiment 172, wherein said diesel vehicle is a light-duty diesel vehicle.

Embodiment 174. A method of treating an exhaust gas, comprising contacting the coated substrate of any one of Embodiments 118-169, with the exhaust gas.

Embodiment 175. A method of treating an exhaust gas, comprising contacting the coated substrate of any one of Embodiments 118-169 with the exhaust gas, wherein the substrate is housed within a catalytic converter configured to receive the exhaust gas.

Embodiment 176. A coated substrate comprising:
a substrate;
a washcoat layer comprising zeolite particles; and
a washcoat layer comprising catalytically active Nano-on-Nano-on-micro (NNm) particles, said catalytically active Nano-on-Nano-on-micro (NNm) particles comprising composite nanoparticles bonded to micron-sized carrier particles, and the composite nanoparticles comprise a support nanoparticle and a catalytic nanoparticle;
wherein the washcoat layer comprising catalytically active Nano-on-Nano-on-micro (NNm) particles further comprises a filler material comprised of micron-sized carrier particles, and wherein the filler material comprises palladium.

Embodiment 177. The coated substrate of Embodiment 176, wherein the zeolite particles are iron-exchanged zeolite particles.

Embodiment 178. The coated substrate of Embodiment 177, wherein the iron-exchanged zeolite particles comprise between about 0.5% and about 15% iron by weight.

Embodiment 179. The coated substrate of Embodiment 177 or 178, wherein the iron-exchanged zeolite particles comprise between about 1% and about 10% iron by weight.

Embodiment 180. The coated substrate of any one of Embodiments 177-179, wherein the iron-exchanged zeolite particles comprise between about 2% and about 5% iron by weight.

Embodiment 181. The coated substrate of any one of Embodiments 177-180, wherein the iron-exchanged zeolite particles comprise about 3% iron by weight.

Embodiment 182. The coated substrate of Embodiment 176, wherein the filler material is alumina.

Embodiment 183. The coated substrate of Embodiment 176, wherein the washcoat layer comprising zeolite particles is formed on top of the washcoat layer comprising catalytically active Nano-on-Nano-on-micro (NNm) particles.

Embodiment 184. The coated substrate of Embodiment 176, wherein the washcoat layer comprising catalytically active Nano-on-Nano-on-micro (NNm) particles is formed on top of the washcoat layer comprising zeolite particles.

Embodiment 185. The coated substrate of Embodiment 176, wherein the zeolite particles further comprise palladium.

Embodiment 186. The coated substrate of any one of Embodiments 177-181, wherein the iron-exchanged zeolite particles further comprise palladium.

Embodiment 187. The coated substrate of any one of Embodiments 176-186, wherein the catalytically active Nano-on-Nano-on-micro (NNm) particles comprise at least one platinum group metal.

Embodiment 188. The coated substrate of any one of Embodiments 176-187, wherein the catalytically active Nano-on-Nano-on-micro (NNm) particles comprise platinum.

Embodiment 189. The coated substrate of any one of Embodiments 176-188, wherein the catalytically active Nano-on-Nano-on-micro (NNm) particles comprise platinum and palladium.

Embodiment 190. The coated substrate of Embodiment 189, wherein the catalytically active Nano-on-Nano-on-micro (NNm) particles comprise platinum and palladium in a weight ratio from about 8:1 to about 1:1.

Embodiment 191. The coated substrate of Embodiment 189 or 190, wherein the catalytically active Nano-on-Nano-on-micro (NNm) particles comprise platinum and palladium in a weight ratio from about 7:1 to about 2:1.

Embodiment 192. The coated substrate of any one of Embodiments 189-191, wherein the catalytically active Nano-on-Nano-on-micro (NNm) particles comprise platinum and palladium in a weight ratio from about 6:1 to about 3:1.

Embodiment 193. The coated substrate of any one of Embodiments 189-192, wherein the catalytically active Nano-on-Nano-on-micro (NNm) particles comprise platinum and palladium in a weight ratio from about 5:1 to about 3.5:1.

Embodiment 194. The coated substrate of any one of Embodiments 189-193, wherein the catalytically active Nano-on-Nano-on-micro (NNm) particles comprise platinum and palladium in a weight ratio of about 4:1.

Embodiment 195. The coated substrate of any one of Embodiments 176-194, wherein the support nanoparticles have an average diameter of about 10 nm to about 20 nm Embodiment 196. The coated substrate of any one of Embodiments 176-195, wherein the support nanoparticles have an average diameter of about 1 nm to about 5 nm Embodiment 197. The coated substrate of any one of Embodiments 176-196, wherein the washcoat layer comprising zeolite particles comprises metal-oxide particles and boehmite particles.

Embodiment 198. The coated substrate of Embodiment 197, wherein the metal-oxide particles are aluminum-oxide particles.

Embodiment 199. The coated substrate of any one of Embodiments 176-198, wherein the zeolite particles comprise 60% to 80% by weight of the mixture of iron-exchanged zeolite particles, metal-oxide particles, and boehmite particles in the washcoat layer comprising iron-exchanged zeolite particles.

Embodiment 200. The coated substrate of any one of Embodiments 176-199, wherein the boehmite particles comprise 2% to 5% by weight of the mixture of iron-exchanged zeolite particles, metal-oxide particles, and boehmite particles in the washcoat layer comprising iron-exchanged zeolite particles.

Embodiment 201. The coated substrate of any one of Embodiments 176-200, wherein the metal-oxide particles comprise 15% to 38% by weight of the mixture of zeolite particles, metal-oxide particles, and boehmite particles in the washcoat layer comprising zeolite particles.

Embodiment 202. The coated substrate of any one of Embodiments 176-201, wherein the washcoat layer comprising zeolite particles does not include platinum group metals.

Embodiment 203. The coated substrate of any one of Embodiments 176-202, wherein the zeolite particles in the washcoat layer comprising zeolite particles each have a diameter of 0.2 microns to 8 microns.

Embodiment 204. The coated substrate of any one of Embodiments 176-203, wherein the washcoat layer comprising catalytically active Nano-on-Nano-on micro (NNm) particles further comprises boehmite particles and silica particles.

Embodiment 205. The coated substrate of any one of Embodiments 176-204, wherein the washcoat layer comprising catalytically active Nano-on-Nano-on micro (NNm) particles is substantially free of zeolites.

Embodiment 206. The coated substrate of Embodiment 205, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat layer comprising catalytically active particles.

Embodiment 207. The coated substrate of Embodiment 205 or 206, wherein the silica particles are present in an amount up to 20% by weight of the combination of the catalytically active Nano-on-Nano-on micro (NNm) particles, boehmite particles, and silica particles in the washcoat layer comprising catalytically active Nano-on-Nano-on micro (NNm) particles.

Embodiment 208. The coated substrate of any one of Embodiments 205-207, wherein the boehmite particles comprise 2% to 5% by weight of the combination of the catalytically active Nano-on-Nano-on micro (NNm) particles, the boehmite particles, and the silica particles in the washcoat layer comprising catalytically active Nano-on-Nano-on micro (NNm) particles.

Embodiment 209. The coated substrate of Embodiment 205, wherein the washcoat layer comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 210. The coated substrate of any one of Embodiments 176-209, wherein the substrate comprises cordierite.

Embodiment 211. The coated substrate of any one of Embodiments 176-210, wherein the substrate comprises a honeycomb structure.

Embodiment 212. The coated substrate of any one of Embodiments 176-211, wherein the washcoat layer comprising iron-exchanged zeolite particles has a thickness of 25 g/l to 90 g/l.

Embodiment 213. The coated substrate of any one of Embodiments 176-212, wherein the washcoat layer comprising catalytically active Nano-on-Nano-on micro (NNm) particles has a thickness of 50 g/l to 250 g/l.

Embodiment 214. The coated substrate of any one of Embodiments 176-213, further comprising a corner-fill layer deposited directly on the substrate.

Embodiment 215. The coated substrate of Embodiment 214, wherein the corner-fill layer comprises zeolite particles.

Embodiment 216. The coated substrate of Embodiment 215 wherein the zeolite particles in the corner-fill layer comprise palladium.

Embodiment 217. The coated substrate of Embodiment 214, wherein the corner-fill layer comprises iron-exchanged zeolite particles.

Embodiment 218. The coated substrate of Embodiment 217, wherein the iron-exchanged zeolite particles in the corner-fill layer comprise palladium.

Embodiment 219. The coated substrate of Embodiment 214, wherein the corner-fill layer comprises catalytically active Nano-on-Nano-on micro (NNm) particles.

Embodiment 220. The coated substrate of any one of Embodiments 176-219, wherein a total content of platinum and a total content of palladium has a platinum:palladium weight ratio from about 8:1 to about 1:1.

Embodiment 221. The coated substrate of Embodiment 220, wherein a total content of platinum and a total content of palladium has a platinum:palladium weight ratio from about 7:1 to about 2:1.

Embodiment 222. The coated substrate of Embodiment 220 or 221, wherein a total content of platinum and a total content of palladium has a platinum:palladium weight ratio from about 6:1 to about 3:1.

Embodiment 223. The coated substrate of any one of Embodiments 220-222, wherein a total content of platinum and a total content of palladium has a platinum:palladium weight ratio from about 5:1 to about 3.5:1.

Embodiment 224. The coated substrate of any one of Embodiments 220-223, wherein a total content of platinum and a total content of palladium has a platinum:palladium weight ratio of about 4:1.

Embodiment 225. The coated substrate of any one of Embodiments 176-224, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 226. The coated substrate of any one of Embodiments 176-225, wherein the coated substrate has a platinum group metal loading of about 3.0 g/l to about 4.0 g/l.

Embodiment 227. The coated substrate of any one of Embodiments 176-226, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 228. The coated substrate of any one of Embodiments 176-227, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 229. A catalytic converter comprising a coated substrate according to any one of Embodiments 176-228.

Embodiment 230. An exhaust treatment system comprising a conduit for exhaust gas and a catalytic converter according to Embodiment 229.

Embodiment 231. A diesel vehicle comprising a catalytic converter according to Embodiment 229.

Embodiment 232. The diesel vehicle of Embodiment 231, wherein said diesel vehicle is a light-duty diesel vehicle.

Embodiment 233. A method of treating an exhaust gas, comprising contacting the coated substrate of any one of Embodiments 176-228, with the exhaust gas.

Embodiment 234. A method of treating an exhaust gas, comprising contacting the coated substrate of any one of Embodiments 176-228 with the exhaust gas, wherein the substrate is housed within a catalytic converter configured to receive the exhaust gas.

Embodiment 235. A method of forming a coated substrate, the method comprising:
a) coating a substrate with a washcoat composition comprising iron-exchanged zeolite particles; and
b) coating the substrate with a washcoat composition comprising catalytically active Nano-on-Nano-on-micro (NNm) particles comprising composite nanoparticles bonded to micron-sized carrier particles, and the composite nanoparticles comprise a support nanoparticle and a catalytic nanoparticle.

Embodiment 236. The method of Embodiment 235, wherein coating the substrate with the washcoat layer comprising iron-exchanged zeolite particles is performed before coating the substrate with the washcoat layer comprising catalytically active Nano-on-Nano-on-micro (NNm) particles.

Embodiment 237. The method of Embodiment 235, wherein coating the substrate with the washcoat layer comprising catalytically active Nano-on-Nano-on-micro (NNm) particles is performed before coating the substrate with the washcoat layer comprising iron-exchanged zeolite particles.

Embodiment 238. The method of any one of Embodiments 235-237, further comprising coating the substrate with a corner-fill washcoat prior to both step a) and step b).

Embodiment 239. The method of any one of Embodiments 235-238, wherein the iron-exchanged zeolite particles comprise between about 0.5% and about 15% iron by weight.

Embodiment 240. The method of any one of Embodiments 235-239, wherein the iron-exchanged zeolite particles comprise between about 1% and about 10% iron by weight.

Embodiment 241. The method of any one of Embodiments 235-240, wherein the iron-exchanged zeolite particles comprise between about 2% and about 5% iron by weight.

Embodiment 242. The method of any one of Embodiments 235-241, wherein the iron-exchanged zeolite particles comprise about 3% iron by weight.

Embodiment 243. The method of any one of Embodiments 235-242, wherein the washcoat composition comprising catalytically active Nano-on-Nano-on-micro (NNm) particles further comprises a filler material comprised of micron-sized particles comprising palladium.

Embodiment 244. The method of Embodiment 243, wherein the filler material is alumina.

Embodiment 245. The method of any one of Embodiments 235-244, wherein the iron-exchanged zeolite particles further comprise palladium.

Embodiment 246. The method of any one of Embodiments 235-245, wherein the catalytically active Nano-on-Nano-on-micro (NNm) particles comprise at least one platinum group metal.

Embodiment 247. The method of any one of Embodiments 235-246, wherein the catalytically active Nano-on-Nano-on-micro (NNm) particles comprise platinum.

Embodiment 248. The method of any one of Embodiments 235-247, wherein the catalytically active Nano-on-Nano-on-micro (NNm) particles comprise platinum and palladium.

Embodiment 249. The method of Embodiment 248, wherein the catalytically active Nano-on-Nano-on-micro (NNm) particles comprise platinum and palladium in a weight ratio from about 8:1 to about 1:1.

Embodiment 250. The method of Embodiment 248 or 249, wherein the catalytically active Nano-on-Nano-on-micro (NNm) particles comprise platinum and palladium in a weight ratio from about 7:1 to about 2:1.

Embodiment 251. The method of any one of Embodiments 248-250, wherein the catalytically active Nano-on-Nano-on-micro (NNm) particles comprise platinum and palladium in a weight ratio from about 6:1 to about 3:1.

Embodiment 252. The method of any one of Embodiments 248-251, wherein the catalytically active Nano-on-Nano-on-micro (NNm) particles comprise platinum and palladium in a weight ratio from about 5:1 to about 3.5:1.

Embodiment 253. The method of any one of Embodiments 248-252, wherein the catalytically active Nano-on-Nano-on-micro (NNm) particles comprise platinum and palladium in a weight ratio of about 4:1.

Embodiment 254. The method of any one of Embodiments 235-253, wherein the support nanoparticles have an average diameter of about 10 nm to about 20 nm Embodiment 255. The method of any one of Embodiments 235-254, wherein the support nanoparticles have an average diameter of about 1 nm to about 5 nm Embodiment 256. The method of any one of Embodiments 235-255, wherein the washcoat composition comprising iron-exchanged zeolite particles comprises metal-oxide particles and boehmite particles.

Embodiment 257. The method of Embodiment 256, wherein the metal-oxide particles are aluminum-oxide particles.

Embodiment 258. The method of any one of Embodiments 235-257, wherein the iron-exchanged zeolite particles comprise 60% to 80% by weight of the mixture of iron-exchanged zeolite particles, metal-oxide particles, and boehmite particles in the washcoat composition comprising iron-exchanged zeolite particles.

Embodiment 259. The method of any one of Embodiments 235-258, wherein the boehmite particles comprise 2% to 5% by weight of the mixture of iron-exchanged zeolite particles, metal-oxide particles, and boehmite particles in the washcoat composition comprising iron-exchanged zeolite particles.

Embodiment 260. The method of any one of Embodiments 235-259, wherein the metal-oxide particles comprise 15% to 38% by weight of the mixture of iron-exchanged zeolite particles, metal-oxide particles, and boehmite particles in the washcoat composition comprising iron-exchanged zeolite particles.

Embodiment 261. The method of any one of Embodiments 235-260, wherein the washcoat composition comprising iron-exchanged zeolite particles does not include platinum group metals.

Embodiment 262. The method of any one of Embodiments 235-261, wherein the iron-exchanged zeolite particles in the washcoat composition comprising iron-exchanged zeolite particles each have a diameter of 0.2 microns to 8 microns.

Embodiment 263. The method of any one of Embodiments 235-262, wherein the washcoat composition comprising catalytically active Nano-on-Nano-on micro (NNm) particles further comprises boehmite particles and silica particles.

Embodiment 264. The method of any one of Embodiments 235-262, wherein the washcoat composition comprising catalytically active Nano-on-Nano-on micro (NNm) particles is substantially free of zeolites.

Embodiment 265. The method of any one of Embodiments 235-264, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat composition comprising catalytically active particles.

Embodiment 266. The method of Embodiment 264 or 265, wherein the silica particles are present in an amount up to 20% by weight of the combination of the catalytically active Nano-on-Nano-on micro (NNm) particles, boehmite particles, and silica particles in the washcoat composition comprising catalytically active Nano-on-Nano-on micro (NNm) particles.

Embodiment 267. The method of any one of Embodiments 264-266, wherein the boehmite particles comprise 2% to 5% by weight of the combination of the catalytically active Nano-on-Nano-on micro (NNm) particles, the boehmite particles, and the silica particles in the washcoat composition comprising catalytically active Nano-on-Nano-on micro (NNm) particles.

Embodiment 268. The method of Embodiment 264, wherein the washcoat composition comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 269. The method of any one of Embodiments 235-268, wherein the substrate comprises cordierite.

Embodiment 270. The method of any one of Embodiments 235-269, wherein the substrate comprises a honeycomb structure.

Embodiment 271. The method of any one of Embodiments 235-270, wherein the washcoat composition comprising iron-exchanged zeolite particles has a thickness of 25 g/l to 90 g/l.

Embodiment 272. The method of any one of Embodiments 235-271, wherein the washcoat composition comprising catalytically active Nano-on-Nano-on micro (NNm) particles has a thickness of 50 g/l to 250 g/l.

Embodiment 273. The method of any one of Embodiments 235-272, further comprising coating the substrate with a corner-fill layer deposited directly on the substrate.

Embodiment 274. The method of Embodiment 273, wherein the corner-fill layer comprises zeolite particles.

Embodiment 275. The method of Embodiment 274, wherein the zeolite particles in the corner-fill layer are iron-exchanged zeolite particles.

Embodiment 276. The method of Embodiment 275, wherein the iron-exchanged zeolite particles in the corner-fill layer comprise palladium.

Embodiment 277. The method of Embodiment 273, wherein the corner-fill layer comprises catalytically active Nano-on-Nano-on micro (NNm) particles.

Embodiment 278. The method of any one of Embodiments 235-277, wherein a total content of platinum and a total content of palladium has a platinum:palladium weight ratio from about 8:1 to about 1:1.

Embodiment 279. The method of Embodiment 278, wherein a total content of platinum and a total content of palladium has a platinum:palladium weight ratio from about 7:1 to about 2:1.

Embodiment 280. The method of Embodiment 278 or 279, wherein a total content of platinum and a total content of palladium has a platinum:palladium weight ratio from about 6:1 to about 3:1.

Embodiment 281. The method of any one of Embodiments 278-280, wherein a total content of platinum and a total content of palladium has a platinum:palladium weight ratio from about 5:1 to about 3.5:1.

Embodiment 282. The method of any one of Embodiments 278-281, wherein a total content of platinum and a total content of palladium has a platinum:palladium weight ratio of about 4:1.

Embodiment 283. The method of any one of Embodiments 278-282, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 284. The method of any one of Embodiments 235-283, wherein the coated substrate has a platinum group metal loading of about 3.0 g/l to about 4.0 g/l.

Embodiment 285. The method of any one of Embodiments 235-284, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 286. The method of any one of Embodiments 235-285, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 287. A method of forming a coated substrate, the method comprising:
a) coating a substrate with a washcoat composition comprising zeolite particles; and
b) coating a substrate with a washcoat composition comprising catalytically active Nano-on-Nano-on-micro (NNm) particles comprising platinum, said catalytically active Nano-on-Nano-on-micro (NNm) particles comprising composite nanoparticles bonded to micron-sized carrier particles, and the composite nanoparticles comprise a support nanoparticle and a catalytic nanoparticle, wherein a total content of platinum and a total content of palladium has a platinum:palladium weight ratio from about 8:1 to about 2.5:1.

Embodiment 288. The method of Embodiment 287, wherein the zeolite particles are iron-exchanged zeolite particles.

Embodiment 289. The method of Embodiment 288, wherein the iron-exchanged zeolite particles comprise between about 0.5% and about 15% iron by weight.

Embodiment 290. The method of Embodiment 288 or 289, wherein the iron-exchanged zeolite particles comprise between about 1% and about 10% iron by weight.

Embodiment 291. The method of any one of Embodiments 288-290, wherein the iron-exchanged zeolite particles comprise between about 2% and about 5% iron by weight.

Embodiment 292. The method of any one of Embodiments 288-291, wherein the iron-exchanged zeolite particles comprise about 3% iron by weight.

Embodiment 293. The method of Embodiment 287, wherein coating the substrate with the washcoat composition comprising zeolite particles is performed before coating the substrate with the washcoat composition comprising catalytically active Nano-on-Nano-on-micro (NNm) particles.

Embodiment 294. The method of Embodiment 287, wherein coating the substrate with the washcoat composition comprising catalytically active Nano-on-Nano-on-micro (NNm) particles is performed before coating the substrate with the washcoat composition comprising zeolite particles.

Embodiment 295. The method of Embodiment 287, wherein the washcoat composition comprising catalytically active Nano-on-Nano-on-micro (NNm) particles further comprises a filler material comprised of micron-sized particles comprising palladium.

Embodiment 296. The method of Embodiment 295, wherein the filler material is alumina.

Embodiment 297. The method of Embodiment 287, wherein the zeolite particles further comprise palladium.

Embodiment 298. The method of any one of Embodiments 288-292, wherein the iron-exchanged zeolite particles further comprise palladium.

Embodiment 299. The method of any one of Embodiments 287-298, wherein the catalytically active Nano-on-Nano-on-micro (NNm) particles comprise at least one platinum group metal.

Embodiment 300. The method of any one of Embodiments 287-299, wherein the catalytically active Nano-on-Nano-on-micro (NNm) particles comprise platinum.

Embodiment 301. The method of any one of Embodiments 287-300, wherein the catalytically active Nano-on-Nano-on-micro (NNm) particles comprise platinum and palladium.

Embodiment 302. The method of Embodiment 301, wherein the catalytically active Nano-on-Nano-on-micro (NNm) particles comprise platinum and palladium in a weight ratio from about 8:1 to about 1:1.

Embodiment 303. The method of Embodiment 301 or 302, wherein the catalytically active Nano-on-Nano-on-micro (NNm) particles comprise platinum and palladium in a weight ratio from about 7:1 to about 2:1.

Embodiment 304. The method of any one of Embodiments 301-303, wherein the catalytically active Nano-on-Nano-on-micro (NNm) particles comprise platinum and palladium in a weight ratio from about 6:1 to about 3:1.

Embodiment 305. The method of any one of Embodiments 301-304, wherein the catalytically active Nano-on-Nano-on-micro (NNm) particles comprise platinum and palladium in a weight ratio from about 5:1 to about 3.5:1.

Embodiment 306. The method of any one of Embodiments 301-305, wherein the catalytically active Nano-on-Nano-on-micro (NNm) particles comprise platinum and palladium in a weight ratio of about 4:1.

Embodiment 307. The method of any one of Embodiments 287-306, wherein the support nanoparticles have an average diameter of about 10 nm to about 20 nm.

Embodiment 308. The method of any one of Embodiments 287-307, wherein the support nanoparticles have an average diameter of about 1 nm to about 5 nm.

Embodiment 309. The method of any one of Embodiments 287-308, wherein the washcoat composition comprising iron-exchanged zeolite particles comprises metal-oxide particles and boehmite particles.

Embodiment 310. The method of Embodiment 309, wherein the metal-oxide particles are aluminum-oxide particles.

Embodiment 311. The method of any one of Embodiments 287-310, wherein the iron-exchanged zeolite particles comprise 60% to 80% by weight of the mixture of iron-exchanged zeolite particles, metal-oxide particles, and boehmite particles in the washcoat composition comprising iron-exchanged zeolite particles.

Embodiment 312. The c method of any one of Embodiments 287-311, wherein the boehmite particles comprise 2% to 5% by weight of the mixture of iron-exchanged zeolite particles, metal-oxide particles, and boehmite particles in the washcoat composition comprising iron-exchanged zeolite particles.

Embodiment 313. The method of any one of Embodiments 287-312, wherein the metal-oxide particles comprise 15% to 38% by weight of the mixture of iron-exchanged zeolite particles, metal-oxide particles, and boehmite particles in the washcoat composition comprising iron-exchanged zeolite particles.

Embodiment 314. The method of any one of Embodiments 287-313, wherein the washcoat composition comprising iron-exchanged zeolite particles does not include platinum group metals.

Embodiment 315. The method of any one of Embodiments 287-314, wherein the iron-exchanged zeolite particles in the washcoat composition comprising iron-exchanged zeolite particles each have a diameter of 0.2 microns to 8 microns.

Embodiment 316. The method of any one of Embodiments 287-315, wherein the washcoat composition comprising catalytically active Nano-on-Nano-on micro (NNm) particles further comprises boehmite particles and silica particles.

Embodiment 317. The method of any one of Embodiments 287-316, wherein the washcoat composition comprising catalytically active Nano-on-Nano-on micro (NNm) particles is substantially free of zeolites.

Embodiment 318. The method of Embodiment 317, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat composition comprising catalytically active particles.

Embodiment 319. The method of Embodiment 317 or 318, wherein the silica particles are present in an amount up to 20% by weight of the combination of the catalytically active Nano-on-Nano-on micro (NNm) particles, boehmite particles, and silica particles in the washcoat composition comprising catalytically active Nano-on-Nano-on micro (NNm) particles.

Embodiment 320. The method of any one of Embodiments 317-319, wherein the boehmite particles comprise 2% to 5% by weight of the combination of the catalytically active Nano-on-Nano-on micro (NNm) particles, the boehmite particles, and the silica particles in the washcoat composition comprising catalytically active Nano-on-Nano-on micro (NNm) particles.

Embodiment 321. The method of Embodiment 317, wherein the washcoat composition comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 322. The method of any one of Embodiments 287-321, wherein the substrate comprises cordierite.

Embodiment 323. The method of any one of Embodiments 287-322, wherein the substrate comprises a honeycomb structure.

Embodiment 324. The method of any one of Embodiments 287-323, wherein the washcoat composition comprising iron-exchanged zeolite particles has a thickness of 25 g/l to 90 g/l.

Embodiment 325. The method of any one of Embodiments 287-324, wherein the washcoat composition comprising catalytically active Nano-on-Nano-on micro (NNm) particles has a thickness of 50 g/l to 250 g/l.

Embodiment 326. The method of any one of Embodiments 287-325, further comprising coating the substrate with a corner-fill layer prior to both step a) and b).

Embodiment 327. The method of Embodiment 326, wherein the corner-fill layer comprises zeolite particles.

Embodiment 328. The method of Embodiment 327, wherein the zeolite particles in the corner-fill layer comprise palladium.

Embodiment 329. The method of Embodiment 326, wherein the corner-fill layer comprises iron-exchanged zeolite particles.

Embodiment 330. The method of Embodiment 329, wherein the iron-exchanged zeolite particles in the corner-fill layer comprise palladium.

Embodiment 331. The method of Embodiment 326, wherein the corner-fill layer comprises catalytically active Nano-on-Nano-on micro (NNm) particles.

Embodiment 332. The method of any one of Embodiments 287-331, wherein a total content of platinum and a total content of palladium has a platinum:palladium weight ratio from about 8:1 to about 1:1.

Embodiment 333. The method of Embodiment 332, wherein a total content of platinum and a total content of palladium has a platinum:palladium weight ratio from about 7:1 to about 2:1.

Embodiment 334. The method of Embodiment 332 or 333, wherein a total content of platinum and a total content of palladium has a platinum:palladium weight ratio from about 6:1 to about 3:1.

Embodiment 335. The method of any one of Embodiments 332-334, wherein a total content of platinum and a total content of palladium has a platinum:palladium weight ratio from about 5:1 to about 3.5:1.

Embodiment 336. The method of any one of Embodiments 332-335, wherein a total content of platinum and a total content of palladium has a platinum:palladium weight ratio of about 4:1.

Embodiment 337. The method of any one of Embodiments 287-336, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 338. The method of any one of Embodiments 287-337, wherein the coated substrate has a platinum group metal loading of about 3.0 g/l to about 4.0 g/l.

Embodiment 339. The method of any one of Embodiments 287-338, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 340. The method of any one of Embodiments 287-339, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 341. A method of forming a coated substrate comprising:
a) coating a substrate with a washcoat composition comprising zeolite particles; and
b) coating a substrate with a washcoat composition comprising catalytically active Nano-on-Nano-on-micro (NNm) particles, said catalytically active Nano-on-Nano-on-micro (NNm) particles comprising composite nanoparticles bonded to micron-sized carrier particles, and the composite nanoparticles comprise a support nanoparticle and a catalytic nanoparticle, and wherein the zeolite particles comprise palladium.

Embodiment 342. The method of Embodiment 341, wherein the zeolite particles are iron-exchanged zeolite particles. Embodiment 343.

The method of Embodiment 342, wherein the iron-exchanged zeolite particles comprise between about 0.5% and about 15% iron by weight.

Embodiment 344. The method of Embodiment 342 or 343, wherein the iron-exchanged zeolite particles comprise between about 1% and about 10% iron by weight.

Embodiment 345. The method of any one of Embodiments 341-344, wherein the iron-exchanged zeolite particles comprise between about 2% and about 5% iron by weight.

Embodiment 346. The method of any one of Embodiments 341-345, wherein the iron-exchanged zeolite particles comprise about 3% iron by weight.

Embodiment 347. The method of Embodiment 341, wherein coating the substrate with the washcoat composition comprising zeolite particles is performed before coating the substrate with the washcoat composition comprising catalytically active Nano-on-Nano-on-micro (NNm) particles.

Embodiment 348. The method of Embodiment 341, wherein coating the substrate with the washcoat composition comprising catalytically active Nano-on-Nano-on-micro (NNm) particles is performed before coating the substrate with the washcoat composition comprising zeolite particles.

Embodiment 349. The method of Embodiment 341, wherein the washcoat composition comprising catalytically active Nano-on-Nano-on-micro (NNm) particles further comprises a filler material comprised of micron-sized particles comprising palladium.

Embodiment 350. The method of Embodiment 349, wherein the filler material is alumina.

Embodiment 351. The method of any one of Embodiments 341-350, wherein the catalytically active Nano-on-Nano-on-micro (NNm) particles comprise at least one platinum group metal.

Embodiment 352. The method of any one of Embodiments 341-351, wherein the catalytically active Nano-on-Nano-on-micro (NNm) particles comprise platinum.

Embodiment 353. The method of any one of Embodiments 341-352, wherein the catalytically active Nano-on-Nano-on-micro (NNm) particles comprise platinum and palladium.

Embodiment 354. The method of Embodiment 353, wherein the catalytically active Nano-on-Nano-on-micro (NNm) particles comprise platinum and palladium in a weight ratio from about 8:1 to about 1:1.

Embodiment 355. The method of Embodiment 353 or 354, wherein the catalytically active Nano-on-Nano-on-micro (NNm) particles comprise platinum and palladium in a weight ratio from about 7:1 to about 2:1.

Embodiment 356. The method of any one of Embodiments 353-355, wherein the catalytically active Nano-on-Nano-on-micro (NNm) particles comprise platinum and palladium in a weight ratio from about 6:1 to about 3:1.

Embodiment 357. The method of any one of Embodiments 353-356, wherein the catalytically active Nano-on-Nano-on-micro (NNm) particles comprise platinum and palladium in a weight ratio from about 5:1 to about 3.5:1.

Embodiment 358. The method of any one of Embodiments 353-357, wherein the catalytically active Nano-on-Nano-on-micro (NNm) particles comprise platinum and palladium in a weight ratio of about 4:1.

Embodiment 359. The method of any one of Embodiments 341-358, wherein the support nanoparticles have an average diameter of about 10 nm to about 20 nm Embodiment 360. The method of any one of Embodiments 341-359, wherein the support nanoparticles have an average diameter of about 1 nm to about 5 nm Embodiment 361. The method of any one of Embodiments 341-360, wherein the washcoat composition comprising zeolite particles comprises metal-oxide particles and boehmite particles.

Embodiment 362. The method of Embodiment 361, wherein the metal-oxide particles are aluminum-oxide particles.

Embodiment 363. The method of any one of Embodiments 341-362, wherein the zeolite particles comprise 60% to 80% by weight of the mixture of zeolite particles, metal-oxide particles, and boehmite particles in the washcoat composition comprising zeolite particles.

Embodiment 364. The method of any one of Embodiments 341-363, wherein the boehmite particles comprise 2% to 5% by weight of the mixture of zeolite particles, metal-oxide particles, and boehmite particles in the washcoat composition comprising zeolite particles.

Embodiment 365. The method of any one of Embodiments 341-364, wherein the metal-oxide particles comprise 15% to 38% by weight of the mixture of zeolite particles, metal-oxide particles, and boehmite particles in the washcoat composition comprising zeolite particles.

Embodiment 366. The method of any one of Embodiments 341-365, wherein the washcoat composition comprising zeolite particles does not include platinum group metals.

Embodiment 367. The method of any one of Embodiments 341-366, wherein the zeolite particles in the washcoat composition comprising zeolite particles each have a diameter of 0.2 microns to 8 microns.

Embodiment 368. The method of any one of Embodiments 341-367, wherein the washcoat composition comprising catalytically active Nano-on-Nano-on micro (NNm) particles further comprises boehmite particles and silica particles.

Embodiment 369. The method of any one of Embodiments 341-368, wherein the washcoat composition comprising catalytically active Nano-on-Nano-on micro (NNm) particles is substantially free of zeolites.

Embodiment 370. The method of Embodiment 369, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat composition comprising catalytically active particles.

Embodiment 371. The method of Embodiment 369 or 370, wherein the silica particles are present in an amount up to 20% by weight of the combination of the catalytically active Nano-on-Nano-on micro (NNm) particles, boehmite particles, and silica particles in the washcoat composition comprising catalytically active Nano-on-Nano-on micro (NNm) particles.

Embodiment 372. The method of any one of Embodiments 369-371, wherein the boehmite particles comprise 2% to 5% by weight of the combination of the catalytically active Nano-on-Nano-on micro (NNm) particles, the boehmite particles, and the silica particles in the washcoat composition comprising catalytically active Nano-on-Nano-on micro (NNm) particles.

Embodiment 373. The method of Embodiment 369, wherein the washcoat layer comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 374. The method of any one of Embodiments 341-373, wherein the substrate comprises cordierite.

Embodiment 375. The method of any one of Embodiments 341-374, wherein the substrate comprises a honeycomb structure.

Embodiment 376. The method of any one of Embodiments 341-375, wherein the washcoat composition comprising zeolite particles has a thickness of 25 g/l to 90 g/l.

Embodiment 377. The method of any one of Embodiments 341-376, wherein the washcoat composition comprising catalytically active Nano-on-Nano-on micro (NNm) particles has a thickness of 50 g/l to 250 g/l.

Embodiment 378. The method of any one of Embodiments 341-377, further comprising coating the substrate with a corner-fill washcoat prior to both step a) and step b).

Embodiment 379. The method of Embodiment 378, wherein the corner-fill layer comprises zeolite particles.

Embodiment 380. The method of Embodiment 379, wherein the zeolite particles in the corner-fill layer comprise palladium.

Embodiment 381. The method of Embodiment 378, wherein the corner-fill layer comprises iron-exchanged zeolite particles.

Embodiment 382. The method of Embodiment 381, wherein the iron-exchanged zeolite particles in the corner-fill layer comprise palladium.

Embodiment 383. The method of Embodiment 378, wherein the corner-fill layer comprises catalytically active Nano-on-Nano-on micro (NNm) particles.

Embodiment 384. The method of any one of Embodiments 341-383, wherein a total content of platinum and a total content of palladium has a platinum:palladium weight ratio from about 8:1 to about 1:1.

Embodiment 385. The method of Embodiment 384, wherein a total content of platinum and a total content of palladium has a platinum:palladium weight ratio from about 7:1 to about 2:1.

Embodiment 386. The method of Embodiment 384 or 385, wherein a total content of platinum and a total content of palladium has a platinum:palladium weight ratio from about 6:1 to about 3:1.

Embodiment 387. The method of any one of Embodiments 384-386, wherein a total content of platinum and a total content of palladium has a platinum:palladium weight ratio from about 5:1 to about 3.5:1.

Embodiment 388.The method of any one of Embodiments 384-387, wherein a total content of platinum and a total content of palladium has a platinum:palladium weight ratio of about 4:1.

Embodiment 389. The method of any one of Embodiments 384-388, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 390. The method of any one of Embodiments 384-389, wherein the coated substrate has a platinum group metal loading of about 3.0 g/l to about 4.0 g/l.

Embodiment 391. The method of any one of Embodiments 384-390, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 392. The method of any one of Embodiments 384-391, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 393. A method of forming a coated substrate, the method comprising:
a) coating a substrate with a washcoat composition comprising zeolite particles; and
b) coating the substrate with a washcoat composition comprising catalytically active Nano-on-Nano-on-micro (NNm) particles, said catalytically active Nano-on-Nano-on-micro (NNm) particles comprising composite nanoparticles bonded to micron-sized carrier particles, and the composite nanoparticles comprise a support nanoparticle and a catalytic nanoparticle;
wherein the washcoat composition comprising catalytically active Nano-on-Nano-on-micro (NNm) particles further comprises a filler material comprised of micron-sized carrier particles, and wherein the filler material comprises palladium.

Embodiment 394. The method of Embodiment 393, wherein the zeolite particles are iron-exchanged zeolite particles.

Embodiment 395. The method of Embodiment 394, wherein the iron-exchanged zeolite particles comprise between about 0.5% and about 15% iron by weight.

Embodiment 396. The method of Embodiment 394 or 395, wherein the iron-exchanged zeolite particles comprise between about 1% and about 10% iron by weight.

Embodiment 397. The method of any one of Embodiments 394-396, wherein the iron-exchanged zeolite particles comprise between about 2% and about 5% iron by weight.

Embodiment 398. The method of any one of Embodiments 394-397, wherein the iron-exchanged zeolite particles comprise about 3% iron by weight.

Embodiment 399. The method of Embodiment 393, wherein the filler material is alumina.

Embodiment 400. The method of Embodiment 393, wherein coating the substrate with the washcoat composition comprising zeolite particles is performed before coating the substrate with the washcoat composition comprising catalytically active Nano-on-Nano-on-micro (NNm) particles.

Embodiment 401 The method of Embodiment 393, wherein coating the substrate with the washcoat composition comprising catalytically active Nano-on-Nano-on-micro (NNm) particles is performed before coating the substrate with the washcoat composition comprising zeolite particles.

Embodiment 402. The method of Embodiment 393, wherein the zeolite particles further comprise palladium.

Embodiment 403. The method of any one of Embodiments 394-398, wherein the iron-exchanged zeolite particles further comprise palladium.

Embodiment 404. The method of any one of Embodiments 393-403, wherein the catalytically active Nano-on-Nano-on-micro (NNm) particles comprise at least one platinum group metal.

Embodiment 405. The method of any one of Embodiments 393-404, wherein the catalytically active Nano-on-Nano-on-micro (NNm) particles comprise platinum.

Embodiment 406. The method of any one of Embodiments 393-405, wherein the catalytically active Nano-on-Nano-on-micro (NNm) particles comprise platinum and palladium.

Embodiment 407. The method of Embodiment 406, wherein the catalytically active Nano-on-Nano-on-micro (NNm) particles comprise platinum and palladium in a weight ratio from about 8:1 to about 1:1.

Embodiment 408. The method of Embodiment 406 or 407, wherein the catalytically active Nano-on-Nano-on-micro (NNm) particles comprise platinum and palladium in a weight ratio from about 7:1 to about 2:1.

Embodiment 409. The method of any one of Embodiments 406-408, wherein the catalytically active Nano-on-Nano-on-micro (NNm) particles comprise platinum and palladium in a weight ratio from about 6:1 to about 3:1.

Embodiment 410. The method of any one of Embodiments 406-409, wherein the catalytically active Nano-on-Nano-on-micro (NNm) particles comprise platinum and palladium in a weight ratio from about 5:1 to about 3.5:1.

Embodiment 411. The method of any one of Embodiments 406-410, wherein the catalytically active Nano-on-Nano-on-micro (NNm) particles comprise platinum and palladium in a weight ratio of about 4:1.

Embodiment 412. The method of any one of Embodiments 393-411, wherein the support nanoparticles have an average diameter of about 10 nm to about 20 nm Embodiment 413. The method of any one of Embodiments 393-412, wherein the support nanoparticles have an average diameter of about 1 nm to about 5 nm Embodiment 414. The method of any one of Embodiments 393-413, wherein the washcoat composition comprising zeolite particles comprises metal-oxide particles and boehmite particles.

Embodiment 415. The method of Embodiment 414, wherein the metal-oxide particles are aluminum-oxide particles.

Embodiment 416. The method of any one of Embodiments 393-415, wherein the zeolite particles comprise 60% to 80% by weight of the mixture of zeolite particles, metal-oxide particles, and boehmite particles in the washcoat composition comprising zeolite particles.

Embodiment 417. The method of any one of Embodiments 393-416, wherein the boehmite particles comprise 2% to 5% by weight of the mixture of zeolite particles, metal-oxide particles, and boehmite particles in the washcoat composition comprising zeolite particles.

Embodiment 418. The method of any one of Embodiments 393-417, wherein the metal-oxide particles comprise 15% to 38% by weight of the mixture of zeolite particles, metal-oxide particles, and boehmite particles in the washcoat composition comprising zeolite particles.

Embodiment 419. The method of any one of Embodiments 393-418, wherein the washcoat composition comprising zeolite particles does not include platinum group metals.

Embodiment 420. The method of any one of Embodiments 393-419, wherein the zeolite particles in the washcoat composition comprising zeolite particles each have a diameter of 0.2 microns to 8 microns.

Embodiment 421. The method of any one of Embodiments 393-420, wherein the washcoat composition comprising catalytically active Nano-on-Nano-on micro (NNm) particles further comprises boehmite particles and silica particles.

Embodiment 422. The method of any one of Embodiments 393-421, wherein the washcoat composition comprising catalytically active Nano-on-Nano-on micro (NNm) particles is substantially free of zeolites.

Embodiment 423. The method of Embodiment 422, wherein the catalytically active Nano-on-Nano-on micro (NNm) particles comprise 35% to 95% by weight of the combination of the catalytically active Nano-on-Nano-on micro (NNm) particles, boehmite particles, and silica particles in the washcoat composition comprising catalytically active particles.

Embodiment 424. The method of Embodiment 422 or 423, wherein the silica particles are present in an amount up to 20% by weight of the combination of the catalytically active Nano-on-Nano-on micro (NNm) particles, boehmite particles, and silica particles in the washcoat composition comprising catalytically active Nano-on-Nano-on micro (NNm) particles.

Embodiment 425. The method of any one of Embodiments 422-424, wherein the boehmite particles comprise 2% to 5% by weight of the combination of the catalytically active Nano-on-Nano-on micro (NNm) particles, the boehmite particles, and the silica particles in the washcoat composition comprising catalytically active Nano-on-Nano-on micro (NNm) particles.

Embodiment 426. The method of Embodiment 422, wherein the washcoat composition comprising catalytically active Nano-on-Nano-on micro (NNm) particles comprises 92% by weight of the catalytically active Nano-on-Nano-on micro (NNm) particles, 3% by weight of the boehmite particles, and 5% by weight of the silica particles.

Embodiment 427. The method of any one of Embodiments 393-426, wherein the substrate comprises cordierite.

Embodiment 428. The method of any one of Embodiments 393-427, wherein the substrate comprises a honeycomb structure.

Embodiment 429. The method of any one of Embodiments 393-428, wherein the washcoat composition comprising iron-exchanged zeolite particles has a thickness of 25 g/l to 90 g/l.

Embodiment 430. The method of any one of Embodiments 393-429, wherein the washcoat composition comprising catalytically active Nano-on-Nano-on micro (NNm) particles has a thickness of 50 g/l to 250 g/l.

Embodiment 431. The method of any one of Embodiments 393-430, further comprising coating the substrate with a corner-fill layer prior to step a) and step b).

Embodiment 432. The method of Embodiment 431, wherein the corner-fill layer comprises zeolite particles.

Embodiment 433. The method of Embodiment 432, wherein the zeolite particles in the corner-fill layer comprise palladium.

Embodiment 434. The method of Embodiment 431, wherein the corner-fill layer comprises iron-exchanged zeolite particles.

Embodiment 435. The method of Embodiment 434, wherein the iron-exchanged zeolite particles in the corner-fill layer comprise palladium.

Embodiment 436. The method of Embodiment 431, wherein the corner-fill layer comprises catalytically active Nano-on-Nano-on micro (NNm) particles.

Embodiment 437. The method of any one of Embodiments 393-436, wherein a total content of platinum and a total content of palladium has a platinum:palladium weight ratio from about 8:1 to about 1:1.

Embodiment 438. The method of Embodiment 437, wherein a total content of platinum and a total content of palladium has a platinum:palladium weight ratio from about 7:1 to about 2:1.

Embodiment 439. The method of Embodiment 437 or 438, wherein a total content of platinum and a total content of palladium has a platinum:palladium weight ratio from about 6:1 to about 3:1.

Embodiment 440. The method of any one of Embodiments 437-439, wherein a total content of platinum and a total content of palladium has a platinum:palladium weight ratio from about 5:1 to about 3.5:1.

Embodiment 441. The method of any one of Embodiments 437-440, wherein a total content of platinum and a total content of palladium has a platinum:palladium weight ratio of about 4:1.

Embodiment 442. The method of any one of Embodiments 393-441, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 443. The method of any one of Embodiments 393-442, wherein the coated substrate has a platinum group metal loading of about 3.0 g/l to about 4.0 g/l.

Embodiment 444. The method of any one of Embodiments 393-443, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 445. The method of any one of Embodiments 393-444, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 446. A washcoat composition comprising a solids content of:
5% to 95% by weight of catalytically active Nano-on-Nano-on-micro (NNm) particles comprising composite nanoparticles bonded to micron-sized carrier particles, and the composite nanoparticles comprise a support nanoparticle and a catalytic nanoparticle;
2% to 5% by weight of boehmite particles; and
2% to 55% by weight of metal-oxide particles.

Embodiment 447. The washcoat composition of Embodiment 446, further comprising up to 20% by weight of silica particles.

Embodiment 448. The washcoat composition of Embodiment 446 or 447, wherein the metal-oxide particles are aluminum oxide particles.

Embodiment 449. The washcoat composition of Embodiment 448, wherein the aluminum oxide particles comprise palladium.

Embodiment 450. The washcoat composition of any one of Embodiments 446-449, wherein the solids are suspended in an aqueous medium at a pH between 3 and 5.

Embodiment 451. The washcoat composition of any one of Embodiments 446-450, said washcoat composition being characterized by being substantially free of zeolites.

Embodiment 452. The washcoat composition of any one of Embodiments 446-451, wherein said catalytically active Nano-on-Nano-on-micro (NNm) particles comprise 92% by weight of the solids content.

Embodiment 453. The washcoat composition of any one of Embodiments 446-452, wherein said catalytically active Nano-on-Nano-on-micro (NNm) particles comprise at least one platinum group metal.

Embodiment 454. The washcoat composition of any one of Embodiments 446-453, wherein the catalytically active Nano-on-Nano-on-micro (NNm) particles comprise platinum.

Embodiment 455. The washcoat composition of any one of Embodiments 446-454, wherein the catalytically active Nano-on-Nano-on-micro (NNm) particles comprise platinum and palladium.

Embodiment 456. The washcoat composition of Embodiment 455, wherein the catalytically active Nano-on-Nano-on-micro (NNm) particles comprise platinum and palladium in a weight ratio from about 8:1 to about 1:1.

Embodiment 457. The washcoat composition of Embodiment 455 or 456, wherein the catalytically active Nano-on-Nano-on-micro (NNm) particles comprise platinum and palladium in a weight ratio from about 7:1 to about 2:1.

Embodiment 458. The washcoat composition of any one of Embodiments 455-457, wherein the catalytically active Nano-on-Nano-on-micro (NNm) particles comprise platinum and palladium in a weight ratio from about 6:1 to about 3:1.

Embodiment 459. The washcoat composition of any one of Embodiments 455-458, wherein the catalytically active Nano-on-Nano-on-micro (NNm) particles comprise platinum and palladium in a weight ratio from about 5:1 to about 3.5:1.

Embodiment 460. The washcoat composition of any one of Embodiments 455-459, wherein the catalytically active Nano-on-Nano-on-micro (NNm) particles comprise platinum and palladium in a weight ratio of about 4:1.

Embodiment 461. A method of forming a coated substrate, the method comprising:
a) coating a substrate with a washcoat composition comprising zeolite particles; and
b) coating the substrate with a washcoat composition containing catalytically active Nano-on-Nano-on-micro (NNm) particles according to any one of Embodiments 446-459.

Embodiment 462. The method of Embodiment 461, wherein the zeolite particles are iron-exchanged zeolite particles.

Embodiment 463. The method of Embodiment 462, wherein the iron-exchanged zeolite particles comprise between about 0.5% and about 15% iron by weight.

Embodiment 464. The method of Embodiment 462 or 463, wherein the iron-exchanged zeolite particles comprise between about 1% and about 10% iron by weight.

Embodiment 465. The method of any one of Embodiments 462-464, wherein the iron-exchanged zeolite particles comprise between about 2% and about 5% iron by weight.

Embodiment 466. The method of any one of Embodiments 462-465, wherein the iron-exchanged zeolite particles comprise about 3% iron by weight.

Embodiment 467. The method of Embodiment 461, wherein the washcoat composition comprising zeolite particles is formed on top of the washcoat composition comprising catalytically active Nano-on-Nano-on-micro (NNm) particles.

Embodiment 468. The method of Embodiment 461, wherein the washcoat composition comprising catalytically active Nano-on-Nano-on-micro (NNm) particles is formed on top of the washcoat composition comprising zeolite particles.

Embodiment 469. The method of Embodiment 461, wherein the zeolite particles further comprise palladium.

Embodiment 470. The method of any one of Embodiments 462-466, wherein the iron-exchanged zeolite particles further comprise palladium.

Embodiment 471. The method of any one of Embodiments 462-470, further comprising a corner-fill layer deposited directly on the substrate.

Embodiment 472. The method of Embodiment 471, wherein the corner-fill layer comprises zeolite particles.

Embodiment 473. The method of Embodiment 472, wherein the zeolite particles in the corner-fill layer comprise palladium.

Embodiment 474. The method of Embodiment 471, wherein the corner-fill layer comprises iron-exchanged zeolite particles.

Embodiment 475. The method of Embodiment 474, wherein the iron-exchanged zeolite particles in the corner-fill layer comprise palladium.

Embodiment 476. The method of Embodiment 471, wherein the corner-fill layer comprises catalytically active Nano-on-Nano-on micro (NNm) particles.

Embodiment 477. The method of any one of Embodiments 462-476, wherein a total content of platinum and a total content of palladium has a platinum:palladium weight ratio from about 8:1 to about 1:1.

Embodiment 478. The method of Embodiment 477, wherein a total content of platinum and a total content of palladium has a platinum:palladium weight ratio from about 7:1 to about 2:1.

Embodiment 479. The method of Embodiment 477 or 478, wherein a total content of platinum and a total content of palladium has a platinum:palladium weight ratio from about 6:1 to about 3:1.

Embodiment 480. The method of any one of Embodiments 477-479, wherein a total content of platinum and a total content of palladium has a platinum:palladium weight ratio from about 5:1 to about 3.5:1.

Embodiment 481. The method of any one of Embodiments 477-479, wherein a total content of platinum and a total content of palladium has a platinum:palladium weight ratio of about 4:1.

Embodiment 482. The method of any one of Embodiments 461-481, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 483. The method of any one of Embodiments 461-482, wherein the coated substrate has a platinum group metal loading of about 3.0 g/l to about 4.0 g/l.

Embodiment 484. The method of any one of Embodiments 461-483, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 485. The method of any one of Embodiments 461-484, said coated substrate having a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 486. The method of any one of Embodiments 461-485, wherein the washcoat composition comprising iron-exchanged zeolite particles comprises a thickness of 25 g/l to 90 g/l.

Embodiment 487. The method of any one of Embodiments 461-486, wherein the washcoat composition comprising NNm catalytically active particles comprises a thickness of 50 g/l to 250 g/l.

Embodiment 488. A coated substrate comprising a washcoat according to any one of Embodiments 446-460.

Embodiment 489. A coated substrate comprising a washcoat according to any one of Embodiments 446-460, further comprising a washcoat layer comprising zeolite particles.

Embodiment 490. The coated substrate of Embodiment 489, wherein the zeolite particles comprise palladium.

Embodiment 491. The coated substrate of Embodiment 490, wherein the zeolite particles are iron-exchanged zeolite particles.

Embodiment 492. The coated substrate of Embodiment 491, wherein the iron-exchanged zeolite particles comprise between about 0.5% and about 15% iron by weight.

Embodiment 493. The coated substrate of Embodiment 491 or 492 wherein the iron-exchanged zeolite particles comprise between about 1% and about 10% iron by weight.

Embodiment 494. The coated substrate of any one of Embodiments 491-493, wherein the iron-exchanged zeolite particles comprise between about 2% and about 5% iron by weight.

Embodiment 495. The coated substrate of any one of Embodiments 491-494, wherein the iron-exchanged zeolite particles comprise about 3% iron by weight.

Embodiment 496. The coated substrate of any one of Embodiments 491-495, wherein the iron-exchanged zeolite particles comprise palladium.

Embodiment 497. A catalytic converter comprising a coated substrate according to any one of Embodiments 488-496.

Embodiment 498. An exhaust treatment system comprising a conduit for exhaust gas and a catalytic converter according to Embodiment 497.

Embodiment 499. A diesel vehicle comprising a catalytic converter according to Embodiment 497.

Embodiment 500. The diesel vehicle of Embodiment 499, wherein the diesel vehicle is a light-duty diesel vehicle.

Embodiment 501. The diesel vehicle of Embodiment 499, wherein the catalytic converter comprising between 3.0 g/l and 4.0 g/l of platinum group metal, wherein the vehicle complies with the European emission standard Euro 5.

Embodiment 502. The diesel vehicle of Embodiment 501, wherein the diesel vehicle is a light-duty diesel vehicle.

Embodiment 503. The vehicle of any of Embodiments 499-502, wherein the vehicle complies with the European emission standard Euro 6.

EXAMPLES

As discussed above, the washcoat compositions can be configured and applied in a variety of different ways. The configurations provide examples of preparing substrates coated with the washcoats.

General Procedure for Preparation of Washcoats

The washcoats are made by mixing the solid ingredients (about 30% by weight) with water (about 70% by weight). Acetic acid is added to adjust the pH to about 4. The washcoat slurry is then milled to arrive at an average particle size of about 4 μm to about 6 μm. The viscosity of the washcoat is adjusted by mixing with a cellulose solution or with corn starch to the desired viscosity, typically between about 300 cP to about 1200 cP. The washcoat is aged for about 24 hours to about 48 hours after cellulose or corn starch addition. The washcoat is coated onto the substrate by either dip-coating or vacuum coating. The part(s) to be coated can be optionally pre-wetted prior to coating. The washcoat amount coated onto the substrate can range from about 50 g/l to about 250 g/l. Excess washcoat is blown off and recycled. The washcoat-coated substrate is then dried at about 25° C. to about 95° C. by flowing air over the coated part, until the weight levels off. The washcoat-coated substrate is then calcined at about 450° C. to about 650° C. for about 1 hour to about 2 hours.

In one of these configurations, a first washcoat composition applied to a substrate comprises 3% (or approximately 3%) boehmite, 80% (or approximately 80%) zeolites, and 17% (or approximately 17%) porous alumina (e.g., MI-386 or the like), while a second washcoat composition comprises 3% (or approximately 3%) boehmite, 5% (or approximately 5%) silica (or, in another embodiment, instead of silica, 5% zeolites or approximately 5% zeolites), and 92% (or approximately 92%) catalytic powder (i.e., the powder containing the catalytic material), wherein the catalytic powder is NNm Powder (catalytic nanoparticle on support nanoparticle on support micro-particle).

The ingredients discussed above for the first washcoat composition are mixed with water and acid, such as acetic acid, and the pH is adjusted to about 4. After adjusting the viscosity to the proper levels, this first washcoat is coated onto the substrate with an approximate layer thickness of 70 g/l.

This first washcoat layer is then dried and calcined. Following this first washcoating step, a second washcoating step is applied, where the ingredients discussed above for the second washcoat composition are mixed with water and acid, such as acetic acid, and the pH is adjusted to about 4. After adjusting the viscosity to the proper levels, this second washcoat is coated onto the substrate with an approximate layer thickness of 120 g/l. This second washcoat layer is then dried and calcined.

Example 1

Substrate-Zeolite Particles-Catalytic Powder Configuration, or S-Z-C, Configuration: No Zeolites in Catalyst-Containing Washcoat (a) First Washcoat Composition: Approx. 70 g/l as Follows:
  3% Boehmite
  80% Zeolites
  17% Porous alumina (MI-386 or the like)
(b) Second Washcoat Composition: Approx. 120 g/l as Follows:
  3% Boehmite;
  5% Silica;
  92% NNm Powder (nanoparticle on nanoparticle on micro-particle), the powder that contains the PGM, i.e. the platinum group metals or precious metals.

Mix the washcoat ingredients from (a) with water and acetic acid and to adjust the pH to about 4. After adjusting the viscosity to the proper levels, the washcoat is coated onto the substrate with an approximate layer thickness of 70 g/l. Excess washcoat is blown off and recycled. This first washcoat layer is then dried and calcined. Following this first washcoating step, a second washcoating step is performed: the ingredients from (b) are mixed with water and acetic acid and the pH adjusted to about 4. After adjusting the viscosity to the proper levels the washcoat is coated onto the substrate with an approximate layer thickness of 120 g/l. Again, excess washcoat is blown off and recycled. This second washcoat layer is then dried and calcined.

Example 2

Substrate-Zeolite Particles-Catalytic Powder Configuration, or S-Z-C, Configuration: Zeolites Present in Catalyst-Containing Washcoat (a) First Washcoat Composition: Approx. 70 g/l as Follows:
  3% Boehmite
  80% Zeolites
  17% Porous alumina (MI-386 or the like)
(b) Second Washcoat Composition: Approx. 120 g/l as Follows:
  3% Boehmite;
  5% Zeolites;
  92% NNm Powder (catalytic nanoparticle on support nanoparticle on support micro-particle), the powder that contains the PGM, i.e. the platinum group metals or precious metals.

The same procedure described in Example 1 is used to coat the substrate in this example.

Example 3

Additional Example of Substrate-Zeolite Particles-Catalytic Powder, or S-Z-C, Configuration (a) First Washcoat Composition: 25 g/l to 90 g/l (approximately. 60 g/l or approximately 70 g/l preferred) as follows:
  2-5% Boehmite (about 3% preferred);
  60-80% Zeolites, such as 75-80% Zeolites (about 80% preferred);
  15-38% Porous alumina (MI-386 or the like), such as 15-22% Porous alumina (about 17% to about 22% preferred).

(b) Second Washcoat Composition: 50 g/l to 250 g/l (approximately 120 g/l preferred) as follows:
2-5% Boehmite (about 3% preferred);
0-20% Silica (about 5% preferred);
40-92% catalytically active powder (about 92% preferred); and
0-52% porous alumina (about 0% preferred).

The same procedure described in Example 1 is used to coat the substrate in this example. In another embodiment, 0-20% Zeolites are used instead of the 0-20% Silica (with about 5% being the preferred amount of Zeolite used).

Example 4

Substrate-Corner Fill-Catalytic Particle-Zeolite, or S-F-C-Z, Configuration

In another advantageous configuration, a first washcoat composition applied to the substrate is a corner-fill washcoat applied to the substrate. The solids content of the corner-fill washcoat comprises about 97% by weight porous alumina (MI-386) and about 3% by weight boehmite. Water and acetic acid are added to the corner fill washcoat, the pH is adjusted to about 4, and viscosity is adjusted. The corner-fill washcoat composition is applied to the substrate, excess washcoat is blown off and recycled, and the washcoat is dried and calcined. The zeolite-containing washcoat composition and the catalyst-containing washcoat composition illustrated in the foregoing examples can also be used in this example. Thus, a second washcoat composition is applied over the corner-fill washcoat layer, which comprises 3% (or approximately 3%) boehmite, 5% (or approximately 5%) silica, and 92% (or approximately 92%) catalytic powder (i.e., the powder containing the catalytic material). Excess catalyst-containing washcoat is blown off and recycled. After application, the catalyst-containing washcoat composition is dried and calcined. A third washcoat composition, applied over the catalyst-containing washcoat layer, comprises 3% (or approximately 3%) boehmite, 67% (or approximately 67%) zeolites, and 30% (or approximately 30%) porous alumina (e.g., MI-386 or the like). After application, excess zeolite particle-containing washcoat is blown off and recycled, and the zeolite particle-containing washcoat composition is dried and calcined.

Figure 4:
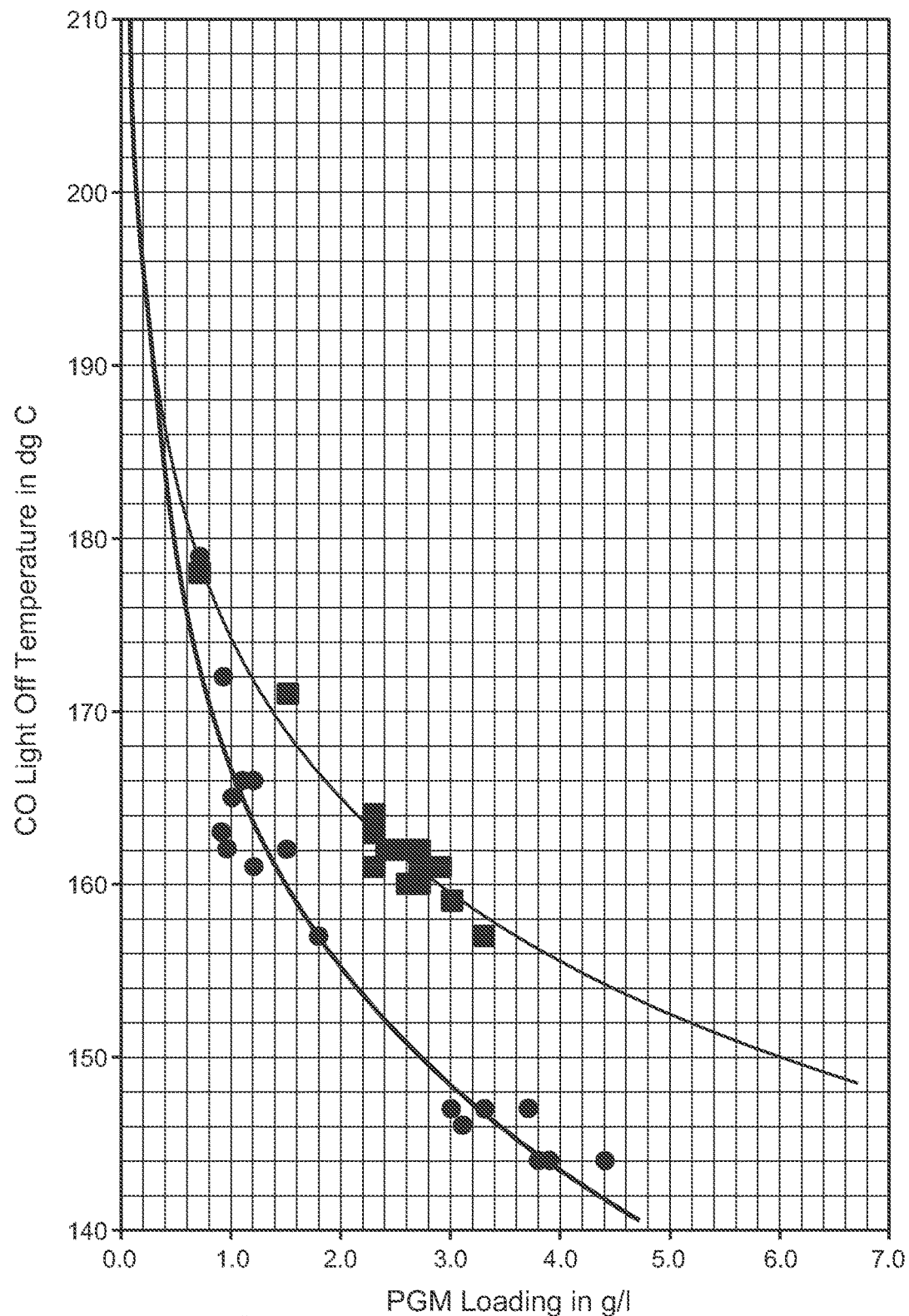
FIG. 4 compares the performance of one embodiment of the present invention (filled circles) to a combined washcoat (filled squares).

FIG. 4 illustrates the performance of a coated substrate prepared according to one embodiment, compared to the configuration used in nanoparticulate coated substrates prepared with a washcoat where the zeolites are not separated from the catalytic particles. All test results described below utilize catalysts which were artificially aged at 800° C. for 16 hours to simulate operation after 125,000 miles in a car.

The filled circles ● and the curve fit to those data points represent the following coating scheme:
a) A first layer which is a corner fill washcoat, followed by
b) A second layer which is a PGM washcoat using nano-on-nano-on-micron catalyst, containing 5% zeolites (that is, very low zeolite concentration). The PGM is 2:1 Pt/Pd.

For the simulation, this second layer may or may not be followed by a zeolite particle-containing washcoat layer. In actual practice, a zeolite particle-containing washcoat composition will be applied either under the PGM layer (that is, applied, dried, and calcined to the substrate prior to applying the PGM washcoat) or above the PGM layer (that is, applied, dried, and calcined to the substrate after applying the PGM washcoat).

The filled squares ■ and the line fit to those data points represent the following coating scheme:
a) A first layer which is a corner fill washcoat, followed by
b) A second layer which is a PGM washcoat, containing the entire zeolite amount (that is, all of the zeolites of the zeolite-containing washcoat layer are combined with the nano-on-nano-on-micron catalytic powder-containing layer). The PGM is 2:1 Pt/Pd.

The simulation is performed under steady-state conditions for experimental purposes (in actual operation, cold-start conditions are not steady-state). A carrier gas containing carbon monoxide, $NO_x$, and hydrocarbons is passed over the coated substrates, in order to simulate diesel exhaust. The temperature of the substrate is gradually raised until the light-off temperature is achieved (that is, when the coated substrate reaches a temperature sufficient to convert CO into $CO_2$).

As is evident from the graph, when compared to the coated substrate prepared with a combined washcoat of zeolite and PGM, the coated substrate prepared according to the present invention demonstrated either a lower light-off temperature for carbon monoxide at the same loading of platinum group metal (i.e., the coated substrate as described herein demonstrates better performance as compared to the coated substrate with a combined zeolite-PGM washcoat, while using the same amount of PGM), or required a lower loading of platinum group metal at the same light-off temperature (i.e., to obtain the same performance with the coated substrate described herein as compared to the coated substrate with a combined zeolite-PGM washcoat, less of the expensive PGM was required for the coated substrates described herein).

Specifically, the lowest light-off temperature attained with the combined zeolite-PGM washcoat was 157° C. at 3.3 g/l platinum group metal loading, while a coated substrate prepared according as described herein (using a catalytic layer with a low zeolite content) and with the same 3.3 g/l PGM loading had a light-off temperature of 147° C., a reduction in light-off temperature of 10° C. Thus, the low zeolite-containing washcoated substrate demonstrated superior performance at the same PGM loading.

The lowest light-off temperature of 157° C. was attained with the coated substrate having a combined zeolite-PGM washcoat at 3.3 g/l platinum group metal loading. A light-off temperature of 157° C. was attained with the coated substrate having the low zeolite-containing washcoat at a platinum group metal loading of 1.8 g/l, a reduction in platinum group metal loading of 1.5 g/l or 45%. Thus, the coated substrate with the low zeolite-containing washcoat demonstrated identical performance, at a significantly reduced PGM loading, to the coated substrate with the combined zeolite-PGM washcoat.

Figure 10:
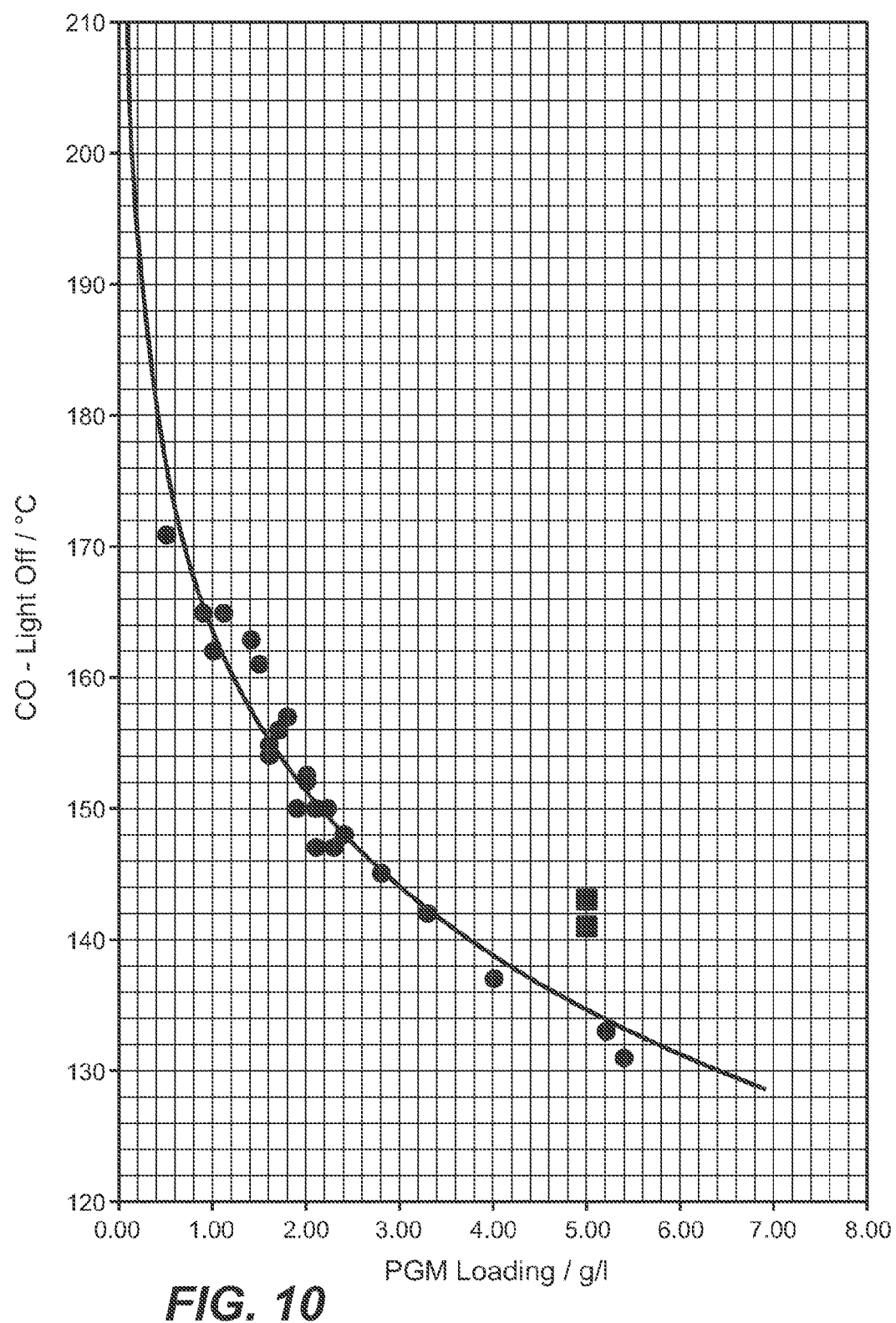
FIG. 10 compares the performance of one embodiment of the present invention (filled circles) to a standard commercially available catalytic converter (filled squares).

Comparison of Catalytic Converter Performance Described Herein to Commercially Available Catalytic Converters A. Improvement in Light-Off Temperatures FIG. 10 illustrates the performance of a coated substrate in a catalytic converter, where the coated substrate is prepared according to one embodiment of the present invention, compared to a commercially available catalytic converter having a substrate prepared using wet-chemistry methods. The coated substrates are artificially aged and tested in a similar fashion as that indicated in the section above in the description of FIG. 4 results.

The filled circles represent data points for the carbon monoxide light-off temperatures for the coated substrate prepared with a washcoat having nano-on-nano-on-micron (NNm) catalyst (where the PGM is 2:1 Pt:Pd). The filled squares indicate the CO light-off temperatures for a commercially available coated substrate prepared by wet-chemistry methods (also with a 2:1 Pt:Pd ratio).

The commercially available coated substrate displays CO light-off temperatures of 141° C. and 143° C. at a PGM loading of 5.00 g/l (for an average of 142° C.). The coated substrate with the NNm washcoat displays CO light-off temperatures of 133° C. at 5.1 g/l PGM loading and 131° C. at 5.2 g/l PGM loading, or about 8 to about 10 degrees C. lower than the commercially available coated substrate at similar PGM loading. The coated substrate with the NNm washcoat displays a CO light-off temperature of 142° C. at a PGM loading of 3.3 g/l, for similar light-off performance to the commercially available coated substrate, but at a thrifting (reduction) of PGM loading of 34%.

B. Improvement in Emissions Profile in Vehicle

Figure 11:
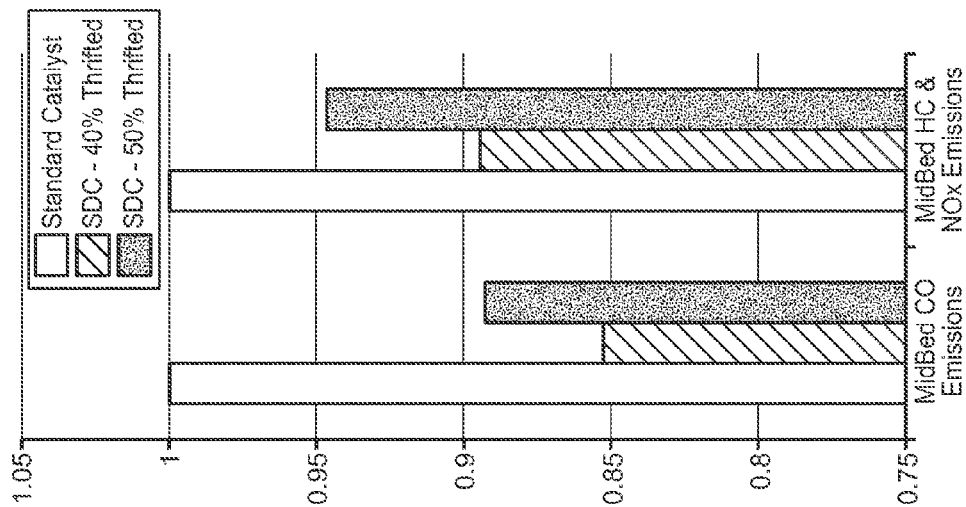
FIG. 11 shows a comparison of midbed catalytic converter gases of certain embodiments of the present invention versus a standard commercially available catalytic converter.

FIG. 11 illustrates the performance of a coated substrate prepared according to some embodiments of the present invention installed in a catalytic converter and used as a diesel oxidation catalyst, compared to a commercially available catalytic converter prepared using wet-chemistry methods. These measurements were made on an actual diesel engine vehicle, mounted on rollers and driven robotically for testing. The exhaust from the engine passes through the diesel oxidation catalyst (DOC), and sensors measure the emissions profile after the exhaust passes through the DOC. (The emissions then pass through a diesel particulate filter (DPF) prior to release into the environment.) The DOCs tested were artificially aged at 800° C. for 16 hours to simulate operation after 125,000 miles in a car.

The midbed emissions profile of the exhaust, after passing through the DOC and before entering the DPF, are shown in FIG. 11. Midbed emissions of carbon monoxide are shown in the left group of bars, while midbed emissions of hydrocarbons and nitrogen oxides are shown in the right group of bars. The emissions profile after passing through a commercially available diesel oxidation catalyst (DOC) is shown in the left bar of each group, and are normalized to 1.0. The emissions profile of a DOC using a catalytic converter prepared according to the methods described herein are illustrated by the center and right bars of each group. The center bars of each group are for a catalytic converter prepared according to the invention which are 40% thrifted (that is, containing 40% less PGM than the commercially available catalytic converter), while the right bars of each group are for a catalytic converter prepared according to the invention which are 50% thrifted (that is, containing 50% less PGM than the commercially available catalytic converter). The 40% thrifted converters of the invention showed 85.3% of the CO emissions and 89.5% of the HC/NO$_x$ emissions as the commercially available catalyst. The 50% thrifted converters of the invention showed 89.3% of the CO emissions and 94.7% of the HC/NO$_x$ emissions as the commercially available catalyst. Thus, catalytic converters prepared with coated substrates according to the invention demonstrated superior emissions performance over commercially available wet-chemistry catalysts, while using significantly less PGM.

Example 5

Fe-Exchanged Zeolites Used in a Substrate-Corner Fill-Catalytic Particle-Zeolite, or S-F-C-Z, Configuration A first washcoat composition comprising aluminum oxide particles was applied to a substrate as a corner-fill washcoat, and dried and calcined, in a similar manner to that described in Example 4. A second washcoat composition was applied over the corner-fill washcoat layer, comprising about 2% boehmite and about 98% nano-on-nano-on-micro (NNm) catalytic powder. The ratio of platinum to palladium in the catalytic powder was 4:1 Pt:Pd. (The loading of the precious metals was 1.8%; at 150 g/L of NNm powder and 3 g/L boehmite, approximately 2.7 g of precious metal is used per liter.) After application, the catalyst-containing washcoat composition is dried and calcined. A third washcoat composition was applied over the catalyst-containing washcoat layer, comprising about 3% boehmite, about 47% porous alumina impregnated with palladium via wet chemistry methods (at a weight percent of approximately 1%, hence 0.5 g/L of Pd in a 50 g/L suspension of Pd-impregnated Al2O3), and about 50% iron-exchanged zeolites (3% iron-exchanged zeolites). The ratio of the total amount of the platinum to the total amount of palladium on the substrate in the combined washcoat layers is 2:1 Pt:Pd (four parts Pt in the NNm catalytic particle layer, one part Pd in the NNm catalytic particle layer, and one part Pd in the zeolite layer). The third washcoat layer was dried and calcined.

When hydrocarbon emissions for catalysts prepared using non-iron-exchanged zeolites and having no palladium in the zeolite layer are normalized to 100, the hydrocarbon emissions for the Fe-exchanged zeolite configuration are about 75, that is, reduced by about 25%. Similarly, when carbon monoxide emissions for catalysts prepared using non-iron-exchanged zeolites and having no palladium in the zeolite layer are normalized to 100, the CO emissions for the Fe-exchanged zeolite configuration are about 75, that is, also reduced by about 25%. This is a significant advance over previous configurations.

The disclosures of all publications, patents, patent applications and published patent applications referred to herein by an identifying citation are hereby incorporated herein by reference in their entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiments chosen for illustration without departing from the spirit and scope of the invention. Therefore, the description and examples should not be construed as limiting the scope of the invention.

TABLE 1

Exemplary Embodiments of Washcoat Formulations

| Corner Fill Layer | Alumina | Alumina | Alumina |
|---|---|---|---|
| Catalytic Layer | Pt/Pd on MI-386 (NNm) | Pt/Pd on MI-386 (NNm) and Pd on MI-386 (NNm) | Pt/Pd on MI-386 (NNm) and Pd on MI-386 (wet chem. method) |

TABLE 1-continued

Exemplary Embodiments of Washcoat Formulations

| | | | | | | | | | | | | |
|---|---|---|---|---|---|---|---|---|---|---|---|---|
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | Plain zeolite | Zeolite (Fe) | Zeolite + Pd | Zeolite (Fe) + Pd |
| Corner Fill Layer | Zeolite + Pd | | Zeolite (Fe) + Pd | | Zeolite + Pd | | Zeolite (Fe) + Pd | | | | | |
| Catalytic Layer | Pt/Pd on MI-386 (NNm) and Pd on MI-386 (NNm) | | | | Pt/Pd on MI-386 (NNm) and Pd on MI-386 (wet chem. method) | | | | | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | | | | |
| Corner Fill Layer | Plain zeolite | | Zeolite (Fe) | | Plain zeolite | | Zeolite (Fe) | | | | | |
| Catalytic Layer | Pt/Pd on MI-386 (NNm) and Pd on MI-386 (NNm) | | | | Pt/Pd on MI-386 (NNm) and Pd on MI-386 (wet chem. method) | | | | | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | | | | |
| Corner Fill Layer | Pt/Pd on MI-386 (NNm) | | | | Pt/Pd on MI-386 (NNm) | | | | Pt/Pd on MI-386 (NNm) | | | |
| Catalytic Layer | Pt/Pd on MI-386 (NNm) | | | | Pt/Pd on MI-386 (NNm) and Pd on MI-386 (NNm) | | | | Pt/Pd on MI-386 (NNm) and Pd on MI-386 (wet chem. method) | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | Plain zeolite | Zeolite (Fe) | Zeolite + Pd | Zeolite (Fe) + Pd |
| Corner Fill Layer | Pt/Pd on MI-386 (NNm) and Pd on MI-386 (NNm) | | | | Pt/Pd on MI-386 (NNm) and Pd on MI-386 (NNm) | | | | | | | |
| Catalytic Layer | Pt/Pd on MI-386 (NNm) and Pd on MI-386 (NNm) | | | | Pt/Pd on MI-386 (NNm) and Pd on MI-386 (wet chem. method) | | | | | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | | | | |
| Corner Fill Layer | Pt/Pd on MI-386 (NNm) and Pd on MI-386 (wet chem. method) | | | | Pt/Pd on MI-386 (NNm) and Pd on MI-386 (wet chem. method) | | | | | | | |
| Catalytic Layer | Pt/Pd on MI-386 (NNm) and Pd on MI-386 (NNm) | | | | Pt/Pd on MI-386 (NNm) and Pd on MI-386 (wet chem. method) | | | | | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | | | | |
| Corner Fill Layer | Alumina | | | | Zeolite + Pd | | Zeolite (Fe) + Pd | | Plain zeolite | | Zeolite (Fe) | |
| Catalytic Layer | Pt on MI-386 (NNm) | | | | Pt on MI-386 (NNm) | | | | Pt on MI-386 (NNm) | | | |
| Zeolite Layer | Zeolite + Pd | | Zeolite (Fe) + Pd | | Plain zeolite | Zeolite (Fe) | Zeolite + Pd | Zeolite (Fe) + Pd | Zeolite + Pd | | Zeolite (Fe) + Pd | |
| Corner Fill Layer | Pt on MI-386 (NNm) | | | | Pt on MI-386 (NNm) | | | | | | | |
| Catalytic Layer | Pt on MI-386 (NNm) and Pd on MI-386 (NNm) | | | | Pt on MI-386 (NNm) and Pd on MI-386 (wet chem. method) | | | | | | | |
| Zeolite Layer | Plain zeolite | Zeolite (Fe) | Zeolite + Pd | Zeolite (Fe) + Pd | Plain zeolite | Zeolite (Fe) | Zeolite + Pd | Zeolite (Fe) + Pd | | | | |

What is claimed is:

1. A coated substrate comprising:

a substrate; and, coated on said substrate:

a washcoat layer comprising iron-exchanged zeolite particles, and a washcoat layer comprising catalytically active Nano-on-Nano-on-micro (NNm) particles, the catalytically active Nano-on-Nano-on-micro (NNm) particles comprising composite nanoparticles bonded to micron-sized carrier particles, and the composite nanoparticles comprising a support nanoparticle and a catalytic nanoparticle.

2. The coated substrate of claim 1, wherein the iron-exchanged zeolite particles comprise between about 0.5% and about 15% iron by weight.

3. The coated substrate of claim 1, wherein the washcoat layer comprising catalytically active Nano-on-Nano-on-micro (NNm) particles further comprises a filler material comprised of micron-sized metal oxide particles, wherein the micron-sized metal oxide particles are not bonded to composite nanoparticles.

4. The coated substrate of claim 1, wherein the washcoat layer comprising catalytically active Nano-on-Nano-on-micro (NNm) particles further comprises a filler material comprised of micron-sized alumina particles impregnated with palladium by wet-chemical techniques.

5. The coated substrate of claim 1, wherein the iron-exchanged zeolite particles further comprise palladium.

6. The coated substrate of claim 1, wherein the catalytically active Nano-on-Nano-on-micro (NNm) particles comprise at least one platinum group metal.

7. The coated substrate of claim 1, wherein the catalytically active Nano-on-Nano-on-micro (NNm) particles comprise platinum or palladium.

8. The coated substrate of claim 7, wherein the catalytically active Nano-on-Nano-on-micro (NNm) particles comprise platinum and palladium in a weight ratio from about 8:1 to about 1:1.

9. The coated substrate of claim 1, wherein the washcoat layer comprising iron-exchanged zeolite particles further comprises metal-oxide particles and boehmite particles.

10. The coated substrate of claim 9, wherein the metal-oxide particles are aluminum-oxide particles.

11. The coated substrate of claim 1, wherein the iron-exchanged zeolite particles in the washcoat layer comprising iron-exchanged zeolite particles have a diameter of 0.2 microns to 8 microns.

12. The coated substrate of claim 1, wherein the washcoat layer comprising catalytically active Nano-on-Nano-on micro (NNm) particles further comprises boehmite particles and silica particles.

13. The coated substrate of claim 1, further comprising a corner-fill layer deposited directly on the substrate, wherein the corner-fill layer does not comprise catalytically active Nano-on-Nano-on-micro (NNm) particles or iron-exchanged zeolite particles.

14. The coated substrate of claim 13, wherein the corner-fill layer comprises zeolite particles that are not iron-exchanged zeolite particles.

15. A catalytic converter comprising a coated substrate according to claim 1.

16. A method of treating an exhaust gas, comprising contacting the coated substrate of claim 1 with the exhaust gas.

17. A method of forming a coated substrate, the method comprising:
a) coating a substrate with a washcoat composition comprising iron-exchanged zeolite particles; and
b) coating the substrate with a washcoat composition comprising catalytically active Nano-on-Nano-on-micro (NNm) particles comprising composite nanoparticles bonded to micron-sized carrier particles, and the composite nanoparticles comprise a support nanoparticle and a catalytic nanoparticle.

18. The method of claim 17, wherein the iron-exchanged zeolite particles comprise between about 0.5% and about 15% iron by weight.

19. The method of claim 17, wherein the washcoat composition comprising catalytically active Nano-on-Nano-on-micro (NNm) particles further comprises a filler material comprised of micron-sized metal oxide particles, wherein the micron-sized metal oxide particles are not bonded to composite nanoparticles.

20. The method of claim 17, wherein the washcoat layer comprising catalytically active Nano-on-Nano-on-micro (NNm) particles further comprises a filler material comprised of micron-sized alumina particles impregnated with palladium by wet-chemical techniques.

21. The method of claim 17, wherein the iron-exchanged zeolite particles further comprise palladium.

22. The method of claim 17, wherein the catalytically active Nano-on-Nano-on-micro (NNm) particles comprise at least one platinum group metal.

23. The method of claim 22, wherein the catalytically active Nano-on-Nano-on-micro (NNm) particles comprise platinum and palladium in a weight ratio from about 8:1 to about 1:1.

24. The method of claim 17, wherein the support nanoparticles have an average diameter of about 10 nm to about 20 nm.

25. The method of claim 17, wherein the catalytic nanoparticles have an average diameter of about 1 nm to about 5 nm.

26. The method of claim 17, wherein the washcoat composition comprising iron-exchanged zeolite particles further comprises metal-oxide particles and boehmite particles.

27. The method of claim 26, wherein the metal-oxide particles are aluminum-oxide particles.

28. The method of claim 17, wherein the iron-exchanged zeolite particles in the washcoat composition comprising iron-exchanged zeolite particles have a diameter of 0.2 microns to 8 microns.

29. The method of claim 17, wherein the washcoat composition comprising catalytically active Nano-on-Nano-on micro (NNm) particles further comprises boehmite particles and silica particles.

30. The method of claim 17, further comprising coating the substrate with a corner-fill layer deposited directly on the substrate.

31. The method of claim 30, wherein the corner-fill layer comprises zeolite particles.

32. The method of claim 31, wherein the zeolite particles in the corner-fill layer are iron-exchanged zeolite particles.

33. The method of claim 32, wherein the iron-exchanged zeolite particles in the corner-fill layer further comprise palladium.

34. The method of claim 30, wherein the corner-fill layer comprises catalytically active Nano-on-Nano-on micro (NNm) particles.

* * * * *